United States Patent
Lim et al.

(10) Patent No.: US 12,456,442 B2
(45) Date of Patent: Oct. 28, 2025

(54) ELECTRONIC APPARATUS FOR DISPLAYING 3D IMAGE AND OPERATING METHOD THEREOF

(71) Applicant: SAMSUNG ELECTRONICS CO., LTD., Suwon-si (KR)

(72) Inventors: Kyungmin Lim, Suwon-si (KR); Youngjin Yoon, Suwon-si (KR); Bora Jin, Suwon-si (KR); Cheolseong Park, Suwon-si (KR); Yeoul Lee, Suwon-si (KR); Jaesung Lee, Suwon-si (KR); Jihye Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 18/137,847

(22) Filed: Apr. 21, 2023

(65) Prior Publication Data
US 2023/0326432 A1 Oct. 12, 2023

Related U.S. Application Data

(63) Continuation of application No. PCT/KR2023/004603, filed on Apr. 5, 2023.

(30) Foreign Application Priority Data

Apr. 12, 2022 (KR) .......... 10-2022-0045271
Sep. 19, 2022 (KR) .......... 10-2022-0118148

(51) Int. Cl.
*G09G 5/37* (2006.01)
*G06F 3/01* (2006.01)
(Continued)

(52) U.S. Cl.
CPC .......... *G09G 5/377* (2013.01); *G06F 3/013* (2013.01); *G06T 7/50* (2017.01); *G06V 10/25* (2022.01);
(Continued)

(58) Field of Classification Search
CPC .......... G09G 5/377; G09G 2320/0693; G09G 2340/10; G06F 3/013; G06F 3/147;
(Continued)

(56) References Cited

U.S. PATENT DOCUMENTS 10,070,118 B2  9/2018  Baran et al.
10,474,103 B2  11/2019  Holstine
(Continued)

FOREIGN PATENT DOCUMENTS

JP   2018-523338 A    8/2018
KR   10-2015-0106381 A  9/2015
(Continued)

OTHER PUBLICATIONS

International Search Report and Written Opinion (PCT/ISA/220, 210, & 237) dated Jun. 29, 2023 issued by the International Searching Authority in International Application No. PCT/KR2023/004603.
(Continued)

*Primary Examiner* — Chong Wu
(74) *Attorney, Agent, or Firm* — Sughrue Mion, PLLC

(57) ABSTRACT

An electronic apparatus and an operating method thereof are provided. The electronic apparatus includes a display panel, a memory, and a processor. The processor obtains an input image including a first area and a second area, generates a calibration map that allocates, to the first area, a first calibration value for representing a first depth value and allocates, to the second area, a second calibration value for representing a second depth value, applies the calibration map to the input image to generate an output image including a first output area and a second output area, and displays the output image on the display panel. The first output area has a depth value obtained by converting the first depth value so as to correspond to the display panel. The second
(Continued)

output area has a depth value obtained by converting the second depth value so as to correspond to the display panel.

18 Claims, 21 Drawing Sheets

(51) Int. Cl.
*G06T 7/50* (2017.01)
*G06V 10/25* (2022.01)
*G06V 10/74* (2022.01)
*G09G 5/377* (2006.01)

(52) U.S. Cl.
CPC .. *G06V 10/761* (2022.01); *G06T 2207/20081* (2013.01)

(58) Field of Classification Search
CPC . G06T 7/50; G06T 2207/20081; G06V 10/25; G06V 10/761; G06V 40/18; H04N 13/122; H04N 13/128; H04N 13/30; H04N 13/305; H04N 13/327; H04N 13/368; H04N 13/383; H04N 13/395; H04N 2013/0081; G02B 30/27
See application file for complete search history.

(56) References Cited

U.S. PATENT DOCUMENTS

| 10,571,706 | B2 | 2/2020 | Lin et al. |
| 10,638,119 | B2 | 4/2020 | Kroon |
| 10,951,875 | B2 | 3/2021 | Wetzstein et al. |
| 11,536,559 | B2 | 12/2022 | Yeoh et al. |
| 2017/0026662 | A1 | 1/2017 | Lee et al. |
| 2017/0347079 | A1* | 11/2017 | Wang ............... H04N 9/3188 |
| 2018/0181066 | A1 | 6/2018 | Holstine |
| 2018/0184066 | A1 | 6/2018 | Salahieh et al. |
| 2018/0224662 | A1 | 8/2018 | Yu et al. |
| 2021/0136354 | A1 | 5/2021 | Valli et al. |
| 2022/0208042 | A1 | 6/2022 | Lim et al. |
| 2022/0208047 | A1 | 6/2022 | Jin et al. |

FOREIGN PATENT DOCUMENTS

| KR | 10-2018-0080302 A | 7/2018 |
| KR | 10-2018-0084749 A | 7/2018 |
| KR | 10-2021-0084230 A | 7/2021 |
| KR | 10-2022-0092247 A | 7/2022 |
| KR | 10-2022-0093975 A | 7/2022 |

OTHER PUBLICATIONS

Communication dated Apr. 17, 2025, issued by the European Patent Office in European Application No. 23788528.0.
Wang et al., "Salience Guided Depth Calibration for Perceptually Optimized Compressive Light Field 3D Display", 2018 IEEE/CVF Conference on Computer Vision and Pattern Recognition, Jun. 18, 2018, XP033476, pp. 2031-2040 (10 pages total).

* cited by examiner

FIG. 5C

| $d_1$ | $d_1$ | $d_1$ | $d_1$ |
|---|---|---|---|
| $d_1$ | $d_1$ | $d_1$ | $d_1$ — TAR |
| $d_1$ | $d_1$ | $d_1$ | $d_1$ |
| $d_1$ | $d_1$ | $d_1$ | $d_1$ |

| $d_4$ | $d_4$ | $d_4$ | $d_4$ |
|---|---|---|---|
| $d_4$ | $d_4$ | $d_4$ | $d_4$ |
| $d_4$ | $d_4$ | $d_4$ | $d_4$ |
| $d_4$ | $d_4$ | $d_4$ | $d_4$ |

<TD$_4$>

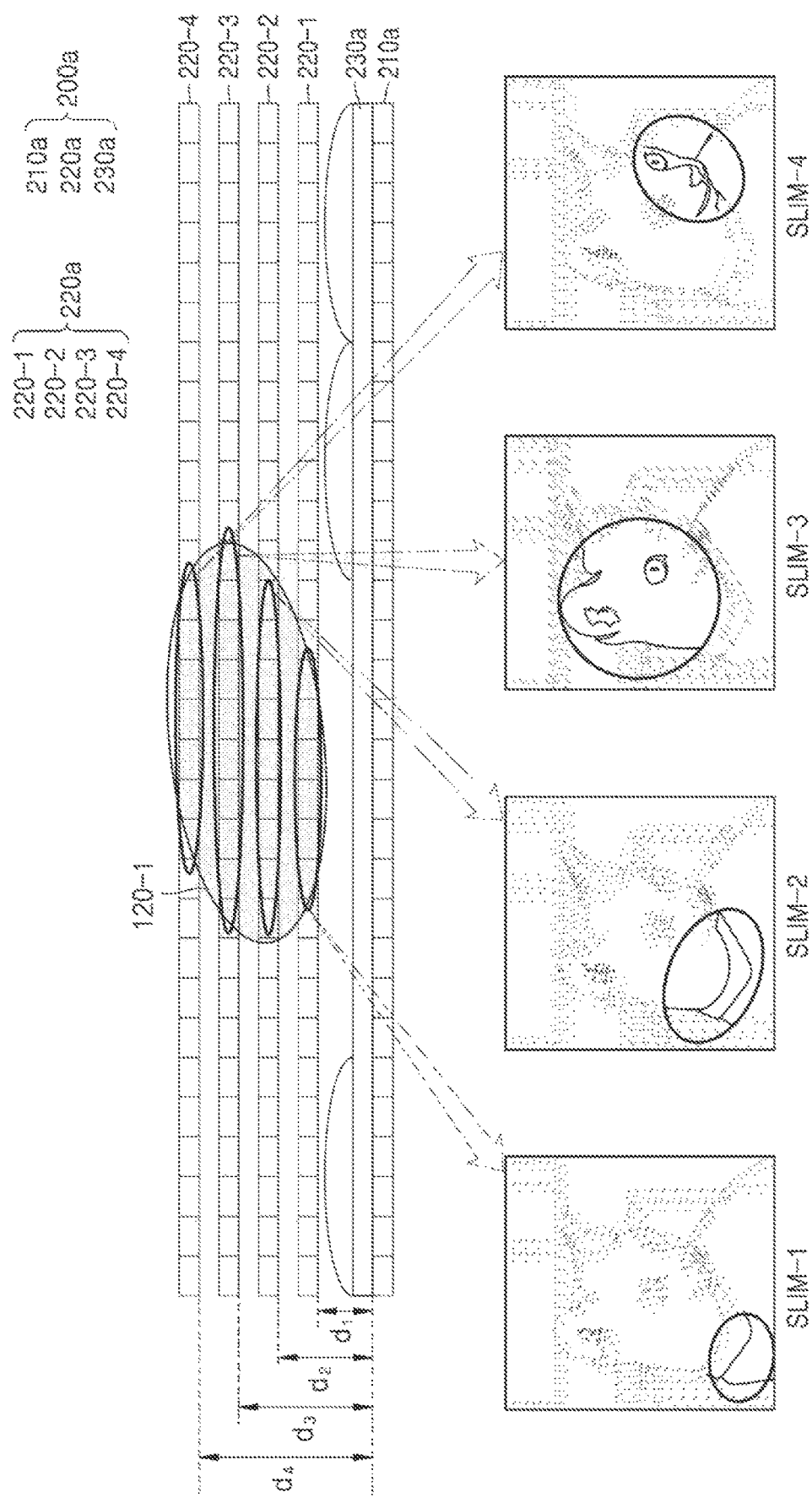

ELECTRONIC APPARATUS FOR DISPLAYING 3D IMAGE AND OPERATING METHOD THEREOF

CROSS-REFERENCE TO RELATED APPLICATIONS

This application is a bypass continuation of International Application No. PCT/KR2023/004603, filed on Apr. 5, 2023, which is based on and claims priority to Korean Patent Application Nos. 10-2022-0045271, filed on Apr. 12, 2022, and 10-2022-0118148, filed on Sep. 19, 2022, the disclosures of which are incorporated by reference herein in their entireties.

TECHNICAL FIELD

The disclosure relates to an electronic apparatus for displaying a three-dimensional (3D) image and an operating method thereof.

BACKGROUND ART

As electronic technologies have advanced, various types of electronic apparatuses have been developed and become widespread. For example, electronic apparatuses including display devices for displaying images have been rapidly developing in recent years.

With technological advancements in display devices, the types of images displayed by the display devices have diversified. Display devices capable of displaying not only a two-dimensional (2D) image but also a three-dimensional (3D) image have been developed.

Recently, a method of displaying a 3D image by using a volumetric display capable of displaying an object in a 3D space has been proposed. In particular, a stacked display has been proposed, which includes a plurality of stacked display panels and provides a 3D image by displaying an image on each of the stacked display panels. The stacked display displays a 3D image by displaying, on the stacked display panels, layer images obtained by inputting light field images captured from different view points into a model that performs factorization.

DESCRIPTION OF EMBODIMENTS

Technical Problem

Provided is an electronic apparatus for displaying a 3D image and an operating method.

Additional aspects will be set forth in part in the description which follows and, in part, will be apparent from the description, or may be learned by practice of the presented embodiments.

According to an aspect of the disclosure, an electronic apparatus according to an embodiment of the disclosure may include a display panel. The electronic apparatus may include a memory storing at least one instruction. The electronic apparatus may include at least one processor configured to execute the at least one instruction stored in the memory. The at least one processor may be further configured to obtain an input image including a first area and a second area. The at least one processor may be further configured to generate a calibration map that allocates, to the first area, a first calibration value for representing a first depth value and allocates, to the second area, a second calibration value for representing a second depth value. The at least one processor may be further configured to generate an output image including a first output area corresponding to the first area and a second output area corresponding to the second area by applying the calibration map to the input image. The at least one processor may be further configured to display the generated output image on the display panel. In an embodiment of the disclosure, the first output area may have a depth value obtained by converting the first depth value so as to correspond to the display panel, and the second output area may have a depth value obtained by converting the second depth value so as to correspond to the display panel.

According to an aspect of the disclosure, an embodiment of the disclosure may provide an operating method of an electronic apparatus including a display panel. The operating method of the electronic apparatus may include obtaining an input image including a first area and a second area. The operating method of the electronic apparatus may include generating a calibration map that allocates, to the first area, a first calibration value for representing a first depth value and allocates, to the second area, a second calibration value for representing a second depth value. The operating method of the electronic apparatus may include generating an output image including a first output area corresponding to the first area and a second output area corresponding to the second area by applying calibration map to the input image. The operating method of the electronic apparatus may include displaying the generated output image on the display panel. In an embodiment of the disclosure, the first output area may have a depth value obtained by converting the first depth value so as to correspond to the display panel, and the second output area may have a depth value obtained by converting the second depth value so as to correspond to the display panel.

According to an aspect of the disclosure, a computer-readable recording medium may have recorded thereon a program for causing a computer to perform one of the operating methods disclosed herein.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5C is a diagram for describing training distance information according to an embodiment of the disclosure.

FIG. 6C is a diagram for describing training distance information according to an embodiment of the disclosure.

FIG. 12A is a diagram for describing an operation of an electronic apparatus, according to an embodiment of the disclosure.

MODE OF DISCLOSURE

Figure 1:
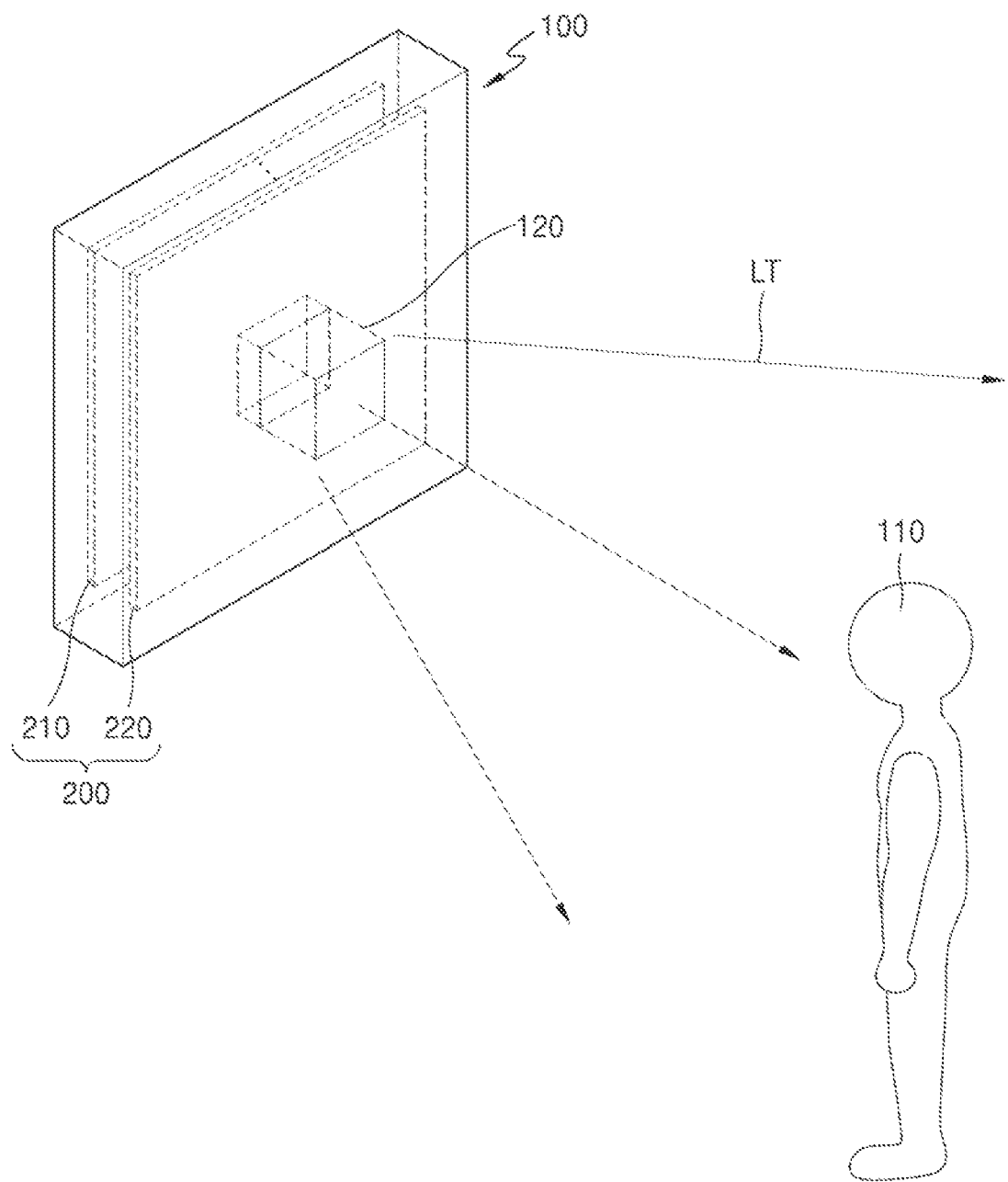
FIG. 1 is a diagram for describing an electronic apparatus according to an embodiment of the disclosure.

The disclosure will be described in detail below with reference to the accompanying drawings.

In the disclosure, the expression "at least one of a, b or c" indicates "a," "b," "c," "a and b," "a and c," "b and c," or "all of a, b, and c".

The terms as used herein are briefly described, and an embodiment of the disclosure is described in detail.

As for the terms as used herein, common terms that are currently widely used are selected as much as possible while taking into account functions in an embodiment of the disclosure. However, the terms may vary depending on the intention of those of ordinary skill in the art, precedents, the emergence of new technology, and the like. The meaning of the terms will be described in detail in the description of embodiments of the disclosure. Therefore, the terms as used herein should be defined based on the meaning of the terms and the description throughout the disclosure rather than simply the names of the terms.

The singular forms "a," "an," and "the" as used herein are intended to include the plural forms as well unless the context clearly indicates otherwise. All terms including technical or scientific terms as used herein have the same meaning as commonly understood by those of ordinary skill in the art.

Throughout the disclosure, the expression "a portion includes a certain element" means that a portion may include other elements rather than excludes other elements unless otherwise stated. Also, the terms such as " . . . er/or" and "module" as used herein mean units that process at least one function or operation, and may be implemented as hardware, software, or a combination of hardware and software.

The expression "configured to" as used herein may be used interchangeably with, for example, "suitable for," "having the capacity to," "designed to," "adapted to," "made to," or "capable of" depending on a situation. The term "configured to" may not necessarily mean only "specifically designed to" in hardware. Instead, in some situations, the expression "a system configured to . . . " may mean that the system is "capable of . . . " with other devices or components. For example, "a processor configured to perform A, B, and C" may refer to a dedicated processor (e.g., an embedded processor) for performing corresponding operations or a generic-purpose processor (e.g., a central processing unit (CPU) or an application processor) capable of performing corresponding operations by executing one or more software programs stored in a memory.

Also, when one element is referred to as "connected" or "coupled" to another element, the one element may be directly connected or coupled to the other element, but it will be understood that the elements may be connected or coupled to each other via an intervening element therebetween unless the context clearly indicates otherwise.

In the disclosure, a "depth value" may refer to a numerical value representing information about a distance from a reference point of view to a surface of an object. In an embodiment of the disclosure, when the reference point of view is a position of a camera that photographs an object, the depth value is a numerical value representing a distance from the camera to the surface of the object. In an embodiment of the disclosure, the depth value corresponding to the surface of the object close to the camera may be greater than the depth value corresponding to the surface of the object far from the camera.

In the disclosure, the "depth map" refers to an image including information about the depth value from the reference point of view to the surface of the object. In an embodiment of the disclosure, when the reference point of view is the position of the camera, the depth value may include depth information of the object photographed by the camera.

Hereinafter, embodiments of the disclosure will be described in detail with reference to the accompanying drawings, so that those of ordinary skill in the art may easily carry out the embodiments described in the disclosure. However, the disclosure may be implemented in various different forms and is not limited to the embodiments described herein. In order to clearly explain an embodiment of the disclosure, parts irrelevant to the description are omitted in the drawings, and similar reference numerals are assigned to similar parts throughout the disclosure.

Hereinafter, embodiments of the disclosure will be described in described in detail with reference to the drawings.

FIG. 1 is a diagram for describing an electronic apparatus 100, according to an embodiment of the disclosure.

Referring to FIG. 1, the electronic apparatus 100, according to an embodiment of the disclosure may include a display panel 200. The electronic apparatus 100 may display an output image 120 on the display panel 200.

In an embodiment of the disclosure, the output image 120, which is provided to a user 110 by the electronic apparatus 100, may vary depending on the position of the user 110. In an embodiment of the disclosure, the output image 120, which is provided by the electronic apparatus 100, may be an image capable of providing a three-dimensional effect to the user 110 of the electronic apparatus 100.

In an embodiment of the disclosure, the electronic apparatus 100 reproduces light that is reflected from an object and provided to the user 110 in the real world. In an embodiment of the disclosure, the electronic apparatus 100 provides the user 110 with light LT having the same path as that of the light that is reflected from the object and provided to the user 110 in the real world. The user 110 is provided with the light LT having the same path as that of the light reflected from the object in the real world through the output image 120 displayed on the electronic apparatus 100.

In an embodiment of the disclosure, the electronic apparatus 100 provides different output images 120 according to the position of the user 110, so that the user 110 may feel a three-dimensional effect of the object included in the output image 120. For convenience of explanation, it is assumed that the output image 120 includes an object having a hexahedral shape, as illustrated in FIG. 1.

In an embodiment of the disclosure, when the user 110 is located in a direction perpendicular to a front surface of the electronic apparatus 100, the electronic apparatus 100 may provide the user 110 with the output image 120 including a front surface of the object.

In an embodiment of the disclosure, when the user 110 is located in a first direction crossing the direction perpendicular to the front surface of the electronic apparatus 100, the electronic apparatus 100 may provide the user 110 with the output image 120 including a first side surface and a front surface of the object. In an embodiment of the disclosure, the first side surface of the object and the front surface of the object, which are provided to the user 110 by the electronic apparatus 100, may vary depending on an angle between the direction perpendicular to the front surface of the electronic apparatus 100 and the first direction. In an embodiment of the disclosure, the electronic apparatus 100 may provide the user 110 with the output image 120 including only the first side surface of the object according to an angle between the direction perpendicular to the front surface of the electronic apparatus 100 and the first direction.

In an embodiment of the disclosure, when the user 110 is located in a second direction crossing the direction perpendicular to the front surface of the electronic apparatus 100 and different from the first direction, the electronic apparatus 100 may provide the user 110 with the output image 120 including a second side surface of the object different from the first side surface of the object and the front surface of the object. In an embodiment of the disclosure, the second side surface of the object and the front surface of the object, which are provided to the user 110 by the electronic apparatus 100, may vary depending on an angle between the direction perpendicular to the front surface of the electronic apparatus 100 and the second direction. In an embodiment of the disclosure, the electronic apparatus 100 may provide the user 110 with the output image 120 including only the second side surface of the object according to an angle between the direction perpendicular to the front surface of the electronic apparatus 100 and the second direction.

In an embodiment of the disclosure, the first side surface and the front surface of the object may be areas of the object that may be seen when the user 110 looks at the object in the first direction crossing the direction perpendicular to the front surface of the object in the real world. In an embodiment of the disclosure, the second side surface and the front surface of the object may be areas of the object that may be seen when the user 110 looks at the object in the second direction crossing the direction perpendicular to the front surface of the object in the real world.

In an embodiment of the disclosure, the electronic apparatus 100 may provide the light LT to the user 110 through the output image 120 as if the user 110 looks at the object in the real world. Accordingly, the user 110 may feel a three-dimensional effect of the object included in the output image 120 displayed by the electronic apparatus 100.

In an embodiment of the disclosure, the electronic apparatus 100 provides different output images 120 to the left eye and the right eye of the user 110, and thus, the user 110 may feel binocular disparity. In an embodiment of the disclosure, the first direction may be a direction in which the left eye of the user 110 faces the electronic apparatus 100. The second direction may be a direction in which the right eye of the user 110 faces the electronic apparatus 100. The user 110 may feel binocular disparity because the output images 120 provided to the right eye and the left eye are different from each other. Accordingly, the user 110 may feel a three-dimensional effect of the object.

In an embodiment of the disclosure, the display panel 200 may include a plurality of sub-panels 210 and 220. In an embodiment of the disclosure, the sub-panels 210 and 220 may be stacked. Although FIG. 1 illustrates that the display panel 200 includes two sub-panels 210 and 220, the disclosure is not limited thereto. The display panel 200 may include three or more sub-panels. In an embodiment of the disclosure, the output image 120 may include a sub-image (see LIM of FIG. 4). In an embodiment of the disclosure, the sub-image (LIM) may include a plurality of sub-layer images (see SLIM of FIG. 4) to be described below. The electronic apparatus 100 may display sub-layer images respectively corresponding to the sub-panels 210 and 220 included in the display panel 200. The electronic apparatus 100 may display the sub-layer images respectively corresponding to the sub-panels 210 and 220 to provide the user 110 with the light LT as if the user 110 looks at the object in the real world.

Figure 2:
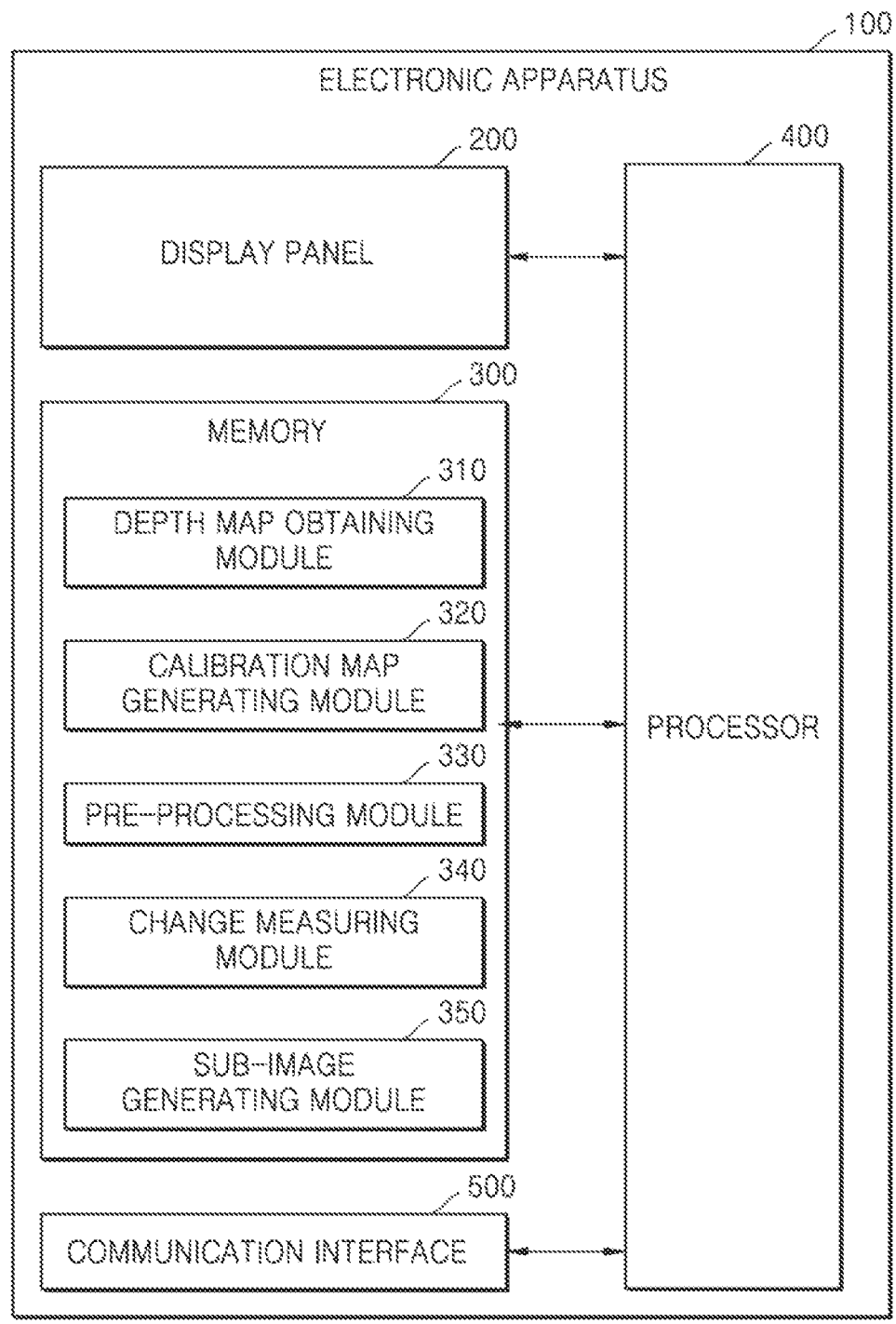
FIG. 2 is a block diagram for describing an electronic apparatus according to an embodiment of the disclosure.

FIG. 2 is a block diagram for describing an electronic apparatus 100 according to an embodiment of the disclosure.

As illustrated in FIG. 2, the electronic apparatus 100 according to an embodiment of the disclosure may include a display panel 200, a memory 300, a processor 400, and a communication interface 500. However, all of the elements illustrated in FIG. 2 are not essential elements. The electronic apparatus 100 may be implemented with more elements than the elements illustrated in FIG. 2, or may be implemented with fewer elements than the elements illustrated in FIG. 2. The display panel 200, the memory 300, the processor 400, and the communication interface 500 may be electrically and/or physically connected to each other. Hereinafter, the same elements as those described with reference to FIG. 1 are denoted by the same reference numerals, and descriptions thereof are omitted.

In an embodiment of the disclosure, the display panel 200 may include one of a liquid crystal display, a plasma display, an organic light-emitting diode display, and an inorganic light-emitting diode display. However, the disclosure is not limited thereto, and the display panel 200 may include another type of display capable of providing the user 110 with the output image 120.

In an embodiment of the disclosure, the memory 300 may include at least one of flash memory-type memory, hard disk-type memory, multimedia card micro-type memory, card-type memory (e.g., secure digital (SD) or extreme digital (XD) memory), random access memory (RAM), static random access memory (SRAM), read-only memory (ROM), electrically erasable programmable read-only memory (EEPROM), programmable read-only memory (PROM), mask ROM, flash ROM, hard disk drive (HDD), or solid state drive (SSD). The memory 300 may store instructions or program code for performing the functions or operations of the electronic apparatus 100. The instructions, algorithms, data structures, program code, and application programs, which are stored in the memory 300, may be implemented in, for example, programming or scripting languages, such as C, C++, Java, or assembler.

In an embodiment of the disclosure, the memory 300 may store various types of modules that may be used to provide the output image 120 to the user 110 through the display panel 200. The memory 300 may store a depth map obtaining module 310, a calibration map generating module 320, a pre-processing module 330, a change measuring module 340, and a sub-image generating module 350. However, all of the modules illustrated in FIG. 2 are not essential modules. The memory 300 may be implemented with more elements than the elements illustrated in FIG. 2, or may be implemented with fewer elements than the elements illustrated in FIG. 2. In an embodiment of the disclosure, the memory 300 may store only the calibration map generating module 320 and the sub-image generating module 350.

The "modules" included in the memory 300 may mean units that process the functions or operations to be performed by the processor 400. The "modules" included in the memory 300 may be implemented as software, such as instructions, algorithms, data structures, or program code.

In an embodiment of the disclosure, the depth map obtaining module 310 may include instructions or program code related to an operation or function of obtaining a depth map (see DM of FIG. 9) of the input image LFIM based on an input image (see LFIM of FIG. 3) provided to the electronic apparatus 100. However, in an embodiment of the disclosure, the electronic apparatus 100 may be provided with the input image LFIM and the depth map DM of the input image LFIM.

In an embodiment of the disclosure, the calibration map generating module 320 may include instructions or program code related to an operation or function of generating a calibration map (see CBM and CBM-1 of FIG. 8) based on the depth map DM. The calibration map generating module 320 will be described below with reference to FIGS. 8 to 11.

In an embodiment of the disclosure, the pre-processing module 330 may include instructions or program code related to an operation or function of pre-processing the input image LFIM provided to the electronic apparatus 100. In an embodiment of the disclosure, the pre-processing module 330 may include instructions or program code related to an operation or function of pre-processing the input image LFIM based on the calibration maps CBM and CBM-1. In an embodiment of the disclosure, at least one processor 400 may execute the instructions or program code of the pre-processing module 330 to pre-process the input image LFIM through wrangling, transformation, integration, cleaning, reduction, discretization, and the like.

In an embodiment of the disclosure, the input image LFIM may include images (see SIM of FIG. 3) having a plurality of different views from each other. Hereinafter, the images having a plurality of different views from each other are referred to as view images SIM. The pre-processing module 330 may pre-process the view images SIM included in the input image LFIM.

In an embodiment of the disclosure, the view images SIM may be images obtained by photographing an object from different views from each other. In an embodiment of the disclosure, the view images SIM may be images obtained through a plurality of cameras disposed at different positions from each other to photograph an object from different views from each other. In an embodiment of the disclosure, the view images SIM may be images obtained from different views from each other through a camera including a micro lens array. Hereinafter, for convenience of explanation, the view images SIM are defined as images obtained through a plurality of cameras that photograph an object from different views from each other.

In an embodiment of the disclosure, the change measuring module 340 may include instructions or program code related to an operation or function of obtaining a change flow based on the input image LFIM. In an embodiment of the disclosure, the change measuring module 340 may include instructions or program code related to an operation or function of obtaining a change flow based on the input image LFIM and the calibration maps CBM and CBM-1.

In an embodiment of the disclosure, the change measuring module 340 may include an artificial intelligence (AI) model. In an embodiment of the disclosure, the AI model included in the change measuring module 340 may be an AI model trained to obtain a change flow based on the input image LFIM. In an embodiment of the disclosure, the AI model included in the change measuring module 340 may be an AI model trained to obtain a change flow based on the input image LFIM and the calibration maps CBM and CBM-1. In an embodiment of the disclosure, the AI model included in the change measuring module 340 may include a machine learning or deep learning model.

In an embodiment of the disclosure, the AI model included in the change measuring module 340 may include a plurality of neural network layers. Each of the neural network layers may have multiple weights and may perform an operation of a present neural network layer through an operation result of a previous neural network layer and a calculation of multiple weights. Examples of the AI model may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, a generative adversarial network (GAN), and a variational auto encoder (VAE). The AI model included in the change measuring module 340 according to the disclosure is not limited to the examples described above.

In an embodiment of the disclosure, the electronic apparatus 100 may train the AI model included in the change measuring module 340. The electronic apparatus 100 may perform transfer learning using a pre-trained model in order to train the AI model included in the change measuring module 340. However, the disclosure is not limited thereto, and the change measuring module 340 may receive the pre-trained AI model from an external server or peripheral electronic apparatuses through the communication interface 500. The training of the AI model included in the change measuring module 340 will be described below with reference to FIGS. 4 to 6C.

In an embodiment of the disclosure, the sub-image generating module 350 may include instructions or program code related to an operation or function of generating the output image 120 to be displayed on the display panel 200 by applying the calibration maps CBM and CBM-1 to the input image LFIM. In an embodiment of the disclosure, the sub-image generating module 350 may include instructions or program code related to an operation or function of generating the sub-images LIM to be displayed on the sub-panels (see sub-panels 210 and 220 of FIG. 1) by applying the calibration maps CBM and CBM-1 to the input image LFIM. In an embodiment of the disclosure, the sub-image generating module 350 may include instructions or program code related to an operation or function of generating the sub-image LIM based on the pre-processed input image obtained through the pre-processing module 330 and the change flow obtained through the change measuring module 340. In an embodiment of the disclosure, the sub-image generating module 350 may include instructions or program code related to an operation or function of generating the sub-image LIM based on the pre-processed input image obtained through the pre-processing module 330, the change flow obtained through the change measuring module 340, and the calibration maps CBM and CBM-1.

In an embodiment of the disclosure, the sub-image generating module 350 may include instructions or program codes related to an operation or function of performing factorization to generate the output image 120. In an embodiment of the disclosure, the sub-image generating module 350 may include instructions or program code related to an operation or function of performing factorization to generate the sub-image LIM. In an embodiment of the disclosure, the sub-image generating module 350 may include an AI model that performs factorization. In an embodiment of the disclosure, the AI model included in the sub-image generating module 350 may include a machine learning or deep learning model.

In an embodiment of the disclosure, the AI model included in the sub-image generating module 350 may include a plurality of neural network layers. Each of the neural network layers may have multiple weights and may perform an operation of a present neural network layer through an operation result of a previous neural network layer and a calculation of multiple weights. Examples of the AI model may include a CNN, a DNN, an RNN, an RBM, a DBN, a BRDNN, a deep Q-network, a GAN, and a VAE. The AI model included in the sub-image generating module 350 according to the disclosure is not limited to the examples described above.

In an embodiment of the disclosure, the AI model included in the sub-image generating module 350 may be an AI model trained to generate the output image 120 to be displayed on the display panel 200 by applying the calibration maps CBM and CBM-1 to the input image LFIM. The sub-image generating module 350 may be an AI model trained to generate the sub-images LIM to be displayed on the sub-panels 210 and 220. In an embodiment of the disclosure, the AI model included in the sub-image generating module 350 may be an AI model trained to generate the sub-image LIM based on the pre-processed input image obtained through the pre-processing module 330 and the change flow obtained through the change measuring module 340.

In an embodiment of the disclosure, the electronic apparatus 100 may train the AI model included in the sub-image generating module 350. The electronic apparatus 100 may perform transfer learning using a pre-trained model in order to train the AI model included in the sub-image generating module 350. However, the disclosure is not limited thereto, and the sub-image generating module 350 may receive the pre-trained AI model from an external server or peripheral electronic apparatuses through the communication interface 500 in order to perform factorization. The training of the AI model included in the sub-image generating module 350 will be described below with reference to FIGS. 4 to 6C.

The processor 400 may include at least one of AI-only processors designed with a hardware structure specialized for learning and processing of a central processing unit, a microprocessor, a graphic processing unit), an application processor (AP), application specific integrated circuits (ASICs), digital signal processors (DSPs), digital signal processing devices (DSPDs), programmable logic devices (PLDs), field programmable gate arrays (FPGAs), and a neural processing unit or an AI model, but the disclosure is not limited thereto.

In an embodiment of the disclosure, the processor 400 may execute various types of modules stored in the memory 300. In an embodiment of the disclosure, the processor 400 may execute the depth map obtaining module 310, the calibration map generating module 320, the pre-processing module 330, the change measuring module 340, and the sub-image generating module 350, which are stored in the memory 300. In an embodiment of the disclosure, the processor 400 may execute at least one instruction constituting various types of modules stored in the memory 300.

In an embodiment of the disclosure, the communication interface 500 may perform data communication with an external server under the control of the processor 400. Also, the communication interface 500 may perform data communication with other peripheral electronic apparatuses as well as the external server. The communication interface 500 may perform data communication with the external server or other peripheral electronic apparatuses by using at least one of data communication schemes including, for example, wired local area network (LAN), wireless LAN, Wireless Fidelity (Wi-Fi), Bluetooth, ZigBee, Wi-Fi Direct (WFD), Infrared Data Association (IrDA), Bluetooth Low Energy (BLE), Near Field Communication (NFC), Wireless Broadband Internet (Wibro), World Interoperability for Microwave Access (WiMAX), Shared Wireless Access Protocol (SWAP), Wireless Gigabit Alliance (WiGig), and radio frequency (RF) communication.

In an embodiment of the disclosure, the communication interface 500 may transmit and receive, to and from the external server or peripheral electronic apparatuses, data for generating the sub-image LIM based on the input image LFIM and the calibration maps CBM and CBM-1.

In an embodiment of the disclosure, the communication interface 500 may receive the pre-trained change measuring module 340 from the external server or peripheral electronic devices in order to obtain the change flow based on the input image LFIM and the calibration maps CBM and CBM-1.

In an embodiment of the disclosure, the communication interface 500 may receive the pre-trained sub-image generating module 350 from the external server or peripheral electronic apparatuses in order to generate the sub-image LIM by applying the calibration maps CBM and CBM-1 to the input image LFIM.

Figure 3:
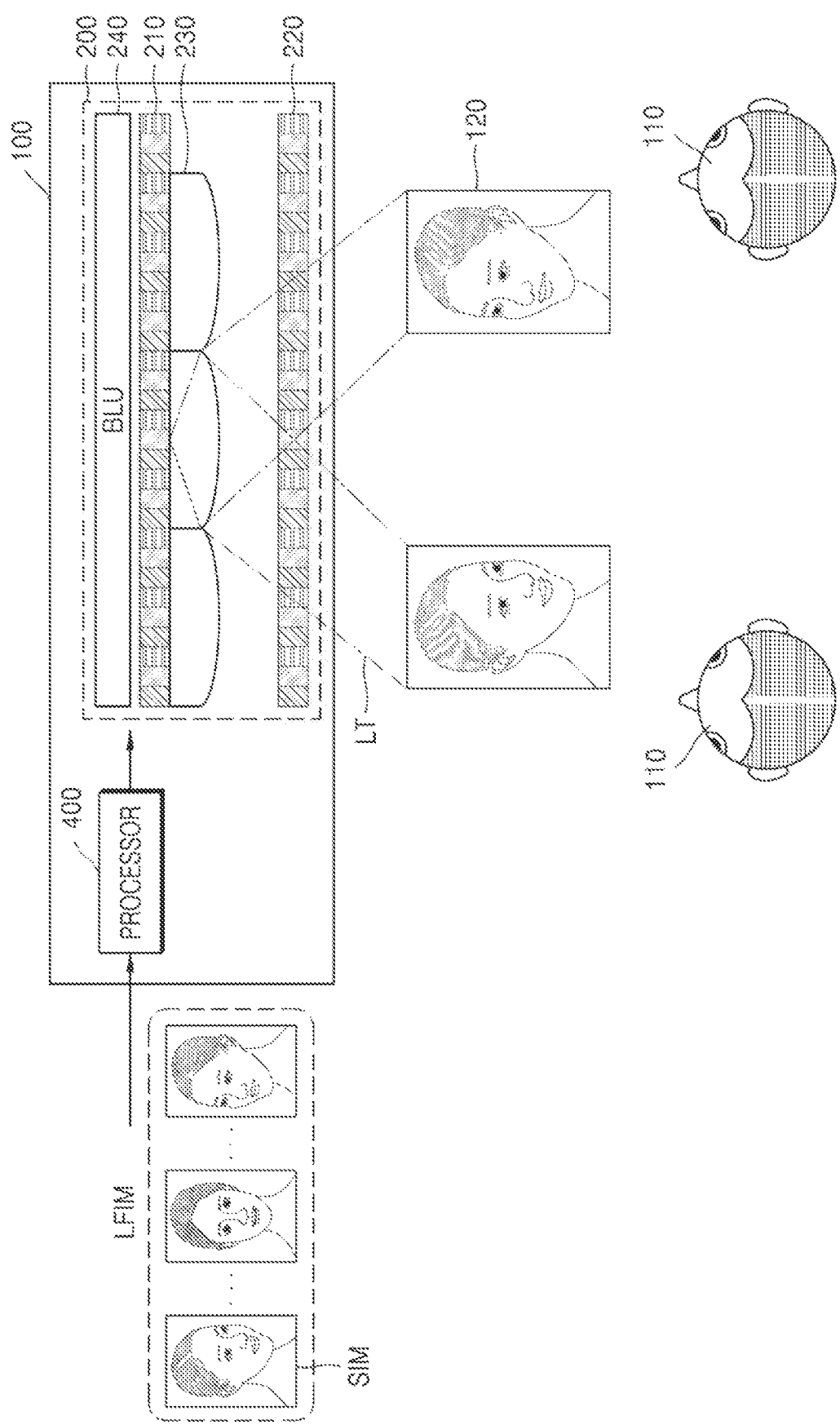
FIG. 3 is a diagram for describing an operation of an electronic apparatus, according to an embodiment of the disclosure.

FIG. 3 is a diagram for describing the operation of the electronic apparatus, according to an embodiment of the disclosure. Hereinafter, the same elements as those described with reference to FIG. 1 are denoted by the same reference numerals, and descriptions thereof are omitted.

FIG. 3 illustrates that the object includes a human face shape and the view images SIM included in the input image LFIM are images obtained by photographing the object from different views from each other. However, the illustration of FIG. 3 is for convenience of explanation, and the object is not limited to the human face shape. The input image LFIM may be an image obtained by photographing various types of objects.

In an embodiment of the disclosure, the electronic apparatus 100 receives the input image LFIM. The processor 400 generates the output image 120 based on the received input image LFIM. In an embodiment of the disclosure, the processor 400 generates the sub-image (see LIM of FIG. 8) based on the received input image LFIM. Hereinafter, for convenience of explanation, it is assumed that the processor 400 receives the input image LFIM and generates the sub-image LIM included in the output image 120.

The processor 400 may provide the generated sub-image LIM to the sub-panels 210 and 220, so that the display panel 200 displays the output image 120. In an embodiment of the disclosure, the electronic apparatus 100 may display, on the display panel 200, the sub-image LIM generated based on the input image LFIM, so that the output image 120 reproducing the photographed object is provided to the user 110.

In an embodiment of the disclosure, FIG. 3 illustrates that the display panel 200 is a liquid crystal display. The display panel 200 may include two sub-panels 210 and 220, an optical layer 230, and a backlight 240. Hereinafter, the two sub-panels 210 and 220 are referred to as a base panel 210 and a layer panel 220, respectively.

In an embodiment of the disclosure, the backlight 240 may generate light and provide the generated light to the user 110. In an embodiment of the disclosure, the light generated by the backlight 240 may be white light. However, the disclosure is not limited thereto, and the light provided by the backlight 240 may have colors other than white.

In an embodiment of the disclosure, the base panel 210 and the layer panel 220 may each include a plurality of pixels. In an embodiment of the disclosure, when the display panel 200 is a liquid crystal display, the base panel 210 and the layer panel 220 may each be a filter layer including a plurality of color filters. In an embodiment of the disclosure, the pixels may correspond to the color filters, respectively.

In an embodiment of the disclosure, at least one of the base panel 210 or the layer panel 220 may include a plurality of red, green, and blue color filters. In an embodiment of the disclosure, at least one of the base panel 210 or the layer panel 220 may include a plurality of red, green, and blue color filters and openings that do not filter light. In an embodiment of the disclosure, at least one of the base panel 210 or the layer panel 220 may include a plurality of yellow and blue color filters.

However, the disclosure is not limited thereto. In an embodiment of the disclosure, the colors of the color filters included in the base panel 210 and the layer panel 220 may vary depending on the wavelength of the light provided by the backlight 240, the combination of colors for displaying the output image 120 by using the light provided from the backlight 240, and the like.

In an embodiment of the disclosure, the optical layer 230 may be between the base panel 210 and the layer panel 220. The light LT transmitted through the base panel 210 by the optical layer 230 may be provided to the layer panel 220 after refraction, reflection, and dispersion. FIG. 3 illustrates that the optical layer 230 is between the base panel 210 and the layer panel 220, but the disclosure is not limited thereto. In an embodiment of the disclosure, the optical layer 230 may be between the backlight 240 and the base panel 210. Also, when the display panel 200 includes three or more sub-panels, the optical layer 230 may be disposed other than between the base panel 210 and the layer panel 220. Also, in an embodiment of the disclosure, the optical layer 230 may be omitted.

In an embodiment of the disclosure, the light LT provided by the backlight 240 may be transmitted through the base panel 210 and the layer panel 220 and provided to the user 110.

In an embodiment of the disclosure, the light LT generated by the backlight 240 may be provided to the user 110 through any one color filter included in the base panel 210 and any one color filter included in the layer panel 220. In an embodiment of the disclosure, the wavelength and intensity of the light LT provided to the user 110 are determined according to the color, transmittance, and the like of the color filter of the base panel 210 and the color filter of the layer panel 220, through which the light LT generated by the backlight 240 passes. In an embodiment of the disclosure, the wavelength and intensity of the light LT provided to the user 110 may be determined according to the combination of the color filter of the base panel 210 and the color filter of the layer panel 220, through which the light LT generated by the backlight 240 passes.

The color filter of the base panel 210 and the color filter of the layer panel 220, through which the light LT generated by the backlight 240 passes in order to reach the user 110, may vary depending on the position of the user 110. Specifically, the color, transmittance, and the like of the color filter of the base panel 210 and the color filter of the layer panel 220, through which the light LT generated by the backlight 240 passes in order to reach the user 110, may vary depending on the position of the user 110. In an embodiment of the disclosure, the combination of the color filter of the base panel 210 and the color filter of the layer panel 220, through which the light LT generated by the backlight 240 passes in order to reach the user 110, may vary depending on the position of the user 110. Accordingly, the electronic apparatus 100 may provide the user 110 with the output image 120 that changes in response to a change in the position of the user 110. The user 110 may feel a three-dimensional effect of an object included in the output image 120 based on a change in the output image 120 provided by the electronic apparatus 100 in response to a change in the position of the user 110.

In an embodiment of the disclosure, when the user 110 is located in a first direction crossing the direction perpendicular to the front surface of the electronic apparatus 100, the electronic apparatus 100 may provide the user 110 with the output image 120 crossing the direction perpendicular to the front surface of the electronic apparatus 100, and when the user 110 is located in a second direction different from the first direction, the electronic apparatus 100 may provide a different output image 120 to the user 110.

In an embodiment of the disclosure, the electronic apparatus 100 may provide the output image 120 that makes the user 110 located in the first direction feel as if the user 110 looks at the object in the first direction. In an embodiment of the disclosure, the electronic apparatus 100 may provide the output image 120 that makes the user 110 located in the first direction feel as if the user 110 looks at the object in the second direction. Accordingly, the user 110 may feel a three-dimensional effect of the object included in the output image 120 displayed by the electronic apparatus 100. However, the disclosure is not limited thereto, and the display panel 200 may be a display, such as an organic light-emitting diode display or an inorganic light-emitting diode display, in which each layer panel generates light by itself. The display panel 200 may not include the backlight 240. In an embodiment of the disclosure, the electronic apparatus 100 may adjust the intensity and wavelength of light generated by each sub-panel, the transmittance of each sub-panel, and the like and may provide a different output image 120 to the user 110 according to the position of the user 110.

Figure 4:
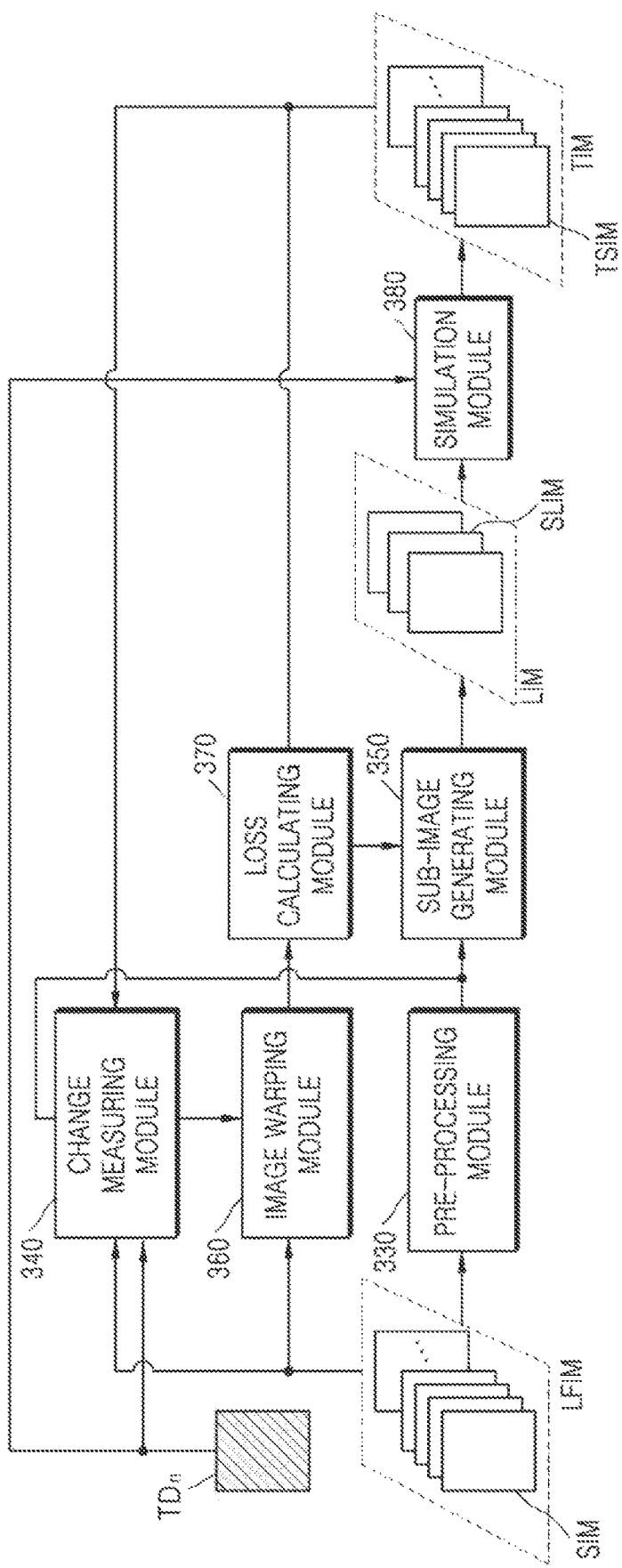
FIG. 4 is a diagram for describing a process of training a sub-image generating module, according to an embodiment of the disclosure.

FIG. 4 is a diagram for describing a process of training a sub-image generating module, according to an embodiment of the disclosure.

When the change measuring module 340 and the sub-image generating module 350 respectively include artificial intelligence models, FIG. 4 illustrates a process of training the artificial intelligence models respectively included in the change measuring module 340 and the sub-image generating module 350. In an embodiment of the disclosure, when at least one of the change measuring module 340 or the sub-image generating module 350 includes an artificial intelligence model, FIG. 4 may illustrate a process of training the artificial intelligence model included in at least one of the change measuring module 340 or the sub-image generating module 350.

In an embodiment of the disclosure, the electronic apparatus 100 illustrated in FIG. 1 may train the artificial intelligence models included in the change measuring module 340 and the sub-image generating module 350, as illustrated in FIG. 4. However, the disclosure is not limited thereto. The peripheral electronic apparatus may train the artificial intelligence model, as illustrated in FIG. 4, and the electronic apparatus 100 may receive a pre-trained artificial intelligence model from the peripheral electronic apparatus. Also, the electronic apparatus 100 may receive the pre-trained artificial intelligence model from the peripheral electronic apparatus in order for transfer learning, and may perform transfer learning, as illustrated in FIG. 4. Hereinafter, for convenience of explanation, a case where the change measuring module 340 and the sub-image generating module 350 respectively include artificial intelligence models and the electronic apparatus 100 trains the artificial intelligence models respectively included in the change measuring module 340 and the sub-image generating module 350 is described.

Referring to FIGS. 2 and 4, the memory 300 may further store an image warping module 360, a loss calculating module 370, and a simulation module 380.

Referring to FIGS. 3 and 4, in an embodiment of the disclosure, the input image LFIM and training distance information $TD_n$ may be provided for training of the change measuring module 340 and the sub-image generating module 350. In an embodiment of the disclosure, the input image LFIM and the training distance information $TD_n$ may be a training dataset for training the change measuring module 340 and the sub-image generating module 350. The change measuring module 340 and the sub-image generating module 350 may each be an artificial intelligence model trained based on the training dataset. In an embodiment of the disclosure, the weight of each of the change measuring module 340 and the sub-image generating module 350 may be updated based on the training dataset.

In an embodiment of the disclosure, the input image LFIM is an image obtained by photographing an object through a plurality of cameras in different views from each other. In an embodiment of the disclosure, the object may include a plurality of object areas having different distances from the cameras. In an embodiment of the disclosure, the input image LFIM may include a plurality of areas. The areas of the input image LFIM correspond to the object areas of the object, respectively. In an embodiment of the disclosure, depth values of the areas included in the input image LFIM may correspond to distances between the object areas of the object and the cameras, respectively.

In an embodiment of the disclosure, when the object includes a first object area and a second object area, the distance between the cameras and the first object area may be different from the distance between the cameras and the second object area. In an embodiment of the disclosure, the input image LFIM may include a first area and a second area.

In an embodiment of the disclosure, the first area may be an area having a first depth value, and the second area may be an area having a second depth value. In an embodiment of the disclosure, the first area of the input image LFIM may correspond to the first object area of the object. The second area of the input image LFIM may correspond to the second object area of the object. In an embodiment of the disclosure, when the distance between the cameras and the second object area is shorter than the distance between the cameras and the first object area, the second depth value may be greater than the first depth value.

In an embodiment of the disclosure, the object may include three or more object areas having different distances from the cameras. In an embodiment of the disclosure, the input image LFIM may include three or more areas having different depth values and corresponding to three or more object areas, respectively.

In an embodiment of the disclosure, when the object photographed by the cameras so as to obtain the input image LFIM is a human face, the distance between the cameras and the object area corresponding to a nose of the human face may be shorter than the distance between the cameras and the object area corresponding to a cheek of the human face. The input image LFIM may include a nose area corresponding to the object area corresponding to the nose, and a cheek area corresponding to the object area corresponding to the cheek. A depth value corresponding to the nose area may be greater than a depth value corresponding to the cheek area. Hereinafter, for convenience of explanation, it is defined that the distance between the cameras and the second object area is shorter than the distance between the cameras and the first object area, and the second depth value is greater than the first depth value.

In an embodiment of the disclosure, the input image LFIM may be an image obtained by photographing the object and the background of the object through the cameras. In an embodiment of the disclosure, the input image LFIM may include at least one area corresponding to the object and an area corresponding to the background of the object.

In an embodiment of the disclosure, the input image LFIM may be an image obtained by photographing a plurality of objects. The distances between the respective objects and the cameras may be different from each other. The first area of the input image LFIM may correspond to one of the objects, and the second area of the input image LFIM may correspond to another one of the objects.

In an embodiment of the disclosure, the input image LFIM may include a plurality of view images SIM. Each of the view images SIM is an image obtained by a plurality of cameras that photograph an object. The view images SIM may be images respectively obtained by a plurality of cameras that photograph an object from different views. In an embodiment of the disclosure, the view images SIM may include images obtained by photographing an object with cameras located on at least one of a front side, an upper side, a lower side, a right side, or a left side with respect to the front of the object.

In an embodiment of the disclosure, a front view image obtained from a camera that photographs an object from the front of the object includes a front image of the object. In an embodiment of the disclosure, a first side view image obtained from a camera that photographs an object from a first side of the object includes an image of the front side of the object and the first side of the object. In an embodiment of the disclosure, a second side view image obtained from a camera that photographs an object from a second side of the object includes an image of the front side of the object and the second side of the object.

In an embodiment of the disclosure, the first side view image may be an image obtained by photographing an object with a camera located on the left side with respect to the front of the object. In an embodiment of the disclosure, the second side view image may be an image obtained by photographing an object with a camera located on the right side with respect to the front of the object. However, the disclosure is not limited thereto. The first side view image may be an image obtained by photographing an object with a camera located on the upper side with respect to the front of the object. In an embodiment of the disclosure, the second side view image may be an image obtained by photographing an object with a camera located on the lower side with respect to the front of the object.

Also, in an embodiment of the disclosure, the view images SIM may further include an image obtained by photographing an object with a camera located on the left side of the camera from which the first side view image is obtained, with respect to the front of the object. The view images SIM may further include an image obtained by photographing an object with a camera located on the right side of the camera from which the second side view image is obtained, with respect to the front of the object. The view images SIM may further include an image obtained by photographing an object with a camera located on the upper side of the camera from which the first side view image is obtained, with respect to the front of the object. The view images SIM may further include an image obtained by photographing an object with a camera located on the lower side of the camera from which the second side view image is obtained, with respect to the front of the object.

Hereinafter, for convenience of explanation, the first side view image is defined as the image obtained by photographing the object with the camera located on the left side with respect to the front of the object, and the second side view image is defined as the image obtained by photographing the object with the camera located on the right side with respect to the front of the object.

In an embodiment of the disclosure, the view images SIM may each include a plurality of areas. In an embodiment of the disclosure, the view images SIM may each include a first area having a first depth value and a second area having a second depth value. In an embodiment of the disclosure, when the view of the camera that photographs the object changes, the positions of the first area and the second area included in each of the view images SIM may change. In an embodiment of the disclosure, the first area and the second area included in the first side view image may be located on a relatively left side, compared to the first area and the second area included in the front view image.

In an embodiment of the disclosure, the degrees of change in positions of the first and second areas included in each of the view images SIM according to a change in the view of the camera that photographs the object may be different from each other. In an embodiment of the disclosure, a change in the positions of the first and second areas included in each of the view images SIM according to a change in the view of the camera that photographs the object may vary according to the depth value of each of the first and second areas.

In an embodiment of the disclosure, a change in the positions of the first and second areas according to a change in the view of the camera that photographs the object may be inversely proportional to the magnitude of the depth value of each of the first and second areas.

In an embodiment of the disclosure, when the view of the camera that photographs the object changes, a change in the position of the object area close to the camera is smaller than a change in the position of the object area far from the camera. Therefore, when the view of the camera that photographs the object changes, a change in a position of an area with a relatively large depth value may be smaller than a change in a position of an area with a relatively small depth value. In an embodiment of the disclosure, when the view of the camera that photographs the object changes, a change in the position of the second area with the second depth value may be smaller than a change in the position of the first area with the first depth value less than the second depth value.

In an embodiment of the disclosure, the position difference between areas respectively included in two adjacent view images and having the same depth value may be defined as image disparity. In an embodiment of the disclosure, the image disparity may be defined as the position difference between pixels included in areas respectively included in two adjacent view images and having the same depth value.

In an embodiment of the disclosure, the position difference between the first area included in the front view image and the first area included in the first side view image may be defined as first image disparity. In an embodiment of the disclosure, the position difference between the second area included in the front view image and the second area included in the first side view image may be defined as second image disparity.

In an embodiment of the disclosure, the image disparity may be determined based on the distance between the object and the cameras, the focal lengths of the cameras, and the depth value of the corresponding area. In an embodiment of the disclosure, the magnitude of the image disparity may be proportional to the distance between the object and the cameras and the focal lengths of the cameras. In an embodiment of the disclosure, the magnitude of the image disparity may be inversely proportional to the depth value of the corresponding area.

In an embodiment of the disclosure, the first image disparity may be determined based on the distance between the first object area and the cameras, the focal lengths of the cameras, and the first depth value. In an embodiment of the disclosure, the second image disparity may be determined based on the distance between the second object area and the cameras, the focal lengths of the cameras, and the second depth value.

In an embodiment of the disclosure, as the depth value of the area decreases, the image disparity of the area increases. In an embodiment of the disclosure, the first image disparity may be greater than the second image disparity.

In an embodiment of the disclosure, when the view difference between the front view image and the first side view image is equal to the view difference between the front view image and the second side view image, the position difference between the first areas respectively included in the front view image and the second side view image may also be defined as the first image disparity. In an embodiment of the disclosure, the position difference between the second areas respectively included in the front view image and the second side view image may also be defined as the second image disparity.

In an embodiment of the disclosure, the position differences between the first and second areas included in the two adjacent view images among the view images SIM may be defined as the first image disparity and the second image disparity, respectively.

In an embodiment of the disclosure, the view images SIM may each include three or more areas having different depth values from each other. In an embodiment of the disclosure, the position differences between the three or more areas included in the two adjacent view images may be defined as three or more image disparities, respectively.

In an embodiment of the disclosure, the training distance information $TD_n$ may include a training distance determined based on the distance between the base panel 210 and the layer panel 220. In an embodiment of the disclosure, the training distance information $TD_n$ may include a training distance randomly selected between a first reference distance (see $d_1$ of FIG. 5A) and a second reference distance (see $d_4$ of FIG. 6A) greater than the first reference distance $d_1$.

In an embodiment of the disclosure, the training distance information $TD_n$ is information for training the change measuring module 340 and the sub-image generating module 350 according to the distance between the base panel 210 and the layer panel 220 included in the display panel 200.

In an embodiment of the disclosure, the electronic apparatus 100 may repeat the process of training the change measuring module 340 and the sub-image generating module 350 based on the input image LFIM and the training distance information $TD_n$ including the training distance randomly selected between the first reference distance $d_1$ and the second reference distance $d_4$. The change measuring module 340 and the sub-image generating module 350, which are trained through the above process, may operate corresponding to the base panel 210 and the layer panel 220 disposed on the display panel 200 at an interval corresponding to any one distance between the first reference distance $d_1$ and the second reference distance $d_4$. The training distance information $TD_n$ and the training distance will be described below in the description of FIGS. 5A to 6C.

In an embodiment of the disclosure, the at least one processor 400 may pre-process the input image LFIM by executing the instructions or program code of the pre-processing module 330. In an embodiment of the disclosure, when the input image LFIM includes the view images SIM, the at least one processor 400 may pre-process the view images SIM by executing the instructions or program code of the pre-processing module 330. In an embodiment of the disclosure, the at least one processor 400 may remove noise included in the input image LFIM by executing the instructions or program code of the pre-processing module 330.

In an embodiment of the disclosure, the at least one processor 400 may execute the instructions or program code of the change measuring module 340 to obtain a change flow based on the input image LFIM and the training distance information $TD_n$. In an embodiment of the disclosure, the change flow may include information for determining the degree to which the image warping module 360 to be described below warps the input image LFIM. In an embodiment of the disclosure, the at least one processor 400 may execute the instructions or program code of the change measuring module 340 to obtain a change flow based on the pre-processed input image and the training distance information $TD_n$. Because the pre-processed input image has no noise and the like, the accuracy of the change flow obtained by the change measuring module 340 may be improved.

In an embodiment of the disclosure, the change flow may include information for determining the degree to which the image warping module 360 warps the input image LFIM in order to generate the sub-images LIM to be respectively displayed on the base panel 210 and the layer panel 220 arranged at the same distance as the training distance included in the training distance information $TD_n$.

In an embodiment of the disclosure, the at least one processor 400 may execute the instructions or program code of the change measuring module 340 to obtain image disparity, which is information about the position difference between the areas included in the view images SIM according to a change in the view of the camera, based on two view images obtained from an adjacent view among the view images SIM included in the input image LFIM. In an embodiment of the disclosure, the at least one processor 400 may execute the instructions or program code of the change measuring module 340 to obtain the first image disparity of the first area and the second image disparity of the second area included in the view images SIM.

In an embodiment of the disclosure, the at least one processor 400 may execute the instructions or program code of the change measuring module 340 to obtain the depth value of each area based on the fact that the distance between the object and the cameras and the focal lengths of the cameras are constant and the magnitude of the depth value of each area is inversely proportional to the image disparity of each area.

In an embodiment of the disclosure, the at least one processor 400 may execute the instructions or program code of the change measuring module 340 to obtain the first depth value of the first area included in the input image LFIM, based on the first image disparity. In an embodiment of the disclosure, the at least one processor 400 may execute the instructions or program code of the change measuring module 340 to obtain the second depth value of the second area included in the input image LFIM, based on the second image disparity.

In an embodiment of the disclosure, the at least one processor 400 may execute the instructions or program code of the change measuring module 340 to obtain a change flow based on the training distance information $TD_n$ and the depth value of the input image LFIM. In an embodiment of the disclosure, the at least one processor 400 may obtain a change flow including information about the degree of warping of the input image LFIM in order to generate a layer image to be clearly displayed on the layer panel 220 spaced apart from the base panel 210 by the training distance, based on the first depth value, the second depth value, and the training distance included in the training distance information $TD_n$.

In an embodiment of the disclosure, the image warping module 360 may include instructions or program code related to an operation or function of warping the input image LFIM. In an embodiment of the disclosure, the at least one processor 400 may execute the instructions or program code of the image warping module 360 to warp the input image LFIM. In an embodiment of the disclosure, the at least one processor 400 may execute the instructions or program code of the image warping module 360 to warp the input image LFIM based on the change flow.

In an embodiment of the disclosure, the at least one processor 400 may execute the instructions or program code of the image warping module 360 to warp the remaining view images other than the front view image, based on the change flow. In an embodiment of the disclosure, the at least one processor 400 may execute the instructions or program code of the image warping module 360 to warp the remaining view images other than the front view image and change the image disparities of the areas respectively included in the front view image and the remaining view images.

In an embodiment of the disclosure, the at least one processor 400 may execute the instructions or program code of the image warping module 360 to warp the remaining view images other than the front view image among the view images SIM and change the depth values and the image disparities of the first area and the second area included in the view images.

In an embodiment of the disclosure, the at least one processor 400 may execute the instructions or program code of the sub-image generating module 350 to generate the sub-image LIM based on the pre-processed input image. In an embodiment of the disclosure, when the pre-processing module 330 is not included in the memory 300, the at least one processor 400 may execute the instructions or program code of the sub-image generating module 350 to generate the sub-image LIM based on the input image LFIM.

In an embodiment of the disclosure, the sub-image LIM may include a plurality of sub-layer images SLIM. In an embodiment of the disclosure, the sub-image generating module 350 may receive information about the number of sub-panels included in the display panel 200. The at least one processor 400 may execute the instructions or program code of the sub-image generating module 350 to generate the sub-layer images SLIM corresponding to the sub-panels. The sub-layer images SLIM include a base image to be displayed on the base panel 210 and a layer image to be displayed on the layer panel 220.

Although FIGS. 1 and 3 illustrate that the display panel 200 includes one layer panel 220, the disclosure is not limited thereto. The display panel 200 may include one base panel 210 and two or more layer panels. The layer panel 220 described in an embodiment of the disclosure may refer to a layer panel closest to the user 110 among one or more layer panels included in the display panel 200. In addition, the layer image displayed on the layer panel 220 may refer to a sub-layer image displayed on a layer panel closest to the user 110 among the sub-layer images displayed on the one or more layer panels.

In an embodiment of the disclosure, the at least one processor 400 may execute the instructions or program code of the sub-image generating module 350 to perform factorization to generate the layer image LIM from the pre-processed input image.

In an embodiment of the disclosure, the at least one processor 400 may execute the instructions or program code of the sub-image generating module 350 to perform factorization to generate the sub-layer images SLIM from the pre-processed input image.

In an embodiment of the disclosure, the sub-image LIM is an image displayed on the display panel 200 in order to provide the user (see 110 of FIG. 1) with the output image 120 that provides a three-dimensional effect. In an embodiment of the disclosure, the electronic apparatus 100 displays the sub-layer images SLIM on the sub-panels 210 and 220 included in the display panel 200. The electronic apparatus 100 may provide, to the user 110 located in the same view as the cameras capturing the view images SIM, the output image 120 that reproduces the view image corresponding to each view. In an embodiment of the disclosure, the electronic apparatus 100 may display the base image on the base panel 210 and display the layer image on the layer panel 220 so as to provide the output image 120 that reproduces the view image corresponding to the view in which the user 110 is located.

In an embodiment of the disclosure, the simulation module 380 may include instructions or program code related to an operation or function of, when the sub-image LIM is displayed on the display panel 200, performing a simulation for generating the output image 120 to be provided to the user 110. In an embodiment of the disclosure, the at least one processor 400 may execute the instructions or program code of the simulation module 380 to, when the sub-image LIM is displayed on the display panel 200, perform a simulation for generating the output image 120 to be provided to the user 110. In an embodiment of the disclosure, the at least one processor 400 may execute the instructions or program code of the simulation module 380 to, when the base image is displayed on the base panel 210 and the layer image is displayed on the layer panel 220, perform a simulation for generating the output image 120 to be provided to the user 110.

In an embodiment of the disclosure, the simulation module 380 may receive information about the number of sub-panels included in the display panel 200, the interval between the sub-panels, and the like. In an embodiment of the disclosure, the simulation module 380 may receive information indicating that the base panel 210 and the layer panel 220 are included in the display panel 200, distance information about the distance between the base panel 210 and the layer panel 220, and the like. In an embodiment of the disclosure, the simulation module 380 may receive the training distance included in the training distance information $TD_n$.

In an embodiment of the disclosure, the at least one processor 400 may execute the instructions or program code of the simulation module 380 to, when the distance between the base panel 210 and the layer panel 220 is the training distance, perform a simulation for generating a training image TIM to be provided to the user 110 located in the same view as the views of the cameras from which the electronic apparatus 100 obtains the input image LFIM. In an embodiment of the disclosure, the training image TIM may include a plurality of sub-training images TSIM. In an embodiment of the disclosure, the sub-training images TSIM may each be an image that the electronic apparatus 100 provides to the user 110 located in different views. In an embodiment of the disclosure, the sub-training images TSIM respectively correspond to the view images SIM obtained by the camera in the same view as the view in which the user 110 is located.

In an embodiment of the disclosure, the change measuring module 340 may receive the training image TIM generated by the simulation module 380. In an embodiment of the disclosure, the at least one processor 400 may execute the instructions or program code of the change measuring module 340 to obtain a change flow for determining the degree of warping of the input image LFIM with respect to the training image TIM. In an embodiment of the disclosure, the change measuring module 340 may be trained based on a loss function of obtaining a loss value based on the difference between the input image LFIM and the training image TIM. In an embodiment of the disclosure, the change measuring module 340 may be trained based on a loss function of obtaining a loss value based on the difference between the pre-processed input image and the training image TIM.

In an embodiment of the disclosure, the change measuring module 340 may be trained so that the loss value decreases based on the loss function. The change measuring module 340 may be trained so that the difference between the input image LFIM or the pre-processed input image and the training image TIM is reduced. The change measuring module 340 may be trained to generate a change flow so that the difference between the input image LFIM or the pre-processed input image and the training image TIM is reduced. The weight of the change measuring module 340 may be updated so that the difference between the input image LFIM or the pre-processed input image and the training image TIM is reduced. In an embodiment of the disclosure, the change measuring module 340 may be trained to change the degree to which the image warping module 360 warps the input image LFIM, so that the difference between the input image LFIM or the pre-processed input image and the training image TIM is reduced.

FIG. 4 illustrates that the change measuring module 340 performs the operation of calculating the loss function, which is the difference between the input image LFIM or the pre-processed input image and the training image TIM, and the operation of performing training so as to minimize the loss value of the loss function. However, the disclosure is not limited thereto, and a module that calculates the loss function, which is the difference between the input image LFIM or the pre-processed input image and the training image TIM, and a module that is trained to generate the change flow for minimizing the loss value of the loss function may be separately included in the memory 300.

In an embodiment of the disclosure, the loss calculating module 370 may include instructions or program code related to an operation or function of updating the weight of the sub-image generating module 350 based on the loss function of obtaining the loss value based on the difference between the warped input image and the training image TIM. In an embodiment of the disclosure, the at least one processor 400 may execute the instructions or program code of the loss calculating module 370 to calculate the loss value based on the difference between the warped input image and the training image TIM. In an embodiment of the disclosure, the at least one processor 400 may execute the instructions or program code of the loss calculating module 370 to calculate the loss value based on the difference between the depth value or image disparity of each area included in the warped input image and the depth value or image disparity of each area included in the training image TIM.

In an embodiment of the disclosure, the sub-image generating module 350 may update the weight based on the loss value calculated by the loss calculating module 370. In an embodiment of the disclosure, the sub-image generating module 350 may be trained so that the loss value calculated by the loss calculating module 370 decreases. In an embodiment of the disclosure, the sub-image generating module 350 may be trained so that the difference between the warped input image and the training image TIM generated through the simulation based on the sub-image LIM is reduced. In an embodiment of the disclosure, the sub-image generating module 350 may be trained to generate the sub-image LIM so that the training image TIM similar to the warped input image is obtained when the simulation module 380 performs the simulation.

FIG. 4 illustrates that the loss calculating module 370 and the sub-image generating module 350 are configured as separate modules. However, the disclosure is not limited thereto, and the operation of the loss calculating module 370 and the operation of the sub-image generating module 350 may be performed in one module.

In an embodiment of the disclosure, through the training of the change measuring module 340 and the sub-image generating module 350, the at least one processor 400 may perform warping to display the input image LFIM, including the areas having various depth values, on the base panel 210 and the layer panel 220 spaced apart from the base panel 210 by the same distance as the training distance.

In an embodiment of the disclosure, through the training of the change measuring module 340 and the sub-image generating module 350, the at least one processor 400 may generate the sub-image LIM based on the input image LFIM or the pre-processed input image, so that the electronic apparatus 100 may provide, to the user 110, the output image 120 that reproduces the warped input image.

Figure 5A:
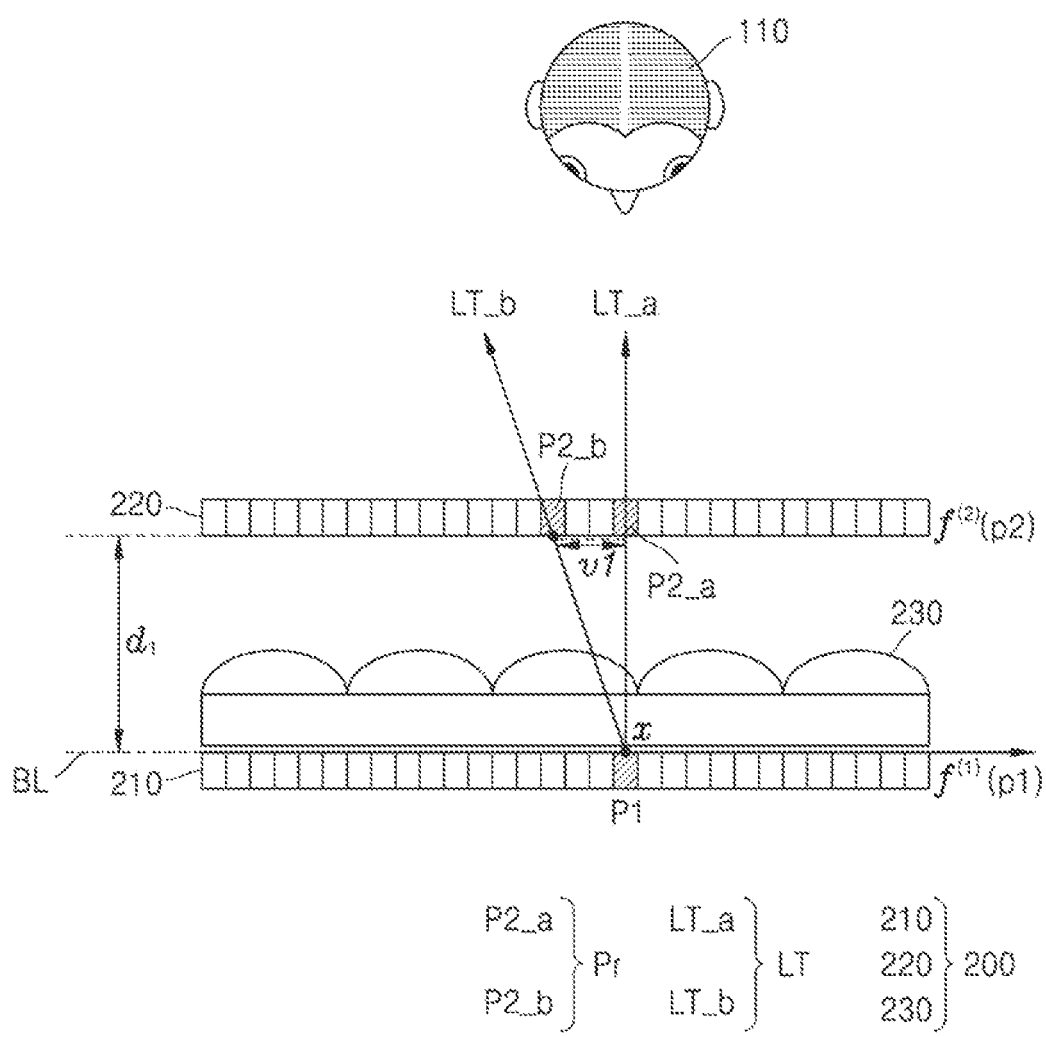
FIG. 5A is a diagram for describing an operation of an electronic apparatus, according to an embodiment of the disclosure.

FIG. 5A is a diagram for describing an operation of an electronic apparatus, according to an embodiment of the disclosure. Hereinafter, the same elements as those described with reference to FIGS. 3 and 4 are denoted by the same reference numerals, and descriptions thereof are omitted.

FIG. 5A illustrates that a display panel 200 includes a base panel 210, a layer panel 220, and an optical layer 230. However, the disclosure is not limited thereto, and the display panel 200 may further include a backlight (see backlight 240 of FIG. 3) and a plurality of sub-panels.

In an embodiment of the disclosure, the optical layer 230 is disposed above the base panel 210. The layer panel 220 is disposed above the optical layer 230. In an embodiment of the disclosure, the display panel 200 may further include the backlight 240 disposed below the base panel 210.

In an embodiment of the disclosure, the base panel 210 and the layer panel 220 may be included in the display panel 200 while being spaced apart at different distances from each other.

In an embodiment of the disclosure, when the position of the base panel 210 is referred to as a reference line BL, the layer panel 220 may be located at a first reference distance $d_1$ from the reference line BL. In an embodiment of the disclosure, when a line parallel to the upper surface of the base panel 210 is referred to as the reference line BL, the lower surface of the layer panel 220 may be spaced apart from the reference line BL by the first reference distance $d_1$.

In an embodiment of the disclosure, the first reference distance $d_1$ may be a distance corresponding to the closest distance among the distances between the base panel 210 and the layer panel 220 that may be included in the display panel 200. In an embodiment of the disclosure, a second reference distance (see $d_4$ of FIG. 6A) to be described below may be a distance corresponding to the farthest distance among the distances between the base panel 210 and the layer panel 220 that may be included in the display panel 200.

In an embodiment of the disclosure, the base panel 210 and the layer panel 220 may each include a plurality of color filters. In an embodiment of the disclosure, the light LT provided from the backlight 240 may be provided to the user 110 through a first color filter P1, which is one of the color filters included in the base panel 210, and a second color filter P2, which is one of the color filters included in the layer panel 220.

In an embodiment of the disclosure, a combination of one color filter included in the base panel 210 and one color filter included in the layer panel 220, through which the light LT provided from the backlight 240 passes, may vary depending on the position of the user 110.

In an embodiment of the disclosure, light LT_a provided to the user 110 when the user 110 is located in the front of the electronic apparatus (see 100 of FIG. 1) may be defined as first light LT_a. Light LT_b provided to the user 110 when the user 110 is located on the side of the electronic apparatus 100 may be defined as second light LT_b.

In an embodiment of the disclosure, the second color filter P2 through which the light LT passing through the first color filter P1 passes may vary depending on the position of the user 110. The second color filter P2 may include a first sub-color filter P2_a through which the first light LT_a passes and a second sub-color filter P2_b through which the second light LT_b passes.

In an embodiment of the disclosure, when the user 110 is located in front of the electronic apparatus 100, the first light LT_a passing through the first color filter P1 passes through the first sub-color filter P2_a. When the user 110 is located on the side of the electronic apparatus 100, the second light LT_b passing through the first color filter P1 passes through the second sub-color filter P2_a.

In an embodiment of the disclosure, the luminance of the light LT provided to the user 110 may be determined by the transmittances of the first color filter P1 and the second color filter P2, through which the light LT passes. In an embodiment of the disclosure, when the transmittance of the first color filter P1 is $f^1(P1)$ and the transmittance of the second color filter P2 is $f^2(P2)$, the luminance of the light LT provided to the user 110 through the first color filter P1 and the second color filter P2 may be determined to correspond to $f^1(P1) \times f^2(P2)$.

In an embodiment of the disclosure, the luminance of the first light LT_a provided to the user 110 may be determined by the transmittance of the first color filter P1 and the transmittance of the first sub-color filter P2_a. The luminance of the second light LT_b provided to the user 110 may be determined by the transmittance of the first color filter P1 and the transmittance of the second sub-color filter P2_b. In an embodiment of the disclosure, the transmittance of the first sub-color filter P2_a may be different from the transmittance of the second sub-color filter P2_b. Accordingly, the luminance of the light provided to the user 110 may vary depending on the position of the user 110.

In an embodiment of the disclosure, the wavelength of the light LT provided to the user 110 may be determined by the colors of the first color filter P1 and the second color filter P2, through which the light LT passes. In an embodiment of the disclosure, the wavelength of the first light LT_a provided to the user 110 may be determined by the colors of the first color filter P1 and the first sub-color filter P2_a, through which the first light LT_a passes. In an embodiment of the disclosure, the wavelength of the second light LT_b provided to the user 110 may be determined by the colors of the first color filter P1 and the second sub-color filter P2_b, through which the second light LT_b passes. In an embodiment of the disclosure, the color of the first sub-color filter P2_a may be different from the color of the second sub-color filter P2_b. Accordingly, the wavelength of the light provided to the user 110 may vary depending on the position of the user 110.

Because the luminances and/or the wavelengths of the first light LT_a and the second light LT_b provided according to the position of the user 110 are different from each other, the user 110 may feel a three-dimensional effect of the object included in the output image (see output image 120 of FIG. 1) displayed by the electronic apparatus 100.

In an embodiment of the disclosure, the layer panel 220 is disposed on the upper surface of the base panel 210, and thus, the layer panel 220 is closer to the user 110 than the base panel 210. In an embodiment of the disclosure, the positions of the first and second sub-color filters P2_a and P2_b included in the layer panel 220 through which the first light LT_a and the second light LT_b pass may be changed according to a change in the view of the user 110, and the position of the first color filter P1 included in the base panel 210 may not be changed. Also, the user 110 may see the base panel 210 through the layer panel 220. Accordingly, as the layer image displayed on the layer panel 220 is clearly displayed, the visibility of the user 110 may be improved. As a layer area that is clearly displayed in the layer image displayed on the layer panel 220 is wide, the visibility of the user 110 may be improved. In an embodiment of the disclosure, the magnitude of a change in the position of the color filter included in the layer panel 220 through which the light LT passes according to a change in the view of the user 110 may vary depending on the distance between the base panel 210 and the layer panel 220. In an embodiment of the disclosure, as the distance between the base panel 210 and the layer panel 220 increases, the magnitude of a change in the position of the color filter included in the layer panel 220 through which the light LT passes according to a change in the view of the user 110 may increase.

In an embodiment of the disclosure, the position of the user 110 receiving the first light LT_a and the position of the user 110 receiving the second light LT_b may be adjacent to each other. In an embodiment of the disclosure, the difference between the view of the user 110 receiving the first light LT_a and the view of the user 110 receiving the second light LT_b may be the same as a change in the views of the cameras which photograph the two adjacent view images described above.

In an embodiment of the disclosure, the difference in the positions of the color filters of the layer panel 220 through which the light LT provided to the users 110 in the adjacent positions passes may be defined as pixel disparity. In an embodiment of the disclosure, the difference in the positions of the color filters of the layer panel 220 may vary depending on the distance between the base panel 210 and the layer panel 220. As the distance between the base panel 210 and the layer panel 220 increases, the pixel disparity may increase.

In an embodiment of the disclosure, the image disparity may refer to the difference in the positions of pixels included in areas having the same depth value in two adjacent view images. The difference in the positions of the pixels varies according to the magnitude of the depth value of the area.

In an embodiment of the disclosure, the layer image including areas having image disparity corresponding to pixel disparity may be displayed on the layer panel 220. In an embodiment of the disclosure, the layer image including an area having a depth value corresponding to pixel disparity may be displayed on the layer panel 220.

In an embodiment of the disclosure, when the layer image displayed on the layer panel 220 includes a plurality of layer areas having a plurality of depth values, a layer area of the layer image having image disparity corresponding to pixel disparity may be clearly displayed on the layer panel 220. In an embodiment of the disclosure, a layer area of the layer image having a depth value corresponding to pixel disparity may be clearly displayed on the layer panel 220. In an embodiment of the disclosure, the user 110 may clearly see a layer area having image disparity corresponding to pixel disparity among a plurality of layer areas displayed on the layer panel 220. In an embodiment of the disclosure, the user 110 may clearly see a layer area having the same image disparity as the pixel disparity of the layer panel 220 among a plurality of layer areas displayed on the layer panel 220. This is because a change in the positions of the pixels in the layer area displayed on the layer panel 220 according to a change in the position of the user 110 corresponds to a change in the position of the color filter of the layer panel 220.

In an embodiment of the disclosure, the pixel disparity of the layer panel 220 spaced apart from the base panel 210 by the first reference distance $d_1$ may be defined as first reference pixel disparity (v1).

In an embodiment of the disclosure, when the layer panel 220 is spaced apart from the base panel 210 by the first reference distance $d_1$, a layer area of a layer image having a depth value with image disparity corresponding to the first reference pixel disparity (v1) may be clearly provided to the user 110. A layer area of a layer image having a depth value with image disparity not corresponding to the first reference pixel disparity (v1) may be bluredly provided to the user 110.

In an embodiment of the disclosure, image disparity corresponding to the first reference pixel disparity (v1) may be defined as first reference image disparity. The layer area of the layer image that has the first reference image disparity may be clearly provided to the user 110, and the layer area of the layer image that does not have the first reference image disparity may be blurredly provided to the user 110.

In an embodiment of the disclosure, the depth value corresponding to the first reference image disparity may be defined as a first reference depth value. In an embodiment of the disclosure, the layer area of the layer image that has the first reference depth value may be clearly provided to the user 110, and the layer area of the layer image that does not have the first reference depth value may be blurredly provided to the user 110. However, the disclosure is not limited thereto. As the difference between the depth value of the layer area included in the layer image and the first reference depth value is smaller, the layer area provided to the user 110 may be clearly displayed on the layer panel 220.

Figure 5B:
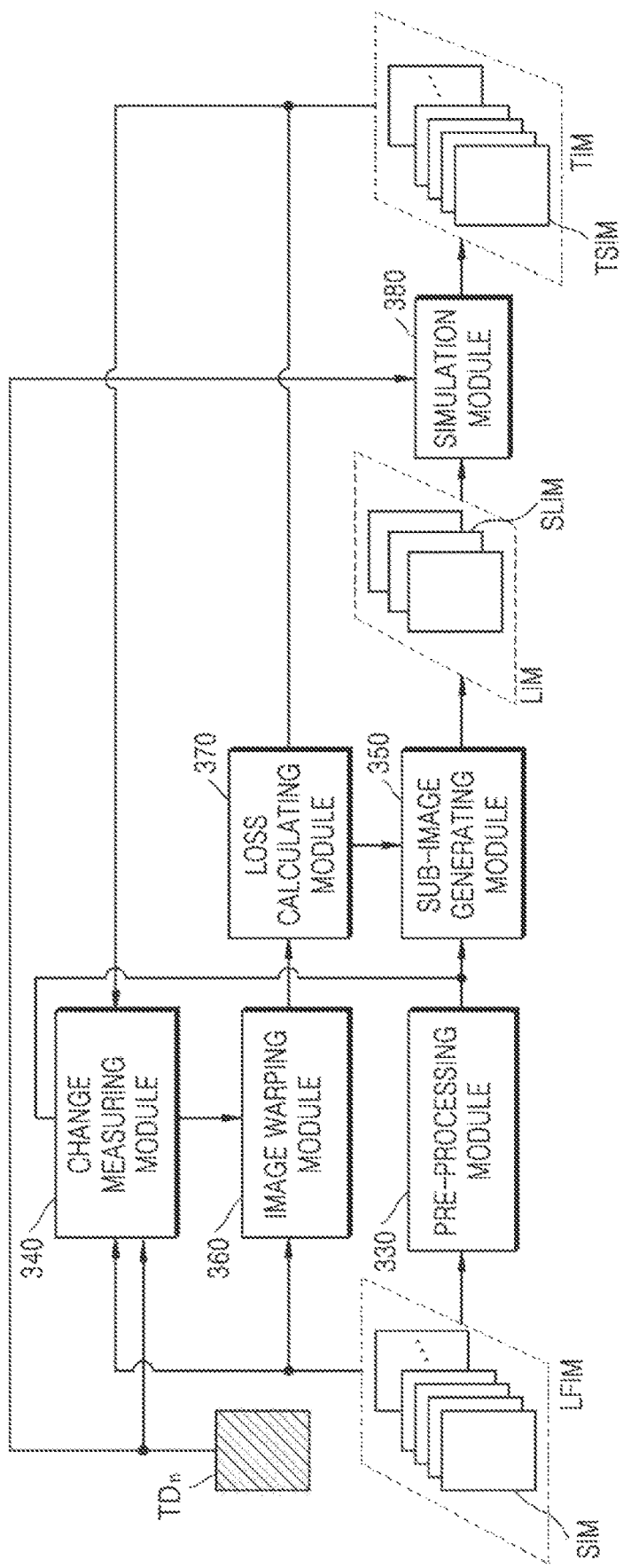
FIG. 5B is a diagram for describing a process of training a sub-image generating module, according to an embodiment of the disclosure.

FIG. 5B is a diagram for describing a process of training a sub-image generating module, according to an embodiment of the disclosure. FIG. 5C is a diagram for describing training distance information according to an embodiment of the disclosure.

Referring to FIGS. 5B and 5C, the input image LFIM and the first training distance information $TD_1$ including the training distance selected as the first reference distance $d_1$ may be provided as the training dataset for the training of the change measuring module 340 and the sub-image generating module 350. Hereinafter, the same elements as those described with reference to FIG. 4 are denoted by the same reference numerals, and descriptions thereof are omitted.

In an embodiment of the disclosure, the first training distance information $TD_1$ illustrated in FIG. 5C includes a plurality of training areas TAR. In an embodiment of the disclosure, the training areas TAR may be areas respectively corresponding to the areas included in the input image LFIM. Although FIG. 5C illustrates that the training areas TAR each have a rectangular shape, the disclosure is not limited thereto. The shape of the training areas TAR may include a round shape or the like. Also, although FIG. 5C illustrates that the first training distance information $TD_1$ includes 4×4 (=16) training areas, the disclosure is not limited thereto. The first training distance information $TD_1$ may include more or fewer training areas than the 16 training areas. Hereinafter, for convenience of explanation, it is assumed that the first training distance information $TD_1$ includes the 4×4 (=16) training areas TAR each having a rectangular shape.

In an embodiment of the disclosure, when the input image LFIM includes a first area having a first depth value and a second area having a second depth value that is different from the first depth value, the training distance information $TD_n$ may be information generated so that the same training distance corresponds to the first area and the second area. Referring to FIG. 5C, the training areas TAR included in the first training distance information $TD_1$ have a training distance selected as the first reference distance $d_1$. The first training distance information $TD_1$ may be information generated so that the first reference distance $d_1$ corresponds to at least one training area corresponding to the first area and the first reference distance $d_1$ corresponds to at least one training area corresponding to the second area.

In an embodiment of the disclosure, the first training distance information $TD_1$ may include distance information about the distance between the base panel 210 and the layer panel 220, which is provided to the simulation module 380. In an embodiment of the disclosure, when the first training distance information $TD_1$ is provided as the training dataset, the at least one processor 400 may execute the instructions or program code of the simulation module 380 to perform a simulation on the assumption that the distance information about the distance between the base panel 210 and the layer panel 220 is the first reference distance $d_1$.

In an embodiment of the disclosure, the at least one processor 400 may execute the instructions or program code of the change measuring module 340 to obtain a change flow based on the first training distance information $TD_1$ and the input image LFIM. The at least one processor 400 may execute the instructions or program code of the change measuring module 340 to obtain a change flow based on the first training distance information $TD_1$ and the pre-processed input image. The change flow may include information for determining the degree to which the image warping module 360 warps the input image LFIM in order to generate the sub-images LIM to be respectively displayed on the base panel 210 and the layer panel 220 arranged at the same distance as the first reference distance $d_1$ included in the first training distance information $TD_1$.

In an embodiment of the disclosure, the at least one processor 400 may execute the instructions or program code of the change measuring module 340 to control the degree to which the image warping module 360 warps the input image LFIM in order to sharpen the layer image to be displayed on the layer panel 220 having the first reference pixel disparity (v1). In an embodiment of the disclosure, this is because the at least one processor 400 executes the instructions or program code of the sub-image generating module 350 to generate the layer image so that the training image TIM similar to the warped input image is obtained.

In an embodiment of the disclosure, the at least one processor 400 may execute the instructions or program code of the change measuring module 340 to obtain a change flow for controlling the image warping module 360 so that the difference between the first depth value and the depth values of the areas included in the warped input image is reduced, based on the first training distance information $TD_1$ and the input image LFIM.

Therefore, through FIGS. 5B and 5C, the change measuring module 340 and the sub-image generating module 350 may be trained to generate the sub-image LIM based on the input image LFIM when the distance between the base panel 210 and the layer panel 220 is the first reference distance $d_1$. In an embodiment of the disclosure, the change measuring module 340 and the sub-image generating module 350 may be trained to warp the input image LFIM so that the difference between the first depth value and the depth values of the areas included in the input image LFIM is reduced and to generate the layer image to be clearly displayed on the layer panel 220 having the first reference pixel disparity (v1) based on the warped input image LFIM.

Figure 6A:
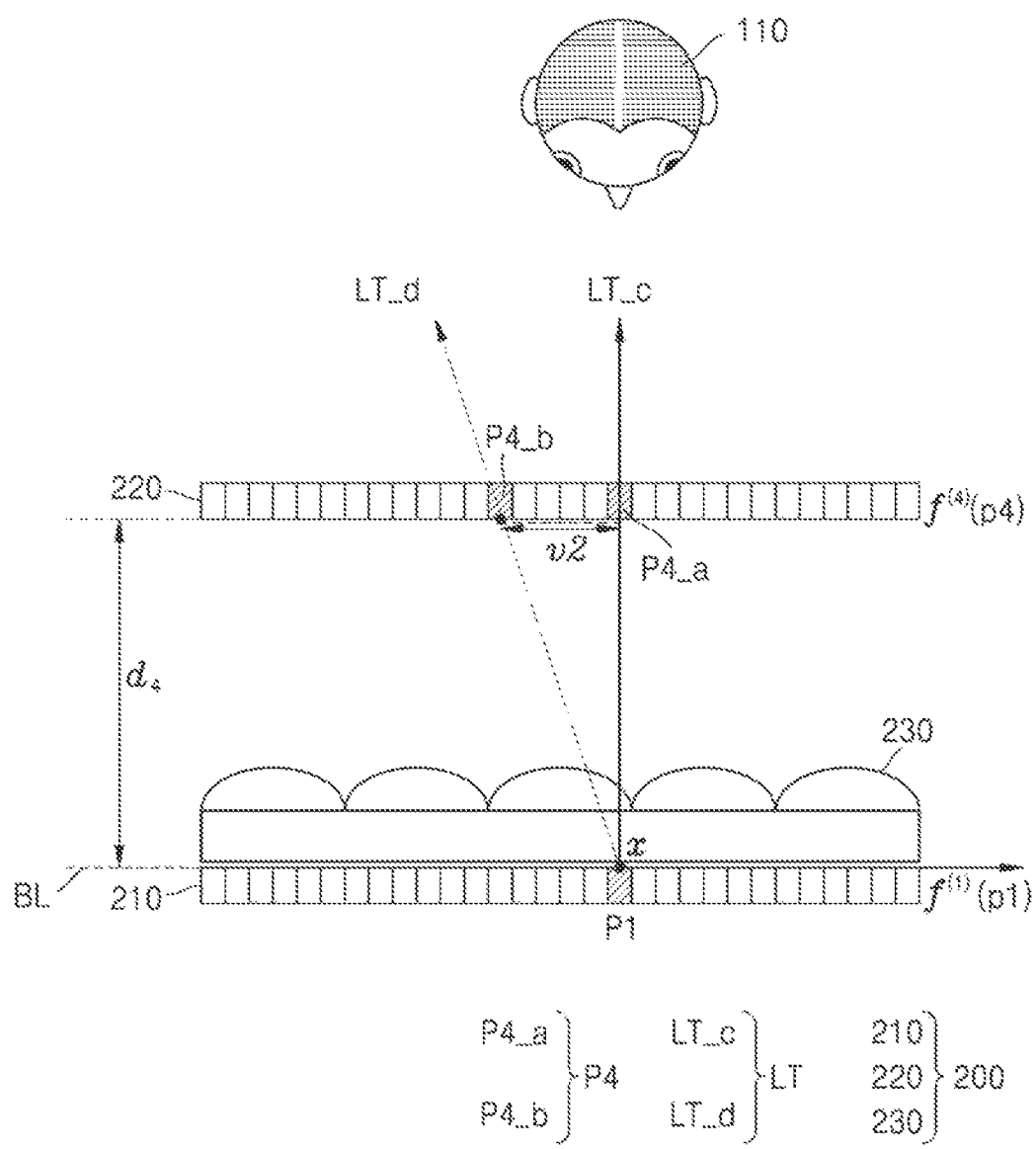
FIG. 6A is a diagram for describing an operation of an electronic apparatus, according to an embodiment of the disclosure.

FIG. 6A is a diagram for describing an operation of an electronic apparatus, according to an embodiment of the disclosure. Hereinafter, the same elements as those described with reference to FIG. 5A are denoted by the same reference numerals, and descriptions thereof are omitted.

FIG. 6A illustrates that a display panel 200 includes a base panel 210, a layer panel 220, and an optical layer 230.

In an embodiment of the disclosure, when the position of the base panel 210 is referred to as a reference line BL, the layer panel 220 may be located at a second reference distance $d_4$ from the reference line BL. In an embodiment of the disclosure, when a line parallel to the upper surface of the base panel 210 is referred to as the reference line BL, the lower surface of the layer panel 220 may be spaced apart from the reference line BL by the second reference distance $d_4$.

In an embodiment of the disclosure, the second reference distance $d_4$ may be a distance corresponding to the farthest distance among the distances between the base panel 210 and the layer panel 220 that may be included in the display panel 200.

In an embodiment of the disclosure, the base panel 210 and the layer panel 220 may each include a plurality of color filters. In an embodiment of the disclosure, the light LT provided from the backlight 240 may be provided to the user 110 through a first color filter P1, which is one of the color filters included in the base panel 210, and a third color filter P4, which is one of the color filters included in the layer panel 220.

In an embodiment of the disclosure, light LT_a provided to the user 110 when the user 110 is located in the front of the electronic apparatus (see 100 of FIG. 1) may be defined as third light LT_c. Light LT_b provided to the user 110 when the user 110 is located on the side of the electronic apparatus 100 may be defined as fourth light LT_d.

In an embodiment of the disclosure, the third color filter P4 through which the light LT passing through the first color filter P1 passes may vary depending on the position of the user 110. The third color filter P4 may include a third sub-color filter P4_a through which the third light LT_c passes and a fourth sub-color filter P4_b through which the fourth light LT_d passes.

In an embodiment of the disclosure, when the user 110 is located in front of the electronic apparatus 100, the third light LT_c passing through the first color filter P1 passes through the third sub-color filter P4_a. When the user 110 is located on the side of the electronic apparatus 100, the fourth light LT_d passing through the first color filter P1 passes through the fourth sub-color filter P4_b.

In an embodiment of the disclosure, the luminance of the third light LT_c provided to the user 110 may be determined by the transmittance of the first color filter P1 and the transmittance of the third sub-color filter P4_a. The luminance of the fourth light LT_d provided to the user 110 may be determined by the transmittance of the first color filter P1 and the transmittance of the fourth sub-color filter P4_b. In an embodiment of the disclosure, when the transmittance of the first color filter P1 is $f^1(P1)$ and the transmittance of the third color filter P4 is $f^4(P4)$, the luminance of the light LT provided to the user 110 through the first color filter P1 and the third color filter P4 may be determined to correspond to $f^1(P1) \times f^4(P4)$.

In an embodiment of the disclosure, the transmittance of the third sub-color filter P4_a may be different from the transmittance of the fourth sub-color filter P4_b. Accordingly, the luminance of the light provided to the user 110 may vary depending on the position of the user 110.

In an embodiment of the disclosure, the wavelength of the light LT provided to the user 110 may be determined by the colors of the first color filter P1 and the third color filter P3, through which the light LT passes. In an embodiment of the disclosure, the wavelength of the third light LT_c provided to the user 110 may be determined by the colors of the first color filter P1 and the third sub-color filter P4_a, through which the third light LT_c passes. In an embodiment of the disclosure, the wavelength of the fourth light LT_d provided to the user 110 may be determined by the colors of the first color filter P1 and the fourth sub-color filter P4_b, through which the fourth light LT_d passes. In an embodiment of the disclosure, the color of the third sub-color filter P4_a may be different from the color of the fourth sub-color filter P4_b. Accordingly, the wavelength of the light provided to the user 110 may vary depending on the position of the user 110.

Because the luminances and/or the wavelengths of the third light LT_c and the fourth light LT_d provided according to the position of the user 110 are different from each other, the user 110 may feel a three-dimensional effect of the object included in the output image (see 120 of FIG. 1) displayed by the electronic apparatus 100. Also, when compared with FIG. 5A, the transmittances or the wavelengths of the first sub-color filter P2_a and the third sub-color filter P4_a may be different from each other, and the transmittances or the wavelengths of the second sub-color filter P2_b and the fourth sub-color filter P4_b may be different from each other. Therefore, the layer image that may be displayed when the layer panel 220 is spaced apart from the base panel 210 by the first reference distance $d_1$ may be different from the layer image that may be displayed when the layer panel 220 is spaced apart from the base panel 210 by the second reference distance $d_4$.

In an embodiment of the disclosure, the pixel disparity of the layer panel 220 spaced apart from the base panel 210 by the second reference distance $d_4$ may be defined as second reference pixel disparity (v2)*. In an embodiment of the disclosure, the second reference pixel disparity (v2) may be $$\left(\frac{d_4}{d_1}\right)$$

time the first reference pixel disparity v1.

In an embodiment of the disclosure, when the layer panel 220 is spaced apart from the base panel 210 by the second reference distance $d_4$, a layer area of a layer image having a depth value with image disparity corresponding to the second reference pixel disparity (v2)* may be clearly provided to the user 110. A layer area of a layer image having a depth value with image disparity not corresponding to the second reference pixel disparity (v2) may be bluredly provided to the user 110.

In an embodiment of the disclosure, image disparity corresponding to the second reference pixel disparity (v2) may be defined as second reference image disparity. The layer area of the layer image that has the second reference image disparity may be clearly provided to the user 110, and the layer area of the layer image that does not have the second reference image disparity may be blurredly provided to the user 110. In an embodiment of the disclosure, the depth value corresponding to the second reference image disparity may be defined as a second reference depth value. In an embodiment of the disclosure, the layer area of the layer image that has the second reference depth value may be clearly provided to the user 110, and the layer area of the layer image that does not have the second reference depth value may be blurredly provided to the user 110. However, the disclosure is not limited thereto. As the difference between the depth value of the layer area included in the layer image and the second reference depth value is smaller, the layer area provided to the user 110 may become clearer.

Figure 6B:
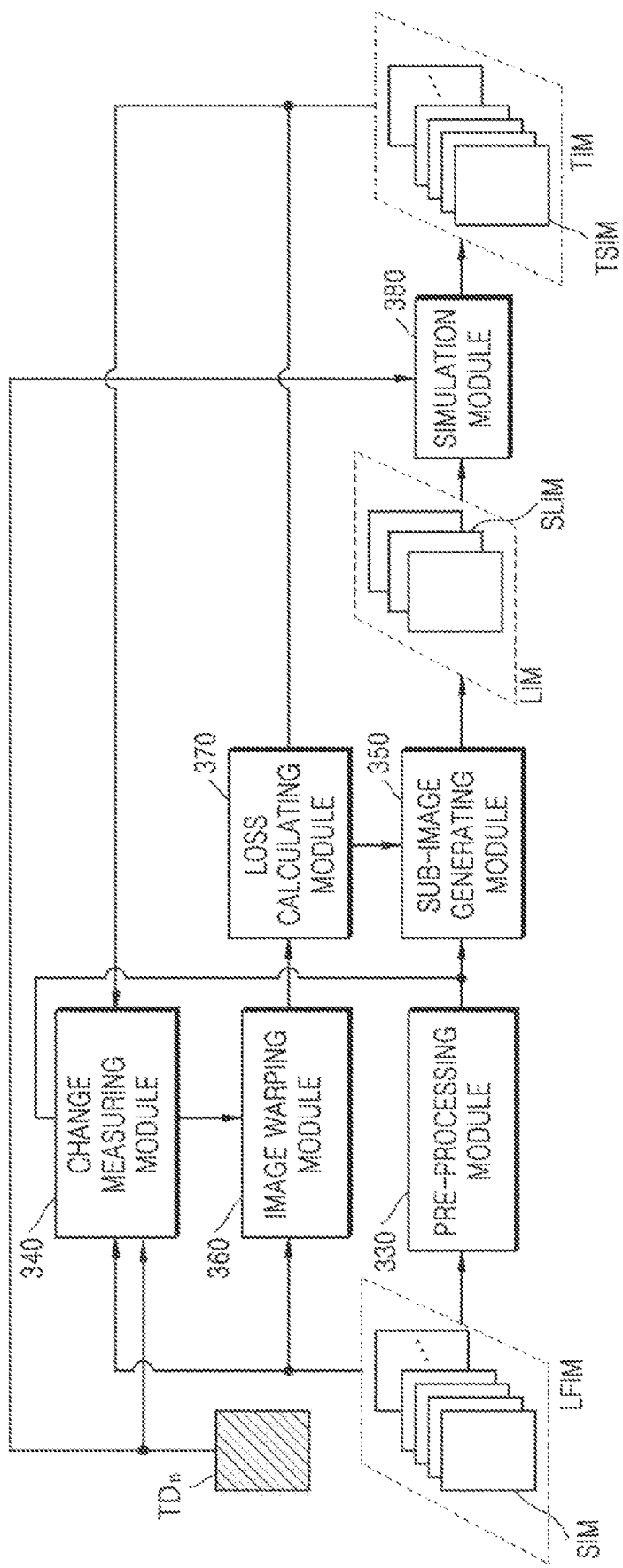
FIG. 6B is a diagram for describing a process of training a sub-image generating module, according to an embodiment of the disclosure.

FIG. 6B is a diagram for describing a process of training a sub-image generating module, according to an embodiment of the disclosure. FIG. 6C is a diagram for describing training distance information according to an embodiment of the disclosure.

Referring to FIGS. 6B and 6C, the input image LFIM and the second training distance information $TD_4$ including the training distance selected as the second reference distance $d_4$ may be provided as the training dataset for the training of the change measuring module 340 and the sub-image generating module 350. Hereinafter, the same elements as those described with reference to FIGS. 4, 5B, and 5C are denoted by the same reference numerals, and descriptions thereof are omitted.

In an embodiment of the disclosure, the second training distance information $TD_4$ illustrated in FIG. 6C includes a plurality of training areas TAR. In an embodiment of the disclosure, the training areas TAR may be areas respectively corresponding to the areas included in the input image LFIM. Referring to FIG. 6C, the training areas TAR included in the second training distance information $TD_4$ have a training distance selected as the second reference distance $d_4$. The second training distance information $TD_4$ may be information generated so that the second reference distance $d_4$ corresponds to at least one training area corresponding to the first area and at least one training area corresponding to the second area.

In an embodiment of the disclosure, the second training distance information $TD_4$ may include distance information about the distance between the base panel 210 and the layer panel 220, which is provided to the simulation module 380. In an embodiment of the disclosure, when the second training distance information $TD_4$ is provided as the training dataset, the at least one processor 400 may execute the instructions or program code of the simulation module 380 to perform a simulation on the assumption that the distance information about the distance between the base panel 210 and the layer panel 220 is the second reference distance $d_4$.

In an embodiment of the disclosure, the at least one processor 400 may execute the instructions or program code of the change measuring module 340 to obtain a change flow based on the second training distance information $TD_4$ and the input image LFIM. The at least one processor 400 may execute the instructions or program code of the change measuring module 340 to obtain a change flow based on the second training distance information $TD_4$ and the pre-processed input image. The change flow may include information for determining the degree to which the image warping module 360 warps the input image LFIM in order to generate the sub-images LIM to be respectively displayed on the base panel 210 and the layer panel 220 arranged at the same distance as the second reference distance $d_4$ included in the second training distance information $TD_4$.

In an embodiment of the disclosure, in order to sharpen the layer image LIM to be displayed on the layer panel 220 having the second reference pixel disparity (v2), the at least one processor 400 may execute the instructions or program code of the change measuring module 340 to control the degree to which the image warping module 360 warps the input image LFIM.

In an embodiment of the disclosure, the at least one processor 400 may execute the instructions or program code of the change measuring module 340 to obtain a change flow for controlling the image warping module 360 so that the difference between the second depth value and the depth values of the areas included in the warped input image is reduced, based on the second training distance information $TD_4$ and the input image LFIM.

Therefore, through FIGS. 6B and 6C, the change measuring module 340 and the sub-image generating module 350 may be trained to generate the layer image LIM based on the input image LFIM when the distance between the base panel 210 and the layer panel 220 is the second reference distance $d_4$. In an embodiment of the disclosure, the change measuring module 340 and the sub-image generating module 350 may be trained to warp the input image LFIM so that the difference between the second depth value and the depth values of the areas included in the input image LFIM is reduced and to generate the layer image to be clearly displayed on the layer panel 220 having the second reference pixel disparity (v2) based on the warped input image LFIM.

In an embodiment of the disclosure, referring to FIGS. 4 to 6C, the training distance information $TD_n$ may include a training distance randomly selected from the first reference distance $d_1$ to the second reference distance $d_4$. Accordingly, when the layer panel 220 is located at any one reference distance between the first reference distance $d_1$ and the second reference distance $d_4$ from the base panel 210, the change measuring module 340 and the sub-image generating module 350 may be trained to generate the sub-image based on the input image LFIM. When the layer panel 220 is located at any one reference distance between the first reference distance $d_1$ and the second reference distance $d_4$ from the base panel 210, the change measuring module 340 and the sub-image generating module 350 may be trained to generate the layer image to be displayed on the layer panel 220 based on the input image LFIM including a plurality of areas having a plurality of different depth values from each other.

In an embodiment of the disclosure, the change measuring module 340 and the sub-image generating module 350 may be trained to warp the input image LFIM so that the difference between the depth values of the areas included in the input image LFIM and the depth value corresponding to specific pixel disparity is reduced and to generate the layer image to be clearly displayed on the layer panel 220 having specific pixel disparity between the first reference pixel disparity (v1) and the second reference pixel disparity (v2) based on the warped input image LFIM.

Figure 7:
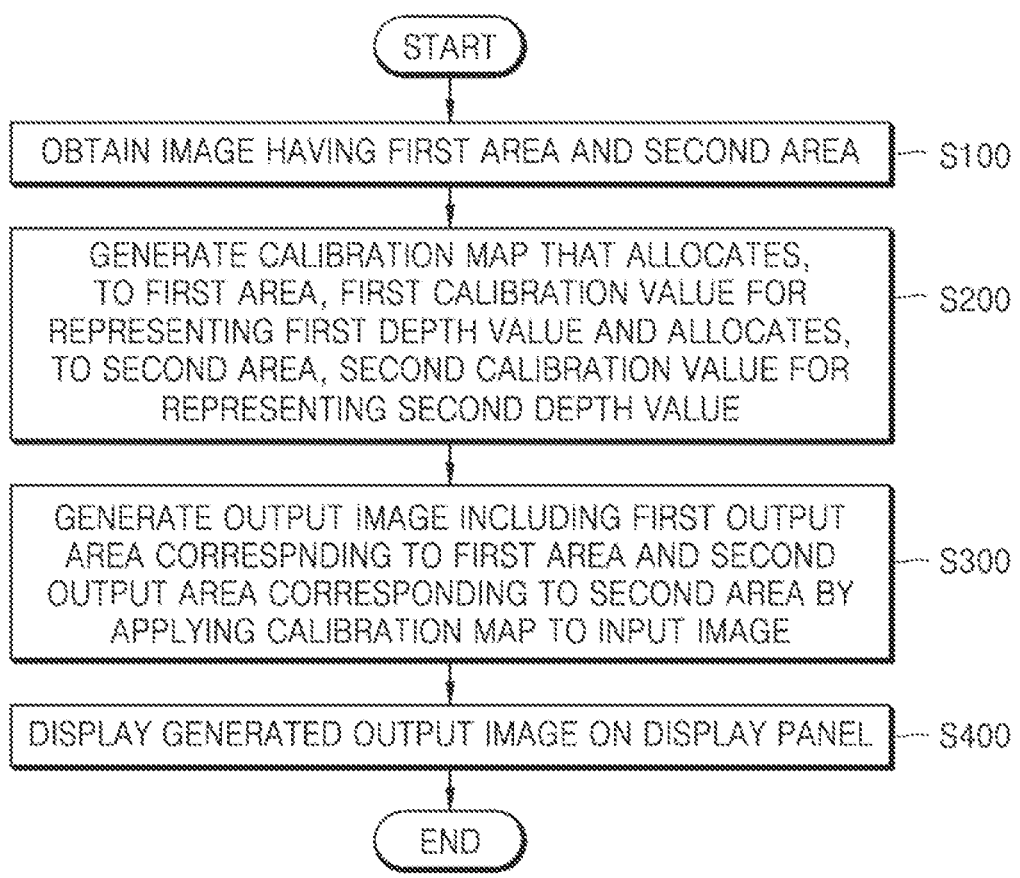
FIG. 7 is a flowchart for describing an operation of an electronic apparatus, according to an embodiment of the disclosure.
Figure 8:
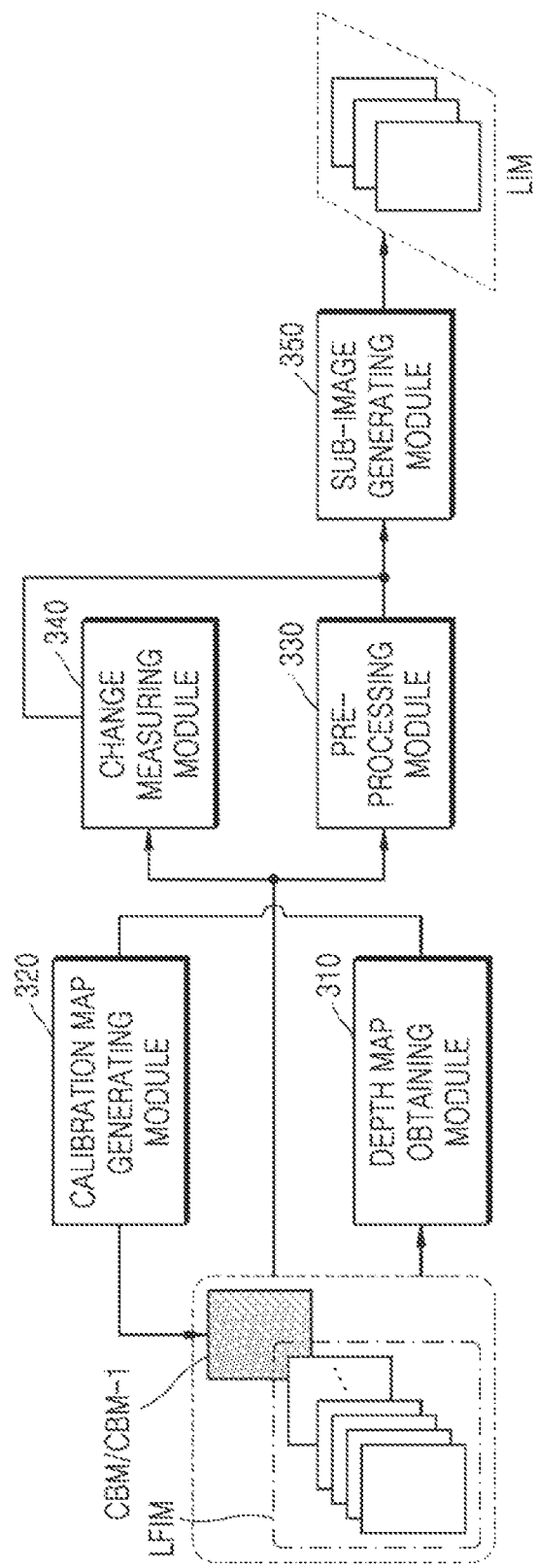
FIG. 8 is a diagram for describing an operation of an electronic apparatus, according to an embodiment of the disclosure.
Figure 9:
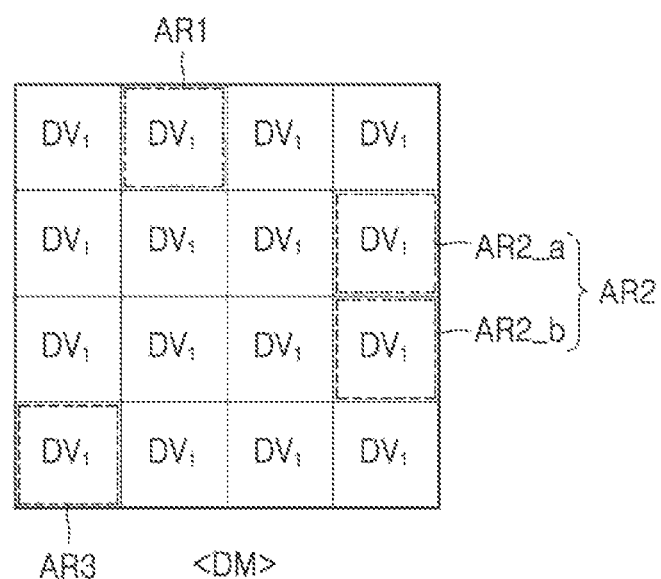
FIG. 9 is a diagram for describing a depth map according to an embodiment of the disclosure.
Figure 10:
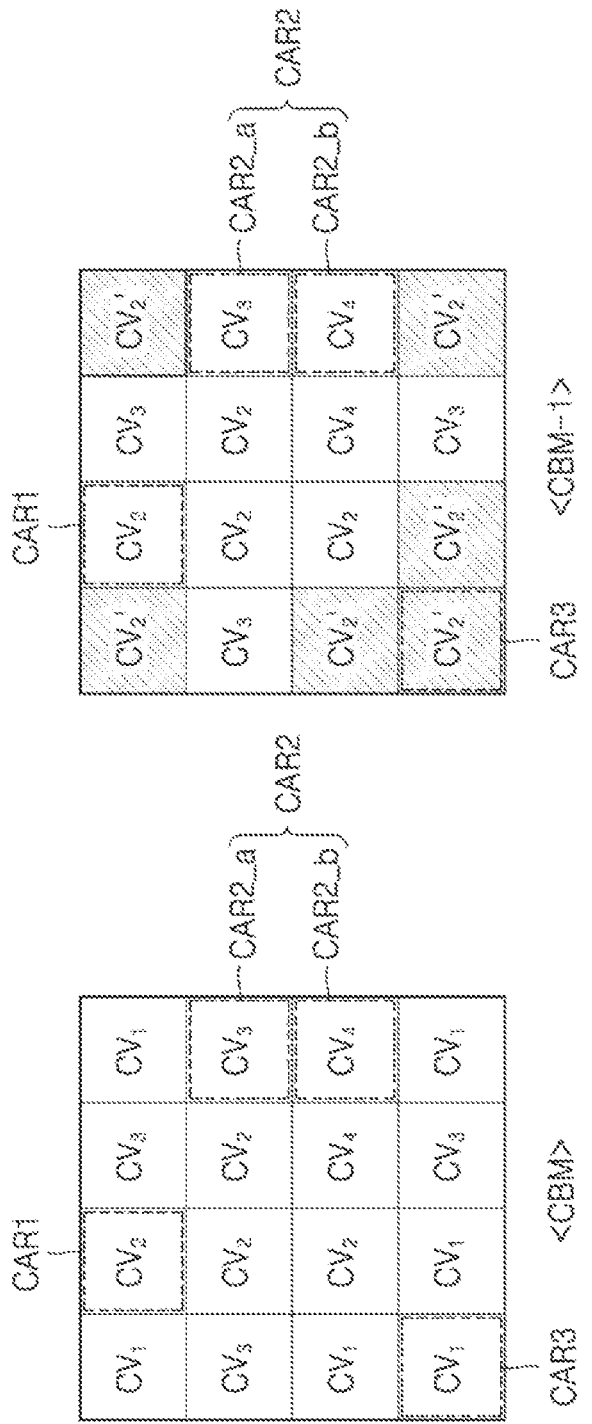
FIG. 10 is a diagram for describing a calibration map according to an embodiment of the disclosure.

FIG. 7 is a flowchart for describing an operation of an electronic apparatus, according to an embodiment of the disclosure. FIG. 8 is a diagram for describing the operation of the electronic apparatus, according to an embodiment of the disclosure. FIG. 9 is a diagram for describing a depth map according to an embodiment of the disclosure. FIG. 10 is a diagram for describing a calibration map according to an embodiment of the disclosure. Hereinafter, the same elements as those described with reference to FIG. 4 are denoted by the same reference numerals, and descriptions thereof are omitted. Also, it is assumed that the distance between the base panel (see 210 of FIG. 13) and the layer panel (see 220 of FIG. 13) included in the electronic apparatus 100 is a first distance $d_2$.

Referring to FIGS. 7, 8, and 9, in an embodiment of the disclosure, the operating method of the electronic apparatus 100 includes obtaining an input image LFIM including a first area AR1 and second areas AR2 (S100). In an embodiment of the disclosure, the first area AR1 may have a first depth value $DV_2$, and the second areas AR2 may have second depth values $DV_3$ and $DV_4$ that are different from the first depth value $DV_2$.

In an embodiment of the disclosure, the first depth value $DV_2$ may be a depth value having image disparity corresponding to the pixel disparity of the layer panel 220.

In an embodiment of the disclosure, the second depth values $DV_3$ and $DV_4$ may include a first sub-depth value $DV_3$ and a second sub-depth value $DV_4$. In an embodiment of the disclosure, the input image LFIM may further include a third area AR3 having a third depth value $DV_1$ that is different from the first depth value $DV_2$ and the second depth values $DV_3$ and $DV_4$. The second depth values $DV_3$ and $DV_4$ and the third depth value $DV_1$ will be described below.

In an embodiment of the disclosure, the input image LFIM may include only the first area AR1 having the first depth value $DV_2$ and the second areas AR2 having the second depth values $DV_3$ and $DV_4$. The input image LFIM may include areas having four or more different depth values. Also, the second depth value may include one sub-depth value or three or more sub-depth values.

Referring to FIGS. 7, 8, 9, and 10, in an embodiment of the disclosure, the operating method of the electronic apparatus 100 may include generating calibration maps CBM and CBM-1 that allocate, to the first area AR1, a first calibration value $CV_2$ indicating the first depth value $DV_2$ and allocate, to the second areas AR2, second calibration values $CV_3$ and $CV_4$ indicating the second depth values $DV_3$ and $DV_4$ (S200). In an embodiment of the disclosure, when the input image LFIM includes the first to third areas AR1, AR2, and AR3, the operating method of the electronic apparatus 100 may include generating calibration maps CBM and CBM-1 that allocate, to the first area AR1, a first calibration value $CV_2$ indicating the first depth value $DV_2$, allocate, to the second area AR2, second calibration values $CV_3$ and $CV_4$ indicating the second depth values $DV_3$ and $DV_4$, and allocate a third depth value $DV_1$ to the third area AR3.

In an embodiment of the disclosure, operation S200 of generating the calibration maps CBM and CBM-1 may further include obtaining a depth map DM based on the input image LFIM, and generating the calibration maps CBM and CBM-1 based on the obtained depth map DM.

In an embodiment of the disclosure, in the obtaining of the depth map DM, the at least one processor 400 may execute the depth map obtaining module 310 to obtain the depth map DM from the input image LFIM. In an embodiment of the disclosure, the at least one processor 400 may execute the depth map obtaining module 310 to obtain the depth map DM including the depth values $DV_1$, $DV_2$, $DV_3$, and $DV_4$ corresponding to the areas AR1, AR2, and AR3 included in the input image LFIM. In an embodiment of the disclosure, the depth map DM may include the first area AR1 having the first depth value $DV_2$, the first sub-area AR2_a having the first sub-depth value $DV_3$, the second sub-area AR2_b having the second sub-depth value $DV_4$, and the third area AR3 having the third depth value $DV_1$.

In an embodiment of the disclosure, in the generating of the calibration maps CBM and CBM-1 based on the depth map DM, the at least one processor 400 may execute the calibration map generating module 320 to generate the calibration maps CBM and CBM-1 based on the depth map DM.

In an embodiment of the disclosure, the calibration maps CBM and CBM-1 may include information about a layer area to be clearly displayed in the layer image including a plurality of layer areas displayed on the layer panel 220. In an embodiment of the disclosure, the at least one processor 400 may generate the calibration maps CBM and CBM-1 including information about a layer area to be clearly displayed among a plurality of layer areas included in the layer image displayed on the layer panel 220.

In an embodiment of the disclosure, the at least one processor 400 may obtain area selection information including information about a layer area to be clearly displayed and a layer area to be blurredly displayed among a plurality of layer areas included in the layer image displayed on the layer panel 220 and generate the calibration maps CBM and CBM-1 based on the area selection information and the depth map DM.

In an embodiment of the disclosure, the clear layer area and the blurred layer area may be selected in the layer image displayed on the layer panel 220, based on the area selection information. In an embodiment of the disclosure, the area selection information may include gaze information, which will be described below with reference to FIGS. 14 to 16.

In an embodiment of the disclosure, the calibration maps CBM and CBM-1 include a plurality of calibration areas CAR1, CAR2, and CAR3 respectively corresponding to the areas AR1, AR2, and AR3 included in the depth map DM. In an embodiment of the disclosure, the calibration areas CAR1, CAR2, and CAR3 included in the calibration maps CBM and CBM-1 may include a plurality of calibration values $CV_1$, $CV_2$, $CV_3$, $CV_4$, and $CV_2'$ generated based on a plurality of depth values $DV_1$, $DV_2$, $DV_3$, and $DV_4$ and a plurality of distances $d_1$, $d_2$, $d_3$, and $d_4$ included in the areas AR1, AR2, and AR3.

In an embodiment of the disclosure, the calibration values $CV_1$, $CV_2$, $CV_3$, $CV_4$, and $CV_2'$ may be generated based on the depth values $DV_1$, $DV_2$, $DV_3$, and $DV_4$ and distance information about the distance between the base panel 210 and the layer panel 220. In an embodiment of the disclosure, the calibration values $CV_1$, $CV_2$, $CV_3$, $CV_4$, and $CV_2'$ may correspond to image disparities of the areas AR1, AR2, and AR3.

In an embodiment of the disclosure, the calibration maps CBM and CBM-1 may include a first calibration map CBM and a second calibration map CBM-1 divided according to a range of a layer area to be clearly displayed among a plurality of layer areas included in the layer image displayed on the layer panel 220.

In an embodiment of the disclosure, the first calibration map CBM may include information for clearly displaying all of the layer areas included in the layer image displayed on the layer panel 220. In an embodiment of the disclosure, the first calibration map CBM may include the first calibration area CAR1 including the first calibration value $CV_2$, the second calibration areas CAR2 including the second calibration values $CV_3$ and $CV_4$, and the third calibration area CAR3 including the third calibration value $CV_4$.

In an embodiment of the disclosure, the first calibration map CBM may include information for clearly displaying, on the layer panel 220, the layer areas of the layer image respectively corresponding to the first to third calibration areas CAR1, CAR2, and CAR3.

Referring to FIGS. 9 and 10, in an embodiment of the disclosure, the first calibration value $CV_2$ of the first calibration area CAR1 may be generated based on the first depth value $DV_2$ and the first distance $d_2$ (see FIG. 13) of the first area AR1. In an embodiment of the disclosure, the first distance $d_2$ is the distance between the base panel 210 and the layer panel 220 (see FIG. 13) at which the layer area having the first depth value $DV_2$ is clearly displayed. In an embodiment of the disclosure, the first calibration value $CV_2$ may correspond to the image disparity of the first area AR1 having the first depth value $DV_2$. The first calibration value $CV_2$ may be a value for representing the first depth value $DV_2$.

In an embodiment of the disclosure, the second calibration values $CV_3$ and $CV_4$ of the second calibration areas CAR2 may be generated based on the second depth values $DV_3$ and $DV_4$ of the corresponding second areas AR2 and the second distances $d_3$ and $d_4$ (see FIG. 12A). In an embodiment of the disclosure, the second distances $d_3$ and $d_4$ are each the distance between the base panel 210 and a virtual layer panel at which the layer areas having the second depth values $DV_3$ and $DV_4$ are clearly displayed. In an embodiment of the disclosure, the second distances $d_3$ and $d_4$ are different from the first distance $d_2$, which is the distance between the base panel 210 and the layer panel 220. In an embodiment of the disclosure, the second calibration values $CV_3$ and $CV_4$ may correspond to the image disparities of the second areas AR2 having the second depth values $DV_3$ and $DV_4$. The second calibration values $CV_3$ and $CV_4$ may be values for representing the second depth values $DV_3$ and $DV_4$.

In an embodiment of the disclosure, the second calibration area CAR2 includes a first sub-calibration area CAR2_a and a second sub-calibration area CAR2_b, and the second calibration values $CV_3$ and $CV_4$ include a first sub-calibration value $CV_3$ and a second sub-calibration value $CV_4$. In an embodiment of the disclosure, the first sub-calibration area CAR2_a includes the first sub-calibration value $CV_3$. The second sub-calibration area CAR2_b includes the second sub-calibration value $CV_4$. In an embodiment of the disclosure, the second distances $d_3$ and $d_4$ include a first sub-distance $d_3$ and a second sub-distance $d_4$.

In an embodiment of the disclosure, the first sub-calibration value $CV_3$ of the first sub-calibration area CAR2_a may be generated based on the first sub-depth value $DV_3$ of the corresponding first sub-area AR2_a and the first sub-distance $d_3$. In an embodiment of the disclosure, the first sub-distance $d_3$ is the distance between the base panel 210 and the virtual layer panel at which the layer area having the first sub-depth value $DV_3$ is clearly displayed. In an embodiment of the disclosure, the first sub-distance $d_3$ is greater than the first distance $d_2$. In an embodiment of the disclosure, the first sub-calibration value $CV_3$ may correspond to the image disparity of the first sub-area AR2_a having the first sub-depth value $DV_3$. The first sub-calibration value $CV_3$ may be a value for representing the first sub-depth value $DV_3$.

In an embodiment of the disclosure, the second sub-calibration value $CV_4$ of the second sub-calibration area CAR2_b may be generated based on the second sub-depth value $DV_4$ of the corresponding second sub-area AR2_b and the second sub-distance $d_4$. In an embodiment of the disclosure, the second sub-distance $d_4$ is the distance between the base panel 210 and the virtual layer panel at which the layer area having the second sub-depth value $DV_4$ is clearly displayed. In an embodiment of the disclosure, the second sub-distance $d_4$ is greater than the first distance $d_2$ and the first sub-distance $d_3$. In an embodiment of the disclosure, the second sub-calibration value $CV_4$ may correspond to the image disparity of the second sub-area AR2_b having the second sub-depth value $DV_4$. The second sub-calibration value $CV_4$ may be a value for representing the second sub-depth value $DV_4$.

In an embodiment of the disclosure, the third calibration value $CV_1$ of the third calibration area CAR3 may be generated based on the third depth value $DV_1$ of the corresponding third area AR3 and the third distance $d_1$ (see FIG. 12A). In an embodiment of the disclosure, the third distance $d_1$ is the distance between the base panel 210 and the virtual layer panel at which the layer area having the third depth value $DV_1$ is clearly displayed. In an embodiment of the disclosure, the third distance $d_1$ is less than the first distance $d_2$. In an embodiment of the disclosure, the third calibration value $CV_1$ may correspond to the image disparity of the third area AR3 having the third depth value $DV_1$. The third calibration value $CV_1$ may be a value for representing the third depth value $DV_1$.

In an embodiment of the disclosure, the second calibration map CBM-1 may include information for clearly some layer areas included in the layer image displayed on the layer panel 220. In an embodiment of the disclosure, the second calibration map CBM-1 may include the first calibration area CAR1 including the first calibration value $CV_2$, the second calibration areas CAR2 including the second calibration values $CV_3$ and $CV_4$, and the third calibration area CAR3 including the fourth calibration value $CV_2'$.

In an embodiment of the disclosure, the second calibration map CBM-1 may include information for clearly displaying, on the layer panel 220, the layer area of the layer image corresponding to the first calibration area CAR1 and the layer area of the layer image corresponding to the second calibration area CAR2. The layer area of the layer image LIM corresponding to the third calibration area CAR3 of the second calibration map CBM-1 may be blurredly displayed on the layer panel 220.

Referring to FIGS. 9 and 10, in an embodiment of the disclosure, the first calibration value $CV_2$ of the first calibration area CAR1 may be generated based on the first depth value $DV_2$ and the first distance $d_2$ (see FIG. 13) of the first area AR1. The first calibration value $CV_2$ may be a value for representing the first depth value $DV_2$.

In an embodiment of the disclosure, the second calibration values $CV_3$ and $CV_4$ of the second calibration areas CAR2 may be generated based on the second depth values $DV_3$ and $DV_4$ of the corresponding second areas AR2 and the second distances $d_3$ and $d_4$ (see FIG. 12A). The second calibration values $CV_3$ and $CV_4$ may be values for representing the second depth values $DV_3$ and $DV_4$.

In an embodiment of the disclosure, the second calibration area CAR2 includes a first sub-calibration area CAR2_a and a second sub-calibration area CAR2_b, and the second calibration values $CV_3$ and $CV_4$ include a first sub-calibration value $CV_3$ and a second sub-calibration value $CV_4$. In an embodiment of the disclosure, the first sub-calibration area CAR2_a includes the first sub-calibration value $CV_3$. The second sub-calibration area CAR2_b includes the second sub-calibration value $CV_4$. The first sub-calibration value $CV_3$ may be a value for representing the first sub-depth value $DV_3$, and the second sub-calibration value $CV_4$ may be a value for representing the second sub-depth value $DV_4$.

In an embodiment of the disclosure, the fourth calibration value $CV_2'$ of the third calibration area CAR3 may be generated based on the third depth value $DV_1$ of the corresponding third area AR3 and the first distance $d_2$. In an embodiment of the disclosure, the first distance $d_2$ is the distance between the base panel 210 and the layer panel at which the layer area having the third depth value $DV_1$ is clearly displayed. The disclosure is not limited thereto. The fourth calibration value $CV_2'$ may be generated based on a distance other than the third distance $d_1$ at which the layer area having the third depth value $DV_1$ is clearly displayed. In an embodiment of the disclosure, the fourth calibration value $CV_2'$ may not correspond to the image disparity of the third area AR3 having the third depth value $DV_1$. The fourth calibration value $CV_2'$ may be a value for representing a depth value other than the third depth value $DV_1$.

Referring to FIGS. 7 and 8, the operating method of the electronic apparatus 100 may include pre-processing the input image LFIM and the calibration maps CBM and CBM-1. In an embodiment of the disclosure, the at least one processor 400 may execute the pre-processing module 330 to pre-process the input image LFIM and the calibration maps CBM and CBM-1. In an embodiment of the disclosure, the input image LFIM and the calibration maps CBM and CBM-1 may be sequentially concatenated and provided to the pre-processing module 330. However, the disclosure is not limited thereto. In an embodiment of the disclosure, the operating method of the electronic apparatus 100 may not include pre-processing the input image LFIM and the calibration maps CBM and CBM-1.

In an embodiment of the disclosure, the operating method of the electronic apparatus 100 may obtain a change flow based on the input image LFIM and the calibration maps CBM and CBM-1. In an embodiment of the disclosure, the at least one processor 400 may execute the change measuring module 340 to obtain a change flow based on the input image LFIM and the calibration maps CBM and CBM-1. However, the disclosure is not limited thereto. In an embodiment of the disclosure, the operating method of the electronic apparatus 100 may not include obtaining a change flow based on the input image LFIM and the calibration maps CBM and CBM-1.

In an embodiment of the disclosure, when the input image LFIM includes a first area AR1 and a second area AR2, the operating method of the electronic apparatus 100 may include generating the output image (see 120 of FIG. 1) including a first output area corresponding to the first area AR1 and a second corresponding to the second area AR2 by applying the calibration maps CBM and CBM-1 to the input image LFIM (S300). In an embodiment of the disclosure, when the input image LFIM includes a first area AR1, a second area AR2, and a third area AR3, the operating method of the electronic apparatus 100 may include generating the output image 120 including a first output area corresponding to the first area AR1, a second output area corresponding to the second area AR2, and a third output area corresponding to the third area AR3. Hereinafter, for convenience of explanation, it is assumed that the input image LFIM includes the first to third areas AR1, AR2, and AR3.

In an embodiment of the disclosure, the at least one processor 400 may execute the sub-image generating module 350 to generate the output image 120 by applying the calibration maps CBM and CBM-1 to the input image LFIM. In an embodiment of the disclosure, the at least one processor 400 may execute the sub-image generating module 350 to generate the output image 120 by applying the pre-processed calibration maps to the pre-processed input image. Also, the at least one processor 400 may generate the output image 120 by applying the pre-processed calibration maps and the pre-processed change flow to the pre-processed input image. In an embodiment of the disclosure, operation S300 of generating the output image 120 may include generating a base image to be displayed on the base panel 210 by applying the calibration maps CBM and CBM-1 to the input image LFIM. Operation S300 of generating the output image 120 may include generating a layer image to be displayed on the layer panel 220 by applying the calibration maps CBM and CBM-1 to the input image LFIM. The at least one processor 400 may execute the sub-image generating module 350 to generate a base image to be displayed on the base panel 210 and a layer image to be displayed on the layer panel 220.

In an embodiment of the disclosure, the at least one processor 400 may execute the sub-image generating module 350 including the artificial intelligence model to generate the base image and the layer image. In an embodiment of the disclosure, the artificial intelligence model included in the sub-image generating module 350 may be a model trained to generate, based on the input image LFIM, a base image to be displayed on the base panel 210 and a layer image to be displayed on the layer panel 220 disposed at a distance between the first reference distance (see $d_1$ of FIG. 5A) and the second reference distance (see $d_4$ of FIG. 6A) from the base panel 210.

In an embodiment of the disclosure, the distance between the base panel 210 and the layer panel 220 included in the electronic apparatus 100 is the first distance $d_2$. The artificial intelligence model included in the sub-image generating module 350 is a model trained to generate, based on the input image LFIM, the layer image to be displayed on the layer panel 220 disposed at the first distance $d_2$ from the base panel 210. Hereinafter, for convenience of explanation, the first distance $d_2$ is referred to as a reference distance.

Referring to FIGS. 8, 9, and 10, in an embodiment of the disclosure, when the first calibration map CBM is applied to the input image LFIM In the generating of the output image 120, the at least one processor 400 may allocate the first calibration value $CV_2$ to the corresponding first area AR1, may allocate the second calibration values $CV_3$ and $CV_4$ to the corresponding second areas AR2, and may allocate the third calibration value $CV_1$ to the corresponding third area AR3.

In an embodiment of the disclosure, the output image 120 generated by applying the first calibration map CBM to the input image LFIM may include a first output area having a depth value obtained by converting the first depth value $DV_2$ so as to correspond to the display panel 200 according to the allocated first calibration value $CV_2$, a second output area having a depth value obtained by converting the second depth values $DV_3$ and $DV_4$ so as to correspond to the display panel 200 according to the allocated second calibration values $CV_3$ and $CV_4$, and a third output area having a depth value obtained by converting the third depth value $DV_1$ so as to corresponds to the display panel 200 according to the allocated third calibration value $CV_1$.

In an embodiment of the disclosure, when the second calibration map CBM-1 is applied to the input image LFIM in the generating of the output image 120, the at least one processor 400 may allocate the first calibration value $CV_2$ to the corresponding first area AR1, may allocate the second calibration values $CV_3$ and $CV_4$ to the corresponding second areas AR2, and may allocate the fourth calibration value $CV_2'$ to the corresponding third area AR3.

In an embodiment of the disclosure, the output image 120 generated by applying the second calibration map CBM-1 to the input image LFIM may include a first output area having a depth value obtained by converting the first depth value $DV_2$ so as to correspond to the display panel 200 according to the allocated first calibration value $CV_2$, a second output area having a depth value obtained by converting the second depth values $DV_3$ and $DV_4$ so as to correspond to the display panel 200 according to the allocated second calibration values $CV_3$ and $CV_4$, and a third output area having a depth value obtained by converting a depth value different from the third depth value $DV_1$ so as to correspond to the display panel 200 according to the allocated fourth calibration value $CV_2'$.

In an embodiment of the disclosure, the layer image to be described below may include a plurality of layer areas in which the depth values indicated by the calibration values $CV_1$, $CV_2$, $CV_3$, $CV_4$, and $CV_2'$ allocated by the first calibration map CBM or the second calibration map CBM-1 applied to the input image LFIM are converted according to the reference distance $d_2$. In an embodiment of the disclosure, the electronic apparatus 100 may display the base image on the base panel 210 and display the layer image on the layer panel 220, so that the output image 120 displayed on the display panel 200 is provided to the user (see 110 of FIG. 1). Because the depth values allocated to the layer areas included in the layer image are converted according to the reference distance $d_2$, the output areas included in the output image 120 may have depth values obtained by converting the depth values so as to correspond to the display panel 200.

In an embodiment of the disclosure, the layer image generated by applying the first calibration map CBM or the second calibration map CBM-1 to the input image LFIM may include a plurality of layer areas respectively corresponding to the first to third areas AR1, AR2, and AR3 included in the input image LFIM. The layer image may include a first layer area corresponding to the first area AR1, a second layer area corresponding to the second area AR2, and a third layer area corresponding to the third area AR3. In an embodiment of the disclosure, the first layer area may correspond to the first output area, the second layer area may correspond to the second output area, and the third layer area may correspond to the third output area.

In an embodiment of the disclosure, the at least one processor 400 may execute the sub-image generating module 350 to generate the layer image by applying the first calibration map CBM or the second calibration map CBM-1 to the first to third areas AR1, AR2, and AR3 included in the input image LFIM.

In an embodiment of the disclosure, the sub-image generating module 350 may include instructions or program code related to an operation or function of generating a layer image including a layer area having a depth value converted to correspond to pixel disparity of the layer panel 220 spaced apart from the base panel 210 by the reference distance $d_2$, based on a portion corresponding to the depth value indicated by the allocated calibration value among areas included in the input image LFIM corresponding to the calibration area included in the first calibration map CBM or the second calibration map CBM-1.

In an embodiment of the disclosure, when the first calibration map CBM is generated in operation S200 of generating the first or second calibration map CBM or CBM-1, the at least one processor 400 may generate the first layer area of the layer image by allocating the first calibration value $CV_2$ included in the first calibration area CAR1 to the first area AR1 included in the input image LFIM.

The at least one processor 400 may generate the second layer area of the layer image by allocating the second calibration values $CV_3$ and $CV_4$ included in the second calibration area CAR2 to the second area AR2 included in the input image LFIM. In an embodiment of the disclosure, the at least one processor 400 may generate the first sub-layer area of the layer image by allocating the first sub-calibration value $CV_3$ included in the first sub-calibration area CAR2_$a$ to the first sub-area AR2_$a$ included in the input image LFIM. In an embodiment of the disclosure, the at least one processor 400 may generate the second sub-layer area of the layer image by allocating the second sub-calibration value $CV_4$ included in the second sub-calibration area CAR2_$b$ to the second sub-area AR2_$b$ included in the input image LFIM.

The at least one processor 400 may generate the third layer area of the layer image by allocating the third calibration value $CV_1$ included in the third calibration area CAR3 to the third area AR3 included in the input image LFIM.

In an embodiment of the disclosure, the first area AR1 included in the input image LFIM is an area having the first depth value $DV_2$, and the first calibration value $CV_2$ is a value generated based on the reference distance $d_2$ and the first depth value $DV_2$ that enables clear display on the layer panel 220 spaced apart from the base panel 210 by the reference distance $d_2$.

In an embodiment of the disclosure, the at least one processor 400 may execute the instructions or program code of the sub-image generating module 350, so that the first layer area of the layer image LIM generated by applying the first calibration value $CV_2$ to the first area AR1 has a depth value obtained by converting the first depth value $DV_2$ according to the reference distance $d_2$. Because the first layer area is generated based on a portion of the first area AR1 corresponding to the first depth value $DV_2$, the first layer area may be clearly displayed on the layer panel 220.

In an embodiment of the disclosure, the first sub-area AR2_$a$ included in the input image LFIM is an area having the first sub-depth value $DV_3$, and the first sub-calibration value $CV_3$ is a value generated based on the first sub-distance $d_3$ and the first sub-depth value $DV_3$ that enables clear display on the layer panel 220 spaced apart from the base panel 210 by the first sub-distance $d_3$.

In an embodiment of the disclosure, the at least one processor 400 may execute the instructions or program code of the sub-image generating module 350, so that the first sub-layer area of the layer image LIM generated by applying the first sub-calibration value $CV_3$ to the first sub-area AR2_$a$ has a depth value obtained by converting the first sub-depth value $DV_3$ according to the reference distance $d_2$. Because the first sub-layer area is generated based on a portion of the first sub-area AR2_$a$ corresponding to the first sub-depth value $DV_3$, the first sub-layer area may be clearly displayed on the layer panel 220.

In an embodiment of the disclosure, the second sub-area AR2_$b$ included in the input image LFIM is an area having the second sub-depth value $DV_4$, and the second sub-calibration value $CV_4$ is a value generated based on the second sub-distance $d_4$ and the second sub-depth value $DV_4$ that enables clear display on the layer panel 220 spaced apart from the base panel 210 by the second sub-distance $d_4$. In an embodiment of the disclosure, the at least one processor 400 may execute the instructions or program code of the sub-image generating module 350, so that the second sub-layer area of the layer image LIM generated by applying the second sub-calibration value $CV_4$ to the second sub-area AR2_$b$ has a depth value obtained by converting the second sub-depth value $DV_4$ according to the reference distance $d_2$. Because the second sub-layer area is generated based on a portion of the second sub-area AR2_$b$ corresponding to the second sub-depth value $DV_4$, the second sub-layer area may be clearly displayed on the layer panel 220.

In an embodiment of the disclosure, the third area AR3 included in the input image LFIM is an area having the third depth value $DV_1$, and the third calibration value $CV_1$ is a value generated based on the third distance $d_1$ and the third depth value $DV_1$ that enables clear display on the layer panel 220 spaced apart from the base panel 210 by the third distance $d_1$. In an embodiment of the disclosure, the at least one processor 400 may execute the instructions or program code of the sub-image generating module 350, so that the third layer area of the layer image generated by applying the third calibration value $CV_1$ to the third area AR3 has a depth value obtained by converting the third depth value $DV_1$ according to the reference distance $d_2$. Because the third layer area is generated based on a portion of the third area AR3 corresponding to the third depth value $DV_1$, the third layer area may be clearly displayed on the layer panel 220.

In an embodiment of the disclosure, the at least one processor 400 may generate the layer image LIM including the first to third layer areas clearly displayed on the layer panel 220 by applying the first calibration map CBM to the input image LFIM. According to the electronic apparatus 100 and the operating method of the electronic apparatus 100 described above, the electronic apparatus 100 may provide, to the user 110, the layer image LIM clearly displayed on the layer panel 220, and thus, the visibility of the user 110 may be improved.

In an embodiment of the disclosure, when the second calibration map CBM-1 is generated in operation S200 of generating calibration map CBM-1 or CBM-1, the at least one processor 400 may generate the first layer area of the layer image by allocating the first calibration value $CV_2$ included in the first calibration area CAR1 to the first area AR1 included in the input image LFIM. In an embodiment of the disclosure, the first layer area may have a depth value obtained by converting the first depth value $DV_2$ according to the reference distance $d_2$.

In an embodiment of the disclosure, the at least one processor 400 may generate the first sub-layer area of the layer image by allocating the first sub-correction value $CV_3$ included in the first sub-correction area CAR2_a to the first sub-area AR2_a included in the input image LFIM. In an embodiment of the disclosure, the first sub-layer area may have a depth value obtained by converting the first sub-depth value $DV_3$ according to the reference distance $d_2$.

In an embodiment of the disclosure, the at least one processor 400 may generate the second sub-layer area of the layer image by allocating the second sub-calibration value $CV_4$ included in the second sub-calibration area CAR2_b to the second sub-area AR2_b included in the input image LFIM. In an embodiment of the disclosure, the second sub-layer area may have a depth value obtained by converting the second sub-depth value $DV_4$ according to the reference distance $d_2$.

In an embodiment of the disclosure, the first layer area, the first sub-layer area, and the second sub-layer area of the layer image LIM generated by the at least one processor 400 may be clearly displayed on the layer panel 220.

In an embodiment of the disclosure, the at least one processor 400 may generate the third layer area of the layer image by allocating the fourth calibration value $CV_2$ included in the third calibration area CAR3 to the third area AR3 included in the input image LFIM. In an embodiment of the disclosure, the fourth calibration value $CV_2'$ is a value generated based on the reference distance $d_2$ and the third depth value $DV_1$ that enables clear display on the layer panel 220 spaced apart from the base panel 210 by the third distance $d_1$. However, the disclosure is not limited thereto, and the fourth calibration value $CV_2'$ may be generated based on a distance other than the third distance $d_1$. The fourth calibration value $CV_2'$ may be a value for representing a depth value other than the third depth value $DV_1$.

In an embodiment of the disclosure, the third layer area of the layer image generated by the at least one processor 400 executing the instructions or program code of the sub-image generating module 350 may have a depth value obtained by converting a depth value other than the third depth value $DV_1$ according to the reference distance $d_2$. Because the third layer area is generated based on a portion of the third area AR3 corresponding to the depth value other than the third depth value $DV_1$, the third layer area may be blurredly displayed on the layer panel 220.

In an embodiment of the disclosure, the at least one processor 400 may generate the layer image LIM including the first layer area and the second layer area clearly displayed on the layer panel 220 and the third layer area blurredly displayed on the layer panel 220 by applying the second calibration map CBM-1 to the input image LFIM.

According to the electronic apparatus 100 and the operating method of the electronic apparatus 100 described above, by adjusting the calibration values included in the calibration maps to be provided to the sub-image generating module 350, the electronic apparatus 100 may select a clearly displayed area of the layer image LIM displayed on the layer panel 220 and provide the selected area to the user 110. Accordingly, the user 110 concentrates his/her gaze on the clearly displayed layer area of the layer image LIM, and the layer area where the gaze of user 110 is not concentrated is blurredly displayed. Accordingly, a natural three-dimensional effect may be provided to the user 110. Also, the three-dimensional effect the user 110 feels may be increased by providing, to the user 110, the clearly displayed layer area and the blurredly displayed layer area together.

Figure 11:
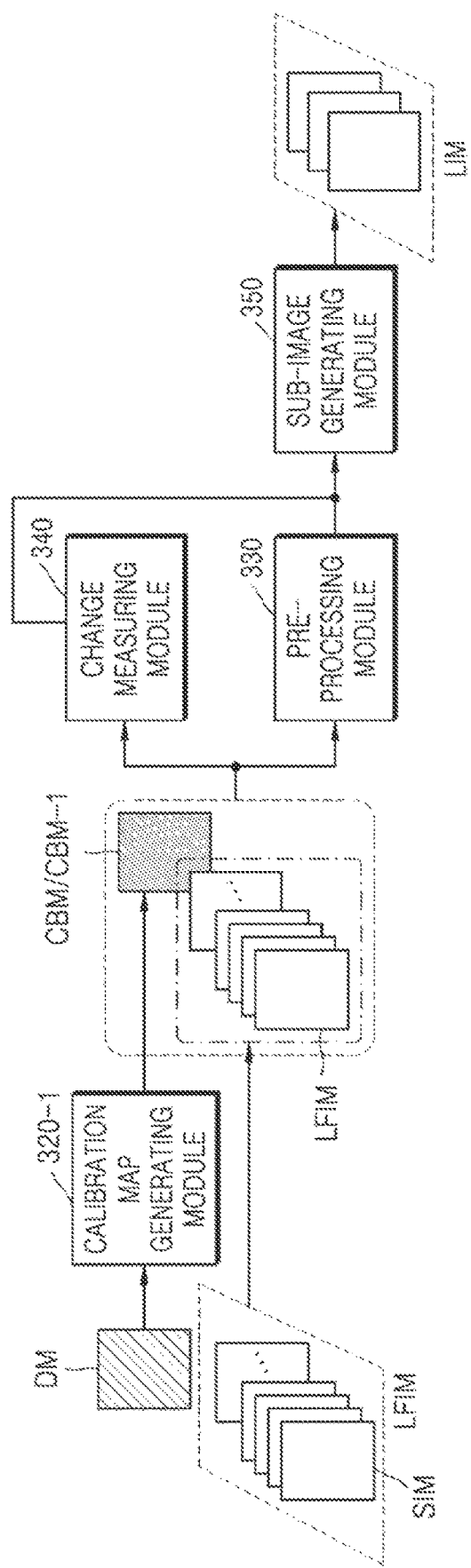
FIG. 11 is a diagram for describing an operation of an electronic apparatus, according to an embodiment of the disclosure.

FIG. 11 is a diagram for describing the operation of the electronic apparatus, according to an embodiment of the disclosure. Hereinafter, the same elements as those described with reference to FIG. 8 are denoted by the same reference numerals, and descriptions thereof are omitted.

Referring to FIGS. 7 and 11, in an embodiment of the disclosure, in operation S100 of obtaining the input image LFIM, the at least one processor 400 may obtain the input image LFIM and the depth map DM based on the input image LFIM. In an embodiment of the disclosure, the input image LFIM and the depth map DM based on the input image LFIM may be obtained by photographing an object by using an RGB-depth camera. The operating method of the electronic apparatus 100 may not include obtaining the depth map DM based on the input image LFIM. Also, the memory (see 300 of FIG. 2) may not include the depth map obtaining module 310.

Referring to FIGS. 7 and 11, in an embodiment of the disclosure, in operation S200 of generating the calibration maps CBM and CBM-1, the at least one processor 400 may execute the calibration map generating module 320-1 to generate the calibration maps CBM and CBM-1 based on the obtained depth map DM. In an embodiment of the disclosure, the at least one processor 400 may execute the pre-processing module 330 to pre-process the input image LFIM and the calibration maps CBM and CBM-1. In an embodiment of the disclosure, the at least one processor 400 may execute the change measuring module 340 to obtain a change flow based on the input image LFIM and the calibration maps CBM and CBM-1.

In an embodiment of the disclosure, the at least one processor 400 may execute the sub-image generating module 350 to generate the layer image LIM by applying the calibration maps CBM and CBM-1 to the input image LFIM. Also, the at least one processor 400 may generate the layer image LIM by applying the calibration maps CBM and CBM-1 and the change flow to the pre-processed input image.

FIG. 12A is a diagram for describing an operation of an electronic apparatus, according to an embodiment of the disclosure.

To describe the electronic apparatus 100, the operating method of the electronic apparatus 100, and the effects thereof according to the disclosure, a display panel 200a included in an electronic apparatus is illustrated in FIG. 12A. The display panel 200a included in the electronic apparatus includes a base panel 210a, a layer panel 220a, and an optical layer 230a. The electronic apparatus may further include a backlight. Hereinafter, for convenience of explanation, the layer panel 220a included in the electronic apparatus is referred to as a layer panel 220a.

The layer panel 220a includes a first layer panel 220-2 located at a first distance $d_2$ from the base panel 210a, a second layer panel 220-3 located at a first sub-distance $d_3$ from the base panel 210a, a third layer panel 220-4 located at a second sub-distance $d_4$ from the base panel 210a, and a fourth layer panel 220-1 located at a third distance $d_1$ from the base panel 210a.

A layer image displayed on the first layer panel 220-2 may be referred to as a first layer image SLIM-2. A layer image displayed on the second layer panel 220-3 may be referred to as a second layer image SLIM-3. A layer image displayed on the third layer panel 220-4 may be referred to as a third layer image SLIM-4. A layer image displayed on the fourth layer panel 220-1 may be referred to as a fourth layer image SLIM-1.

The electronic apparatus may display the first to fourth layer images SLIM-2, SLIM-3, SLIM-4, and SLIM-1 on first to fourth layer panels 220-2, 220-3, 220-4, and 220-1, respectively, so that an output image 120-1 having a three-dimensional effect is provided to the user (see 110 of FIG. 1). The electronic apparatus may clearly display, on the first to fourth layer panels 220-2, 220-3, 220-4, and 220-1, layer areas corresponding to areas of the output image 120-1 having image disparities corresponding to pixel disparities of the first to fourth layer panels 220-2, 220-3, 220-4, and 220-1.

When the output image 120-1 provided to the user 110 is a human face shape, a layer area of the first layer image SLIM-2 clearly displayed on the first layer panel 220-2 may correspond to an area of a human jaw part having image disparity corresponding to the pixel disparity of the first layer panel 220-2.

A layer area of the second layer image SLIM-3 clearly displayed on the second layer panel 220-3 may correspond to an area of a human eye part having image disparity corresponding to the pixel disparity of the second layer panel 220-3.

A layer area of the third layer image SLIM-4 clearly displayed on the third layer panel 220-4 may correspond to an area of a human nose part having image disparity corresponding to the pixel disparity of the third layer panel 220-4.

A layer area of the fourth layer image SLIM-1 clearly displayed on the fourth layer panel 220-1 may correspond to an area of a human neck part having image disparity corresponding to the pixel disparity of the fourth layer panel 220-1.

Among the first to fourth layer panels 220-2, 220-3, 220-4, and 220-1, the user 110 first sees the third layer panel 220-4 because the third layer panel 220-4 is closest to the user 110 of the electronic apparatus. Only the area of the human nose part may be clearly displayed on the third layer panel 220-4. Therefore, although the user 110 is provided with the output image 120-1 having a three-dimensional effect through the electronic apparatus including the first to fourth layer panels 220-2, 220-3, 220-4, and 220-1, the visibility of the user 110 viewing the electronic apparatus may deteriorate. Also, when the first to fourth layer panels 220-2, 220-3, 220-4, and 220-1 are included, the volume of the electronic apparatus may increase, and thus, space utilization may be reduced.

FIG. 12A is a diagram for describing an operation of an electronic apparatus, according to an embodiment of the disclosure. Hereinafter, the same elements as those described with reference to FIG. 12A are denoted by the same reference numerals, and descriptions thereof are omitted.

Figure 12B:
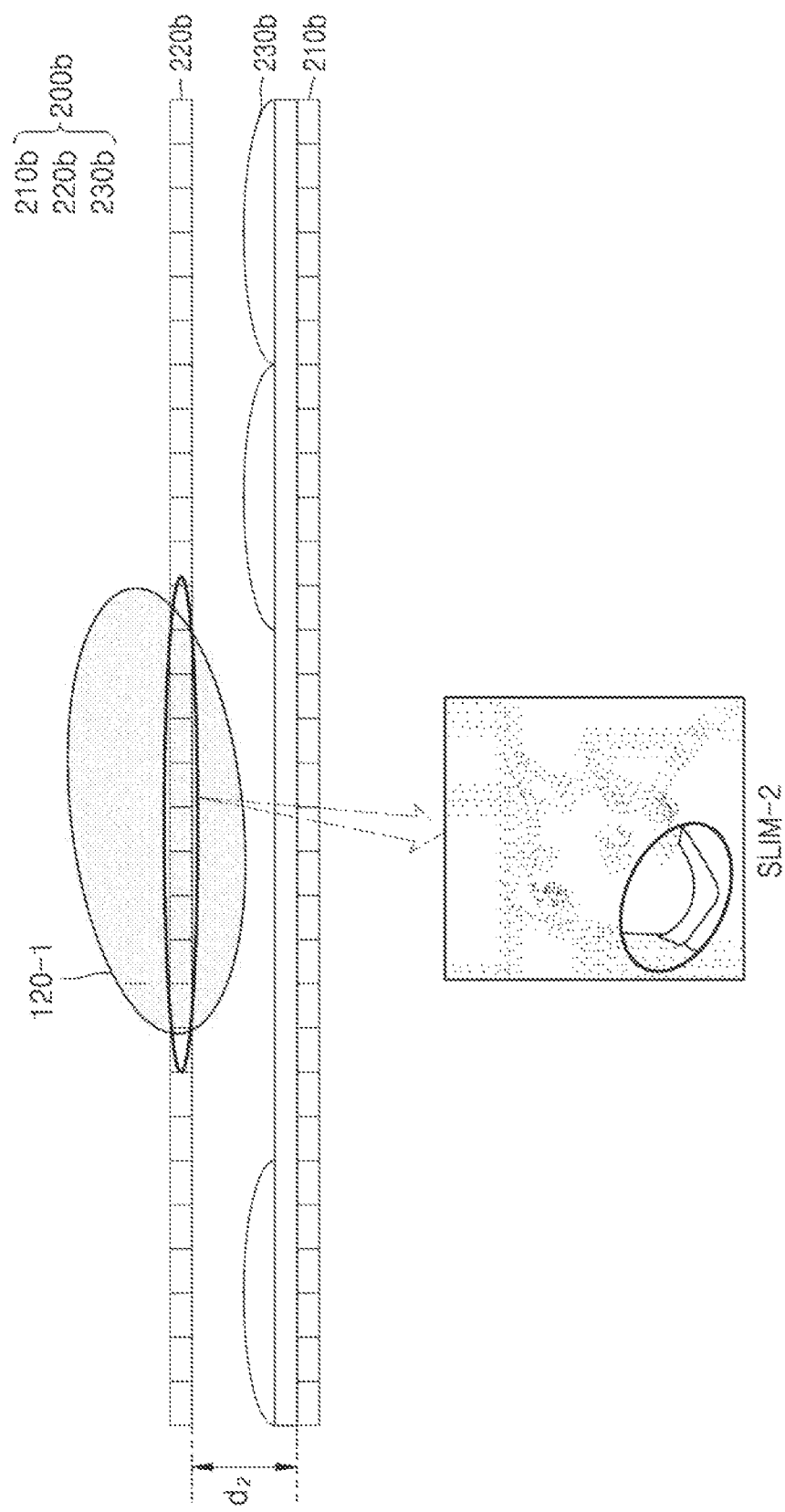
FIG. 12B is a diagram for describing an operation of an electronic apparatus, according to an embodiment of the disclosure.

To describe the electronic apparatus 100, the operating method of the electronic apparatus 100, and the effects thereof according to the disclosure, a display panel 200b included in an electronic apparatus is illustrated in FIG. 12B. The display panel 200b included in the electronic apparatus includes a base panel 210b, a layer panel 220b, and an optical layer 230b. The electronic apparatus may further include a backlight. Hereinafter, for convenience of explanation, the layer panel 220b included in the electronic apparatus is referred to as a layer panel 220b.

The layer panel 220b may be located at a first distance $d_2$ from the base panel 210b. A layer image displayed on the first layer panel 220b may be referred to as a layer image SLIM-2.

The electronic apparatus may provide the layer image SLIM-2 to the layer panel 220b, so that the output image 120-1 having a three-dimensional effect may be provided to the user (see user 110 of FIG. 1). The electronic apparatus may clearly display, on the layer panel 220b, only the layer area corresponding to the area of the output image 120-1 having image disparity corresponding to the pixel disparity of the layer panel 220b.

When the output image 120-1 provided to the user 110 is a human face shape, a layer area of the layer image SLIM-2 clearly displayed on the layer panel 220b may correspond to an area of a human jaw part having image disparity corresponding to the pixel disparity of the layer panel 220b.

When the electronic apparatus includes only one layer panel 220b, the volume of the electronic apparatus may be reduced, and thus, space utilization may increase. However, in the layer panel 220b, because only the layer area corresponding to the area of the human neck part is clearly displayed, the visibility of the user 110 using the electronic apparatus may be reduced.

Figure 13:
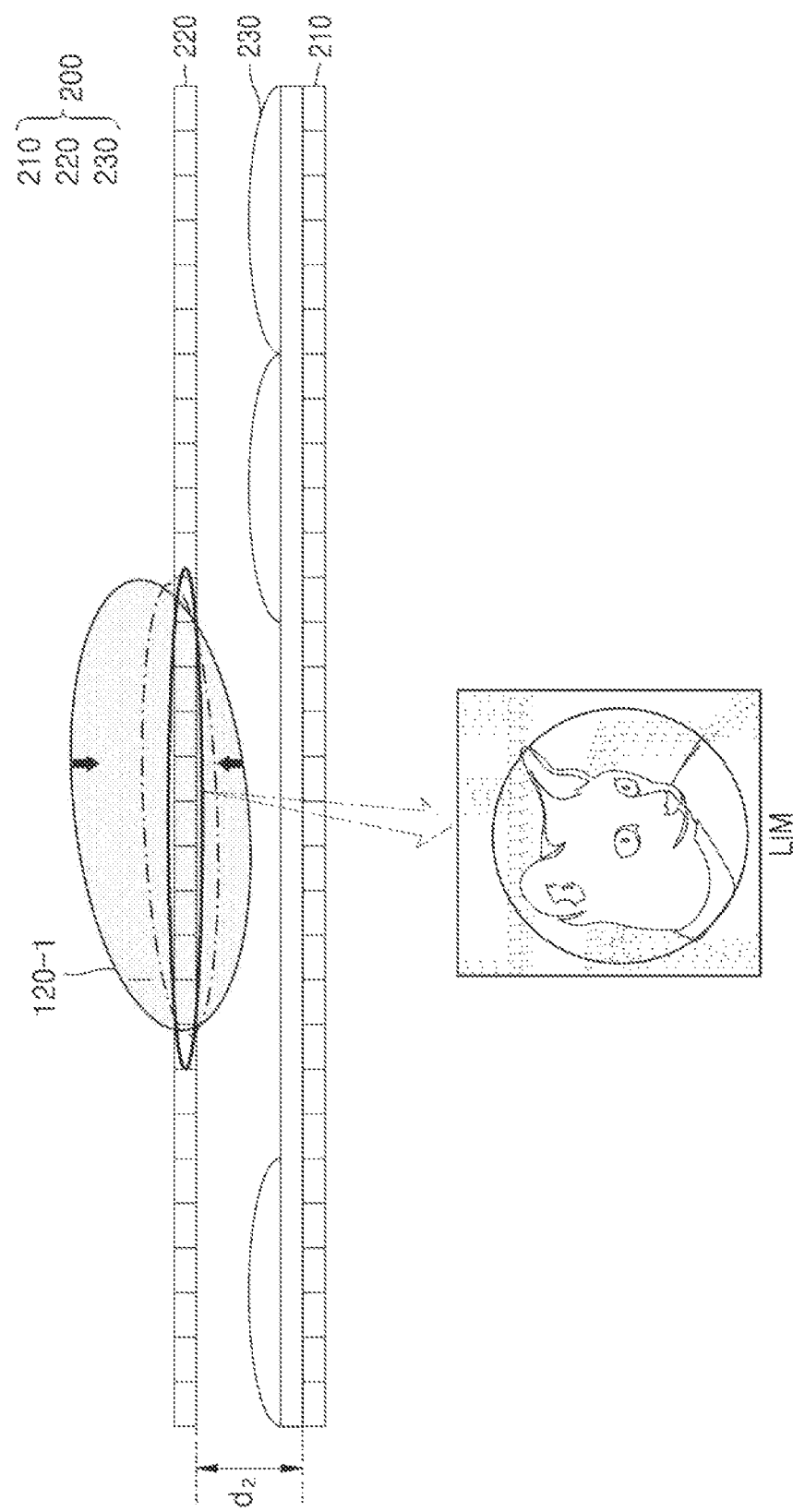
FIG. 13 is a diagram for describing an operation of an electronic apparatus, according to an embodiment of the disclosure.

FIG. 13 is a diagram for describing an operation of an electronic apparatus, according to an embodiment of the disclosure.

To describe the electronic apparatus 100, the operating method of the electronic apparatus 100, and the effects thereof according to the disclosure, a display panel 200 included in the electronic apparatus (see 100 of FIG. 1) according to the disclosure is illustrated in FIG. 13.

In an embodiment of the disclosure, the display panel 200 includes a base panel 210, a layer panel 220, and an optical layer 230. The display panel 200 may further include a backlight.

In an embodiment of the disclosure, the layer panel 220 may be located at a first distance $d_2$ from the base panel 210. In an embodiment of the disclosure, the electronic apparatus 100 provides the layer image to the layer panel 220, so that an output image 120-1 giving a three-dimensional effect to the user 110 is provided. In an embodiment of the disclosure, the electronic apparatus 100 may clearly display, on the layer panel 220, not only the layer area corresponding to the area of the output image 120-1 having image disparity corresponding to the pixel disparity of the layer panel 220, but also the layer area that is included in the calibration map (see CBM or CBM-1 of FIG. 8) and is to be displayed clearly.

In an embodiment of the disclosure, when the output image 120-1 provided to the user (see 110 of FIG. 1) is a human face shape, the calibration maps CBM and CBM-1 may include information about an area of a human jaw part, an area of a human eye part, and an area of a human nose part as information about the layer area to be displayed clearly.

The layer area of the layer image to be clearly displayed on the layer panel 220 includes the layer area corresponding to the area of the human jaw part having image disparity corresponding to the pixel disparity of the layer panel 220. Also, in an embodiment of the disclosure, the layer area of the layer image to be clearly displayed on the layer panel 220 may also include the layer area corresponding to the area of the human eye part and the layer area corresponding to the area of the human nose part. According to the electronic apparatus 100 and the operating method of the electronic apparatus 100 described above, not only the layer area corresponding to the area having image disparity corresponding to the pixel disparity of the layer panel 220, but also the layer area that is included in the calibration map CBM or CBM-1 and is to be displayed clearly may be clearly displayed on the layer panel 220 included in the electronic apparatus 100. Accordingly, the visibility of the user 110 viewing the electronic apparatus 100 may be improved. Also, while providing the output image 120-1 having a three-dimensional effect to the user 110 through the base panel 210 and the layer panel 220 included in the electronic apparatus 100, the volume of the electronic apparatus 100 may be reduced and space utilization may increase.

Figure 14:
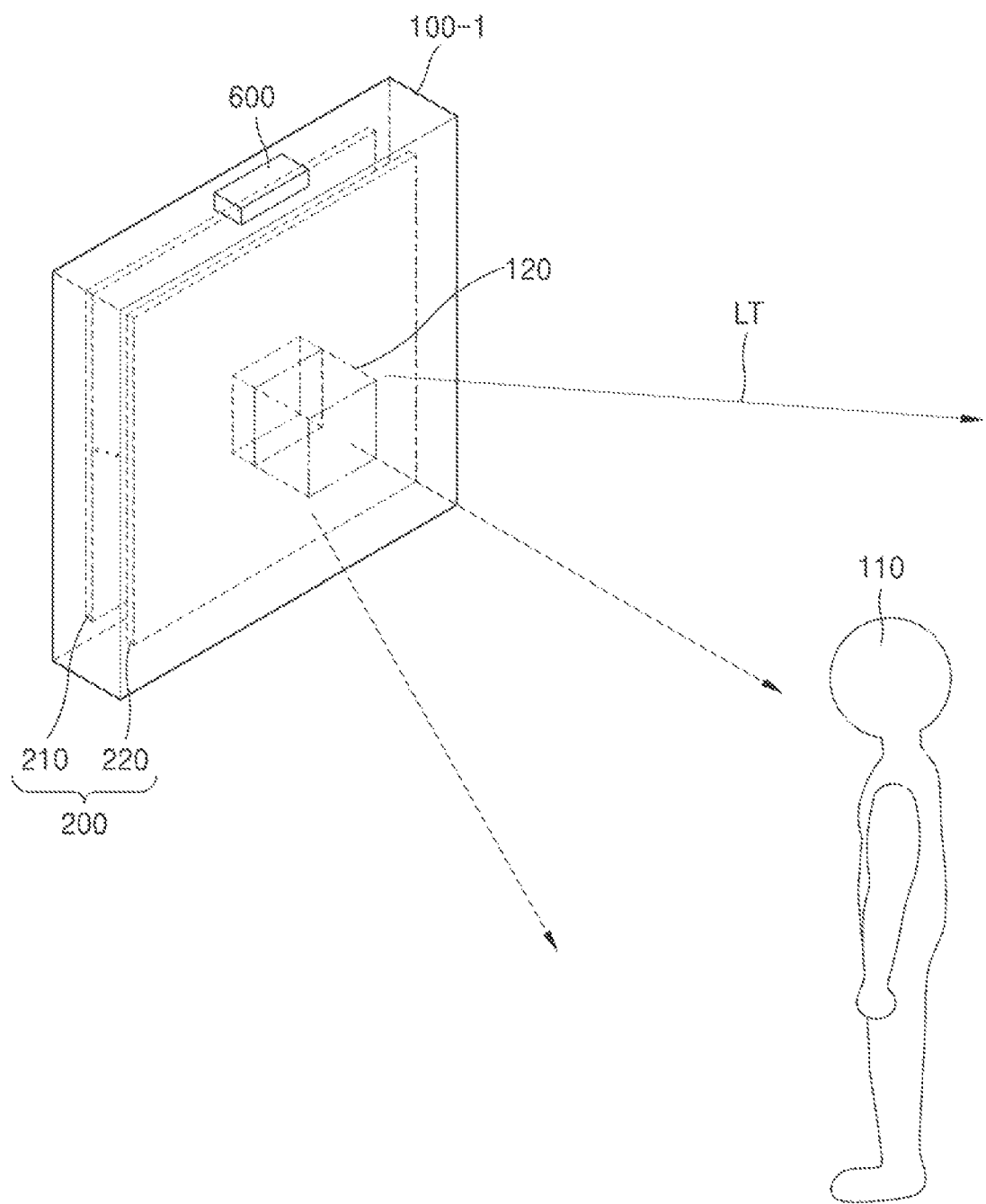
FIG. 14 is a diagram for describing an electronic apparatus according to an embodiment of the disclosure.

FIG. 14 is a diagram for describing an electronic apparatus 100-1 according to an embodiment of the disclosure.

Referring to FIG. 14, in an embodiment of the disclosure, the electronic apparatus 100-1 may include a display panel 200 and a sensing portion 600. Hereinafter, the same elements as those described with reference to FIG. 1 are denoted by the same reference numerals, and descriptions thereof are omitted.

In an embodiment of the disclosure, the sensing portion 600 may sense gazes (see ES1 and ES2 of FIG. 15) of a user 110 viewing the electronic apparatus 100-1. In an embodiment of the disclosure, the sensing portion 600 may include a camera. The sensing portion 600 may include an RGB camera and an infrared ray (IR) camera. However, the disclosure is not limited thereto, and the sensing portion 600 may include other types of cameras and sensors capable of sensing the gaze of the user 110.

In an embodiment of the disclosure, the sensing portion 600 may sense the gazes ES1 and ES2 of the user 110 viewing the display panel 200. An area of the display panel 200 viewed by the user 110 may be referred to as an interest area (see IAR of FIG. 15), and an area adjacent to the interest area IAR may be referred to as a non-interest area NIAR. The sensing portion 600 may obtain gaze information by sensing the gazes ES1 and ES2 of the user 110 viewing the interest area IAR in the display panel 200.

Referring to FIGS. 7 and 14, in an embodiment of the disclosure, the operating method of the electronic apparatus 100 may further include obtaining the gaze information of the user 110 viewing the interest area IAR in the display panel 200.

Figure 15:
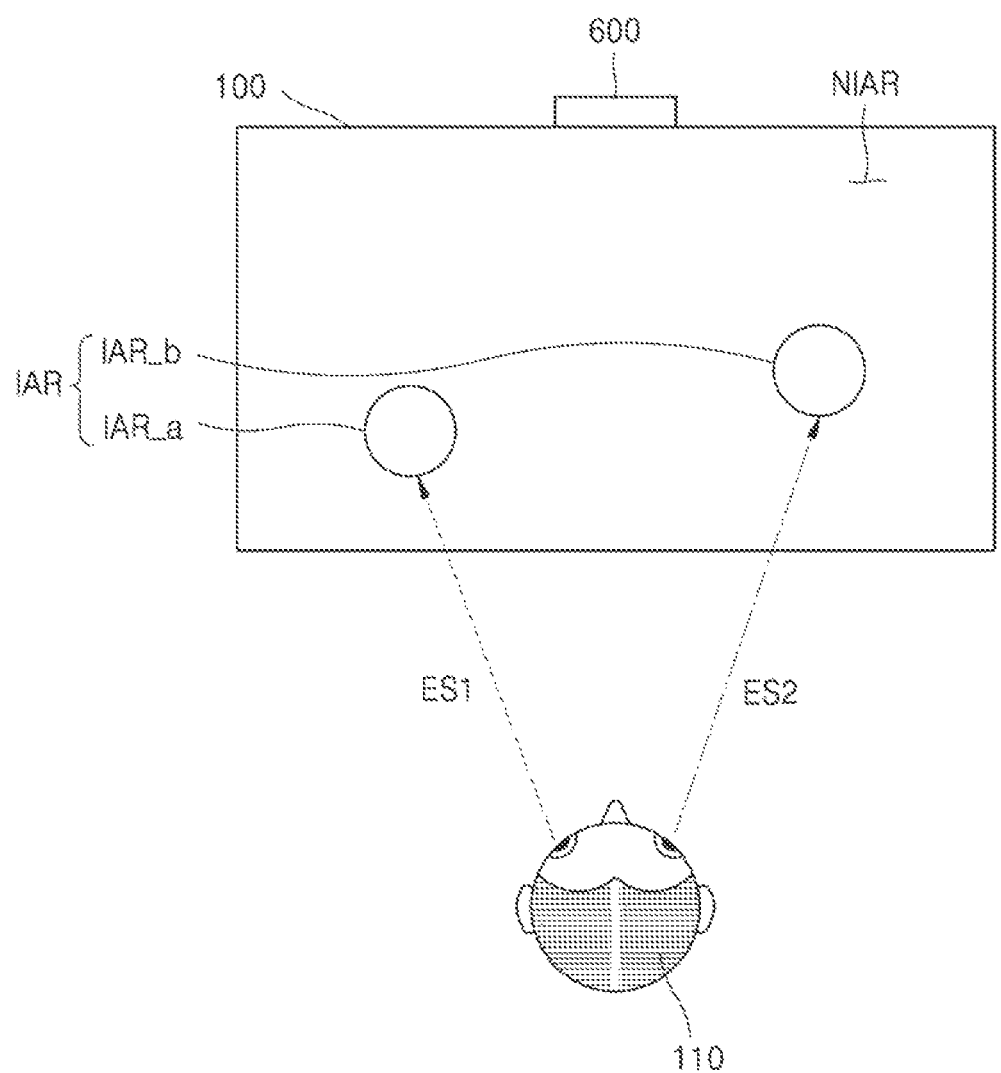
FIG. 15 is a conceptual diagram for describing an electronic apparatus according to an embodiment of the disclosure.
Figure 16:
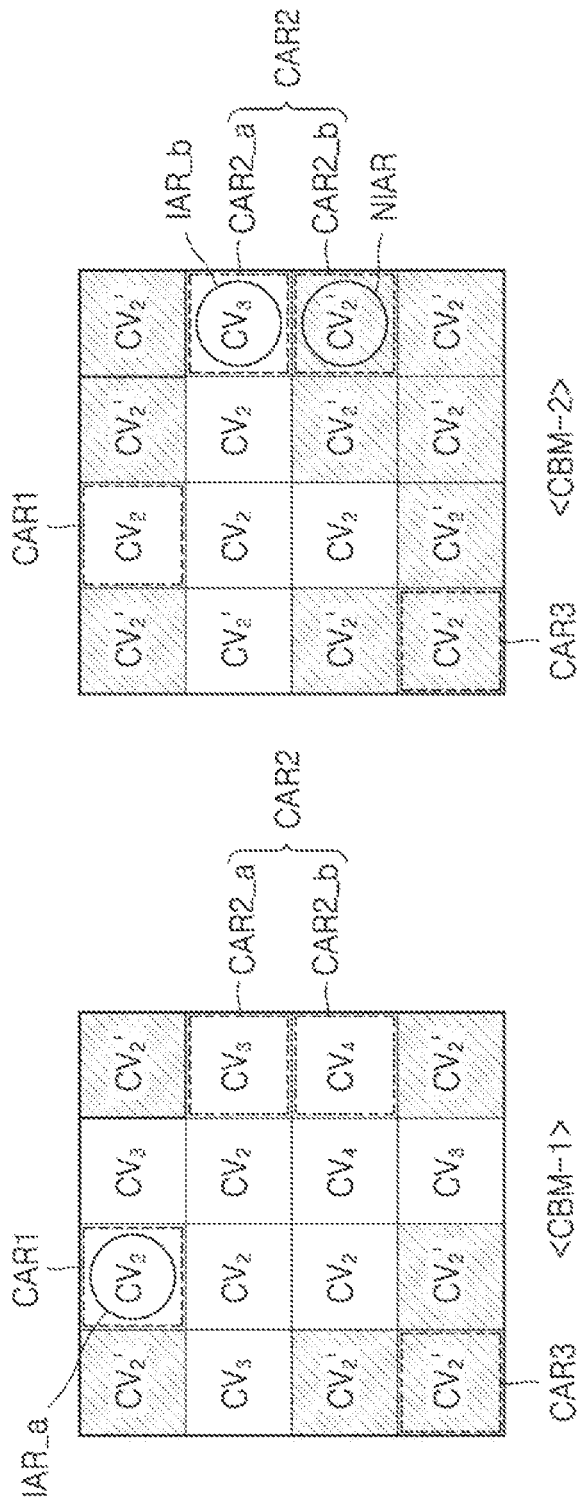
FIG. 16 is a diagram for describing a calibration map and a gaze calibration map according to an embodiment of the disclosure.

FIG. 15 is a conceptual diagram for describing an electronic apparatus according to an embodiment of the disclosure. FIG. 16 is a diagram for describing a calibration map and a gaze calibration map according to an embodiment of the disclosure.

Referring to FIGS. 9, 15, and 16, the interest area IAR may be classified into a first interest area IAR_a and a second interest area IAR_b according to the areas of the input image (see LFIM of FIG. 8) to which the gazes ES1 and ES2 of the user 110 correspond.

In an embodiment of the disclosure, when the gaze ES1 of the user 110 viewing the first area AR1 of the input image LFIM is defined as the first gaze ES1, the interest area IAR1 viewed with the first gaze ES1 may be defined as the first interest area IAR_a. In an embodiment of the disclosure, the first interest area IAR_a may correspond to the first area AR1.

When the gaze ES2 of the user 110 viewing the second area AR2 of the input image LFIM is defined as the second gaze ES2, the interest area IAR b viewed with the second gaze ES2 may be defined as the second interest area IAR_b. In an embodiment of the disclosure, the second interest area IAR_b may correspond to the second area AR2.

Referring to FIGS. 7, 10, 15, and 16, in an embodiment of the disclosure, when the first interest area IAR_a corresponds to the first area AR1, the first calibration value $CV_2$ determined based on the first distance (see $d_2$ of FIG. 12) and the first depth value $DV_2$ may be stored in the first calibration area CAR1 corresponding to the first area AR1 in operation S200 of obtaining the calibration maps CBM and CBM-1.

In operation S200 of obtaining the calibration maps CBM and CBM-1, the second calibration values $CV_3$ and $CV_4$ determined based on the second distances (see $d_3$ and $d_4$ of FIG. 12A) and the second depth values $DV_3$ and $DV_4$ may be stored in the second calibration area CAR2 corresponding to the second area AR2.

In operation S200 of obtaining the calibration maps CBM and CBM-1, the fourth calibration value $CV_2'$ determined based on the first distance $d_2$ and the third depth value $DV_1$ may be stored in the third calibration area CAR3 corresponding to the third area AR3.

Hereinafter, for convenience of explanation, in an embodiment of the disclosure, when the first interest area IAR_a corresponds to the first area AR1, the calibration maps CBM and CBM-1 obtained by the at least one processor 400 will be described as the second calibration map CBM-1. However, the disclosure is not limited thereto. When the first interest area IAR_a corresponds to the first area AR1, the at least one processor 400 may obtain the first calibration map (see CBM of FIG. 10). The third calibration value $CV_1$ determined based on the third distance $d_1$ and the third depth value $DV_1$ may be stored in the third calibration area CAR3 corresponding to the third area AR3.

In an embodiment of the disclosure, when the first interest area IAR_a corresponds to the first area AR1, the layer image (see LIM of FIG. 8) may be generated by applying the second calibration map CBM-1 to the input image LFIM in operation S300 of generating the layer image LIM.

In an embodiment of the disclosure, when the second interest area IAR_b corresponds to the second area AR2, the first calibration value $CV_2$ determined based on the first distance $d_2$ and the first depth value $DV_2$ may be stored in the first calibration area CAR1 corresponding to the first area AR1 in operation S200 of obtaining the calibration maps CBM and CBM-2.

In operation S200 of obtaining the calibration map CBM-2, the first sub-calibration value $CV_3$ determined based on the first sub-distance $d_3$ and the first sub-depth value $DV_3$ may be stored in the first sub-calibration area CAR2_$a$ of the second area AR2 corresponding to the second interest area IAR_b. The first sub-calibration area CAR2_$a$ may be an area corresponding to the first sub-area AR2_$a$.

In operation S200 of obtaining the calibration map CBM-2, the fourth calibration value $CV_2'$ determined based on the first distance $d_2$ and the second sub-depth value $DV_4$ may be stored in the second sub-calibration area CAR2_$b$ of the second area AR2 corresponding to the non-interest area NIAR. The second sub-calibration area CAR2_$b$ may be an area corresponding to the second sub-area AR2_$b$.

In operation S200 of obtaining the calibration maps CBM and CBM-1, the fourth calibration value $CV_2'$ determined based on the first distance $d_2$ and the third depth value $DV_1$ may be stored in the third calibration area CAR3 corresponding to the third area AR3

In an embodiment of the disclosure, the calibration value stored in the second sub-calibration area CAR2_$b$ may be different from the calibration value stored in the third calibration area CAR3. The calibration value determined based on a distance different from the second sub-distance $d_4$ and the second sub-depth value $DV_4$ may be stored in the second sub-calibration area CAR2_$b$. The calibration value determined based on a distance different from the third distance $d_1$ and the third depth value $DV_1$ may be stored in the third calibration area CAR3.

Hereinafter, for convenience of explanation, in an embodiment of the disclosure, when the second interest area IAR_b corresponds to the second area AR2, the calibration map CBM-2 obtained by the at least one processor 400 will be described as the third calibration map CBM-2.

In an embodiment of the disclosure, when the second interest area IAR_b corresponds to the second area AR2, the layer image LIM may be generated by applying the third calibration map CBM-2 to the input image LFIM in operation S300 of generating the layer image LIM.

In an embodiment of the disclosure, when the user 110 views the first interest area IAR_a corresponding to the first area AR1, the electronic apparatus 100 of the disclosure may generate the layer image LIM by applying the second calibration map CBM-1 to the input image LFIM. In an embodiment of the disclosure, the first and second sub-depth values $DV_3$ and $DV_4$ may be values having a small difference from the first depth value $DV_2$. In an embodiment of the disclosure, the first sub-area AR2_$a$ and the second sub-area AR2_$b$ may be adjacent to the first area AR1.

The electronic apparatus 100 may clearly display, on the layer panel 220, not only the layer area corresponding to the first interest area IAR1 that the user 110 views with the first gaze ES1, but also the layer area corresponding to the first sub-area AR2_$a$ having the first sub-depth value $DV_3$ and the layer area corresponding to the second sub-area AR2_$b$ having the second sub-depth value $DV_4$. Accordingly, the visibility of the user 110 viewing the electronic apparatus 100 may be improved.

In an embodiment of the disclosure, the difference between the third depth value $DV_1$ and the first depth value $DV_2$ may be greater than the difference between each of the first and second sub-depth values $DV_3$ and $DV_4$ and the first depth value $DV_2$. In an embodiment of the disclosure, the distance between the third area AR3 and the first sub-area AR1 may be greater than the distance between each of the first sub-area AR2_$a$ and the second sub-area AR2_$b$ and the first sub-area AR1.

In an embodiment of the disclosure, when the user 110 views the first interest area IAR1 corresponding to the first area AR1, the layer area corresponding to the third area AR3 having the third depth value $DV_1$ may be blurredly displayed. As such, because the clearly displayed layer area and the blurredly displayed layer area are provided together to the user 110, a three-dimensional effect the user 110 feels may be increased.

In an embodiment of the disclosure, when the user 110 views the second interest area IAR_b corresponding to the first sub-area AR2_$a$, the electronic apparatus 100 of the disclosure may generate the layer image LIM by applying the third calibration map CBM-2 to the input image LFIM.

The electronic apparatus 100 may clearly display, on the layer panel 220, not only the layer area corresponding to the first area AR1 having image disparity corresponding to the pixel disparity of the layer panel 220 located at the first distance $d_2$ from the base panel 210, but also the layer area corresponding to the first sub-area AR2_$a$ of the second area AR2 corresponding to the second interest area IAR_b.

In an embodiment of the disclosure, the electronic apparatus 100 may blurredly display, on the layer panel 220, the layer area corresponding to the second sub-area AR2_$b$ of the second area AR2 corresponding to the non-interest area NIAR and the layer area corresponding to the third area AR3.

Accordingly, the electronic apparatus 100 may select the layer area to be clearly displayed on the layer panel 220 according to the gaze of the user 110. In this manner, the electronic apparatus 100 may provide the image 120-1 to the user 110 as if the user 110 views an object having a three-dimensional effect in the real world. Also, even the layer area corresponding to the area having no image disparity corresponding to the pixel disparity of the layer panel 220 is clearly displayed when the gaze of the user 110 is concentrated. Accordingly, the visibility of the user 110 may be improved.

In order to solve the technical problem described above, an embodiment of the disclosure provides the electronic apparatus 100 including the display panel 200. The electronic apparatus 100 may include a memory 300 that stores at least one instruction. The electronic apparatus 100 may include at least one processor 400 that executes the at least one instruction stored in the memory 300. The at least one processor 400 may obtain an input image LFIM including a first area and a second area. The at least one processor 400 may generate calibration maps CBM and CBM-1 that allocate, to the first area, a first calibration value for representing the first depth value, and allocate, to the second area, a second calibration value for representing the second depth value. The at least one processor 400 may apply the calibration maps CBM and CBM-1 to the input image LFIM to obtain an output image including a first output area corresponding to the first area and a second output area corresponding to the second area. The at least one processor 400 may display the obtained output image on the display panel 200. In an embodiment of the disclosure, the first output area may have a depth value obtained by converting a first depth value so as to correspond to the display panel 200, and the second output area may have a depth value obtained by converting a second depth value so as to correspond to the display panel 200.

In an embodiment of the disclosure, the display panel 200 may include a base panel 210 and a layer panel 220 spaced apart from the base panel 210 by a reference distance. The output image 120 may include a base image and a layer image. The at least one processor 400 may generate the base image to be displayed on the base panel 210 and the layer image to be displayed on the layer panel 220 by applying the calibration maps CBM and CBM-1 to the input image LFIM.

In an embodiment of the disclosure, the layer image may include a first layer area corresponding to the first output area and a second layer area corresponding to the second output area. The first layer area may have a depth value obtained by converting the first depth value according to the reference distance. The second layer area may have a depth value obtained by converting the second depth value according to the reference distance.

In an embodiment of the disclosure, the input image LFIM may include images having a plurality of different views from each other.

In an embodiment of the disclosure, the at least one processor 400 may generate the output image through the sub-image generating module 350 that performs factorization.

In an embodiment of the disclosure, the sub-image generating module 350 may include an artificial intelligence model trained based on a result of comparing the input image LFIM with the training image TIM generated based on the output image.

In an embodiment of the disclosure, the artificial intelligence model may be trained to perform factorization based on a result of comparing the input image LFIM with the training image TIM generated based on the output image and training distance information. The training distance information may include any one training distance selected between a first reference distance and a second reference distance greater than the first reference distance, and the reference distance may be included between the first reference distance and the second reference distance.

In an embodiment of the disclosure, the artificial intelligence model may be trained to determine the degree of warping of the images having a plurality of views included in the input image LFIM based on the training distance information. The training distance information may be generated so that the same training distance corresponds to the first area and the second area.

In an embodiment of the disclosure, the at least one processor 400 may obtain gaze information of the user 110 viewing the interest area in the display panel 200. When the interest area corresponds to the first area, the at least one processor 400 may generate the calibration map CBM-1 that allocates the first calibration value to the first area and allocates the second calibration value to the second area. The at least one processor 400 may generate the output image by applying the calibration map CBM-1 to the input image LFIM.

In an embodiment of the disclosure, the at least one processor 400 may obtain gaze information of the user 110 viewing the interest area in the display panel 200. When the interest area corresponds to the second area, the at least one processor 400 may generate the calibration map CBM-2 that allocates the first calibration value to the first area, allocates the second calibration value to the area of the second area corresponding to the non-interest area, and allocates, to the interest area of the second area, the third calibration value for representing the depth value different from the second depth value. The at least one processor 400 may generate the output image by applying the calibration map CBM-2 to the input image LFIM. The output image may include a first output area corresponding to the first area, a first sub-output area of the second area corresponding to the interest area, and a second sub-output area of the second area corresponding to the non-interest area. The first output area may have a depth value obtained by converting the first depth value so as to correspond to the display panel 200. The second sub-output area may have a depth value obtained by converting the second depth value so as to correspond to the display panel 200. The first sub-output area may have a depth value obtained by converting the different depth value so as to correspond to the display panel 200.

In order to solve the technical problem described above, an embodiment of the disclosure provides an operating method of the electronic apparatus 100 (100-1) including the display panel 200. In an embodiment of the disclosure, the operating method of the electronic apparatus 100 (100-1) may include obtaining the input image LFIM including the first area and the second area (S100). The operating method of the electronic apparatus 100 (100-1) may include generating the calibration map CBM (CBM-1) that allocates, to the first area, the first calibration value for representing the first depth value, and allocates, to the second area, the second calibration value for representing the second depth value (S200). The operating method of the electronic apparatus 100 (100-1) may include generating the output image including the first output area corresponding to the first area and the second output area corresponding to the second area by applying the calibration map CBM (CBM-1) to the input image LFIM (S300). The operating method of the electronic apparatus 100 (100-1) may include displaying the generated output image on the display panel 200 (S400). The first output area may have a depth value obtained by converting the first depth value so as to correspond to the display panel 200, and the second output area may have a depth value obtained by converting the second depth value so as to correspond to the display panel 200.

In an embodiment of the disclosure, the display panel 200 may include a base panel 210 and a layer panel 220 spaced apart from the base panel 210 by a reference distance. The output image 120 may include a base image and a layer image. Operation S300 of generating the output image may further include generating the base image to be displayed on the base panel 210 and generate the layer image to be displayed on the layer panel 220 by applying the calibration map CBM (CBM-1) to the input image LFIM. The layer image may include a first layer area corresponding to the first output area and a second layer area corresponding to the second output area. The first output area may have a depth value obtained by converting the first depth value according to the reference distance, and the second output area may have a depth value obtained by converting the second depth value according to the reference distance.

In an embodiment of the disclosure, the input image LFIM may include images having a plurality of different views from each other.

In an embodiment of the disclosure, operation S300 of generating the output image may include generating the output image through the sub-image generating module 350 that performs factorization.

In an embodiment of the disclosure, the sub-image generating module 350 may include an artificial intelligence model trained based on a result of comparing the right field image LFIM with the training image TIM obtained based on the output image.

In an embodiment of the disclosure, the sub-image generating module 350 may include an artificial intelligence model trained based on a result of comparing the input image LFIM with the training image TIM generated based on the output image.

In an embodiment of the disclosure, the method of training the artificial intelligence model may include generating the training image TIM based on the output image and training distance information. The method of training the artificial intelligence model may include training the artificial intelligence model to perform factorization, based on a result of comparing the input image LFIM with the training image TIM. The training distance information may include any one training distance selected between a first reference distance and a second reference distance greater than the first reference distance, and the reference distance may be included between the first reference distance and the second reference distance.

In an embodiment of the disclosure, the method of training the artificial intelligence model may further include determining the degree of warping of the images having a plurality of views included in the input image LFIM based on the training distance information. The training distance information may be generated so that the same training distance corresponds to the first area and the second area.

In an embodiment of the disclosure, the operating method of the electronic apparatus 100 (100-1) may further include obtaining the gaze information of the user 110 viewing the interest area in the display panel 200. When the interest area corresponds to the first area, operation S200 of generating the calibration map CBM (CBM-1) may include generating the calibration map CBM-1 that allocates the first calibration value to the first area and allocates the second calibration value to the second area. Operation S300 of generating the output image may include generating the output image by applying the calibration map CBM-1 to the input image LFIM.

In an embodiment of the disclosure, the operating method of the electronic apparatus 100 (100-1) may further include obtaining the gaze information of the user 110 viewing the interest area in the display panel 200. When the interest area corresponds to the second area, operation S200 of generating the calibration map CBM (CBM-1) may include generating a calibration map CBM-2 that allocates the first calibration value to the first area, allocates the second calibration value to the area of the second area corresponding to the non-interest area, and allocates, to the interest area of the second area, the third calibration value for representing the depth value different from the second depth value. Operation S300 of generating the output image may include generating the output image by applying the calibration map CBM-2 to the input image LFIM. The output image may include a first output area corresponding to the first area, a first sub-output area of the second area corresponding to the interest area, and a second sub-output area of the second area corresponding to the non-interest area. The first output area may have a depth value obtained by converting the first depth value so as to correspond to the display panel 200. The second sub-output area may have a depth value obtained by converting the second depth value so as to correspond to the display panel 200. The first sub-output area may have a depth value obtained by converting the different depth value so as to correspond to the display panel 200.

In an embodiment of the disclosure, a computer-readable recording medium storing a program for causing a computer to perform at least one of the methods described above may be provided.

The operating methods performed by the electronic apparatus 100, as described above, may be implemented as a hardware component, a software component, and/or a combination of the hardware component and the software component. The program may be executed by any system capable of executing computer-readable instructions.

The software may include a computer program, code, instructions, or a combination of one or more thereof, and may configure a processor to operate as desired or may instruct the processor independently or collectively.

The software may be implemented as a computer program including instructions stored in a computer-readable storage medium. Examples of the computer-readable recording medium may include a magnetic storage medium (e.g., ROM, RAM, floppy disk, hard disk, etc.) and an optical readable medium (e.g., compact disc-ROM (CD-ROM), digital versatile disc (DVD), etc.). The computer-readable recording medium may be distributed in network-connected computer systems, and computer-readable code may be stored and executed in a distributed manner. The recording medium may be readable by a computer, may be stored in a memory, and may be executed by a processor.

The computer-readable storage medium may be provided in the form of a non-transitory storage medium. The "non-transitory storage medium" is a tangible device and only means not including a signal (e.g., electromagnetic wave). This term does not distinguish between a case where data is semi-permanently stored in a storage medium and a case where data is temporarily stored in a storage medium. For example, the "non-transitory storage medium" may include a buffer in which data is temporarily stored.

Also, the methods according to various embodiments of the disclosure disclosed herein may be provided by being included in a computer program product. The computer program products may be traded between a seller and a buyer as commodities.

The computer program product may include a software program, a computer-readable storage medium storing the software program. The computer program product may include a product (e.g., a downloadable application) in the form of a software program that is electronically distributed through a manufacturer of the electronic apparatus 100 or an electronic market (e.g., a Samsung galaxy store). For electronic distribution, at least a part of the software program may be stored in a storage medium, or may be temporarily generated. The storage medium may be a storage medium of a server of a manufacturer of the electronic apparatus 100, a server of an electronic market, or a relay server temporarily storing a software program.

As described above, although the embodiments of the disclosure have been described with reference to the restrictive embodiments and drawings, various modifications and variations may be made thereto from the above description by those of ordinary skill in the art. For example, appropriate results may be achieved even when the technologies described above are performed in an order different from the methods described above, and/or components of the computer system or modules described above are coupled or combined in a manner different from the methods described above or are replaced or substituted for other components or equivalents.

The invention claimed is:

1. An electronic apparatus comprising:
 a display panel comprising:
  a base panel; and
  a layer panel spaced apart from the base panel by a reference distance;
 a memory storing at least one instruction; and
 at least one processor configured to execute the at least one instruction to:

obtain an input image comprising a first area and a second area;

generate a calibration map that allocates, to the first area, a first calibration value for representing a first depth value, and allocates, to the second area, a second calibration value for representing a second depth value;

apply the calibration map to the input image to generate an output image comprising a first output area corresponding to the first area and a second output area corresponding to the second area; and display the generated output image on the display panel, wherein the first output area has a depth value obtained by adjusting the first depth value so as to correspond to the display panel, and the second output area has a depth value obtained by adjusting the second depth value so as to correspond to the display panel, wherein the at least one processor is further configured to execute the at least one instruction to generate the output image through an artificial intelligence model that performs factorization, and wherein the at least one processor is further configured to execute the at least one instruction to train the artificial intelligence model to perform the factorization based on a result of comparing the input image with a training image generated based on the output image and training distance information, wherein the training distance information is based on the reference distance.

2. The electronic apparatus of claim 1, wherein the display panel comprises:

wherein the output image comprises a base image and a layer image, and wherein the at least one processor is further configured to generate the base image to be displayed on the base panel and the layer image to be displayed on the layer panel by applying the calibration map to the input image.

3. The electronic apparatus of claim 2, wherein the layer image comprises a first layer area corresponding to the first output area and a second layer area corresponding to the second output area, and wherein the first layer area has a depth value obtained by adjusting the first depth value according to the reference distance, and the second layer area has a depth value obtained by adjusting the second depth value according to the reference distance.

4. The electronic apparatus of claim 1, wherein the input image comprises images having a plurality of views that are different from each other.

5. The electronic apparatus of claim 1, wherein the at least one processor is further configured to execute the at least one instruction to generate the output image through a sub-image generating module that comprises the artificial intelligence model.

6. The electronic apparatus of claim 1, wherein the training distance information comprises a training distance selected between a first reference distance and a second reference distance greater than the first reference distance, and wherein the reference distance is a value between the first reference distance and the second reference distance.

7. The electronic apparatus of claim 6, wherein the at least one processor is further configured to execute the at least one instruction to:

train the artificial intelligence model to determine a degree of warping of the images having a plurality of views included in the input image, based on the training distance information, and generate the training distance information so that a training distance corresponding to each of the first area and the second area is equal.

8. The electronic apparatus of claim 1, wherein the at least one processor is further configured to execute the at least one instruction to:

obtain gaze information of a user viewing an interest area in the display panel;

based on the interest area corresponding to the first area, generate the calibration map that allocates the first calibration value to the first area and allocates the second calibration value to the second area; and generate the output image by applying the calibration map to the input image.

9. The electronic apparatus of claim 1, wherein the at least one processor is further configured to execute the at least one instruction to:

obtain gaze information of a user viewing an interest area in the display panel;

based on the interest area corresponding to the second area, generate the calibration map that allocates the first calibration value to the first area, allocates the second calibration value to an area of the second area corresponding to a non-interest area, and allocates, to the interest area corresponding to the second area, a third calibration value for representing a third depth value that is different from the second depth value; and generate the output image by applying the calibration map to the input image, wherein the output image comprises the first output area corresponding to the first area, a first sub-output area of the second area corresponding to the interest area, and a second sub-output area of the second area corresponding to the non-interest area, and wherein the first output area has a depth value obtained by adjusting the first depth value to correspond to the display panel, the second sub-output area has a depth value obtained by adjusting the second depth value to correspond to the display panel, and the first sub-output area has a depth value obtained by adjusting the third depth value to correspond to the display panel.

10. An operating method of an electronic apparatus including a display panel, the operating method comprising:

obtaining an input image comprising a first area and a second area;

generating a calibration map that allocates, to the first area, a first calibration value for representing a first depth value, and allocates, to the second area, a second calibration value for representing a second depth value;

applying the calibration map to the input image and generating an output image comprising a first output area corresponding to the first area and a second output area corresponding to the second area; and;

displaying the generated output image on the display panel, wherein the first output area has a depth value obtained by adjusting the first depth value so as to correspond to the display panel, and the second output area has a depth value obtained by adjusting the second depth value so as to correspond to the display panel, wherein the display panel comprises a base panel and a layer panel spaced apart from the base panel by a reference distance, wherein the generating the output image comprises generating the output image through an artificial intelligence model that performs factorization, and
wherein the operating method further comprises training the artificial intelligence model by generating a training image based on the output image and training distance information, and training the artificial intelligence model to perform factorization based on a result of comparing the training image with the input image, wherein the training distance information is based on the reference distance.

11. The operating method of claim 10, wherein the output image comprises a base image and a layer image, and
wherein the generating the output image comprises:
generating the base image to be displayed on the base panel by applying the calibration map to the input image; and
generating the layer image to be displayed on the layer panel by applying the calibration map to the input image, wherein the layer image comprises a first layer area corresponding to the first output area and a second layer area corresponding to the second output area,
wherein the first layer area has a depth value obtained by adjusting the first depth value according to the reference distance, and the second layer area has a depth value obtained by adjusting the second depth value according to the reference distance.

12. The operating method of claim 10, wherein the input image comprises images having a plurality of views that are different from each other.

13. The operating method of claim 10, wherein the generating the output image comprises generating the output image through a sub-image generating module that comprises the artificial intelligence model.

14. The operating method of claim 10,
wherein the training distance information comprises a training distance selected between a first reference distance and a second reference distance greater than the first reference distance, and
wherein the reference distance is a value between the first reference distance and the second reference distance.

15. The operating method of claim 14, wherein the training of the artificial intelligence model further comprises: determining a degree of warping of the images having a plurality of views included in the input image based on the training distance information, and
wherein the generating the training distance information comprises generating the training distance information so that a training distance corresponding to each of the first area and the second area is equal.

16. The operating method of claim 10, further comprising obtaining gaze information of a user viewing an interest area in the display panel,
wherein, based on the interest area corresponding to the first area, the generating the calibration map comprises generating the calibration map that allocates the first calibration value to the first area and allocates the second calibration value to the second area, and
the generating of the output image comprises generating the output image by applying the calibration map to the input image.

17. The operating method of claim 10, further comprising obtaining gaze information of a user viewing an interest area in the display panel,
wherein, based on the interest area corresponding to the second area, the generating of the calibration map comprises generating a calibration map that allocates the first calibration value to the first area, allocates the second calibration value to an area of the second area corresponding to a non-interest area, and allocates, to the interest area corresponding to the second area, a third calibration value for representing a third depth value that is different from the second depth value,
wherein the generating of the output image comprises generating the output image by applying the calibration map to the input image,
wherein the output image comprises the first output area corresponding to the first area, a first sub-output area of the second area corresponding to the interest area, and a second sub-output area of the second area corresponding to the non-interest area, and
wherein the first output area has a depth value obtained by adjusting the first depth value to correspond to the display panel, the second sub-output area has a depth value obtained by adjusting the second depth value to correspond to the display panel, and the first sub-output area has a depth value obtained by adjusting the third depth value to correspond to the display panel.

18. A non-transitory computer-readable recording medium having recorded thereon a program for causing a computer to perform an operating method comprising:
obtaining an input image comprising a first area and a second area;
generating a calibration map that allocates, to the first area, a first calibration value for representing a first depth value, and allocates, to the second area, a second calibration value for representing a second depth value;
applying the calibration map to the input image and generating an output image comprising a first output area corresponding to the first area and a second output area corresponding to the second area; and
displaying the generated output image on a display panel,
wherein the first output area has a depth value obtained by adjusting the first depth value so as to correspond to the display panel, and the second output area has a depth value obtained by adjusting the second depth value so as to correspond to the display panel,
wherein the display panel comprises a base panel and a layer panel spaced apart from the base panel by a reference distance,
wherein the generating the output image comprises generating the output image through an artificial intelligence model that performs factorization, and
wherein the operating method further comprises training the artificial intelligence model by generating a training image based on the output image and training distance information, and training the artificial intelligence model to perform factorization based on a result of comparing the training image with the input image, wherein the training distance information is based on the reference distance.

* * * * *